(12) United States Patent
Omura et al.

(10) Patent No.: US 6,518,960 B2
(45) Date of Patent: *Feb. 11, 2003

(54) ELECTRONIC BLACKBOARD SYSTEM

(75) Inventors: Katsuyuki Omura; Kunikazu Tsuda; Makoto Tanaka; Takashi Kitaguchi; Tomohiko Beppu; Toshiyuki Furuta; Takao Inoue, all of Kanagawa; Takashi Yano, Tokyo, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 09/297,052

(22) PCT Filed: Jul. 31, 1998

(86) PCT No.: PCT/JP98/03414

§ 371 (c)(1),
(2), (4) Date: Apr. 27, 1999

(87) PCT Pub. No.: WO00/06395

PCT Pub. Date: Feb. 10, 2000

(65) Prior Publication Data

US 2002/0008692 A1 Jan. 24, 2002

(30) Foreign Application Priority Data

Jul. 30, 1998 (JP) ............................................ 10-215751

(51) Int. Cl.[7] ............................ G09G 5/00; G08C 21/00
(52) U.S. Cl. ....................................... 345/177; 345/173
(58) Field of Search .................................. 345/173, 177

(56) References Cited

U.S. PATENT DOCUMENTS

| | | | | |
|---|---|---|---|---|
| 4,625,075 A | * | 11/1986 | Jaeger | 178/18.03 |
| 4,713,534 A | | 12/1987 | Masters et al. | 250/214 B |
| 4,732,454 A | * | 3/1988 | Saito et al. | 350/164 |
| 4,749,625 A | * | 6/1988 | Obayashi et al. | 428/624 |
| 5,023,408 A | * | 6/1991 | Murakami et al. | 178/19 |
| 5,063,600 A | * | 11/1991 | Norwood | 382/13 |
| 5,070,467 A | * | 12/1991 | Todome | 395/166 |
| 5,455,906 A | * | 10/1995 | Usuda | 395/162 |

(List continued on next page.)

FOREIGN PATENT DOCUMENTS

| | | |
|---|---|---|
| JP | 57-211637 | 12/1982 |
| JP | 62-192683 | 8/1987 |
| JP | 3-50238 | 5/1991 |
| JP | 6-37467 | 9/1994 |
| JP | 8-240407 | 9/1996 |
| JP | 9-91094 | 4/1997 |
| JP | 2678231 | 8/1997 |
| JP | 9-319501 | 12/1997 |
| JP | 2000141578 | * 5/2000 |

*Primary Examiner*—Richard Hjerpe
*Assistant Examiner*—Kevin M. Nguyen
(74) *Attorney, Agent, or Firm*—Oblon, Spivak, McClelland, Maier & Neustadt, P.C.

(57) ABSTRACT

An electronic blackboard system with a PDP for displaying characters and images. A touch input device with a touch panel surface is provided on the front surface of the PDP. A printer outputs image data onto recording paper. A computer provides control over displays on the PDP as well over the printing operations of the printer according to the input from the touch input device. A frame unit has a board section for holding a display surface and a write-in surface of the electronic blackboard at a specified height. A printer accommodating section accommodates the printer and a computer accommodating section accommodates the computer therein. The computer accommodating section, the printer accommodating section and the board section are arranged in the vertical direction starting from the bottom.

24 Claims, 69 Drawing Sheets

U.S. PATENT DOCUMENTS

| | | | | |
|---|---|---|---|---|
| 5,638,093 | A | * | 6/1997 | Takahashi et al. ........... 345/173 |
| 5,729,441 | A | * | 3/1998 | Murakami .................. 361/818 |
| 5,854,450 | A | * | 12/1998 | Kent ....................... 178/18.04 |
| 5,903,252 | A | * | 5/1999 | Ogata ......................... 345/105 |
| 5,945,213 | A | * | 8/1999 | Nagaike et al. ............. 428/336 |
| 6,064,373 | A | * | 5/2000 | Ditzik ........................ 345/173 |
| 6,143,418 | A | * | 11/2000 | Takamiya et al. ........... 428/434 |
| 6,236,391 | B1 | * | 5/2001 | Kent et al. .................. 345/177 |
| 2001/0033275 | A1 | * | 10/2001 | Kent et al. .................. 345/173 |

* cited by examiner

FIG.71
(a)
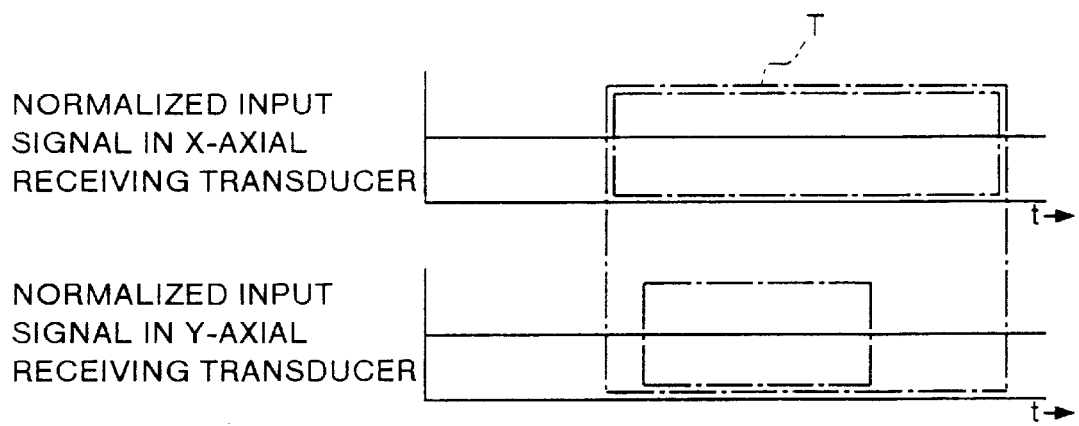
(b)
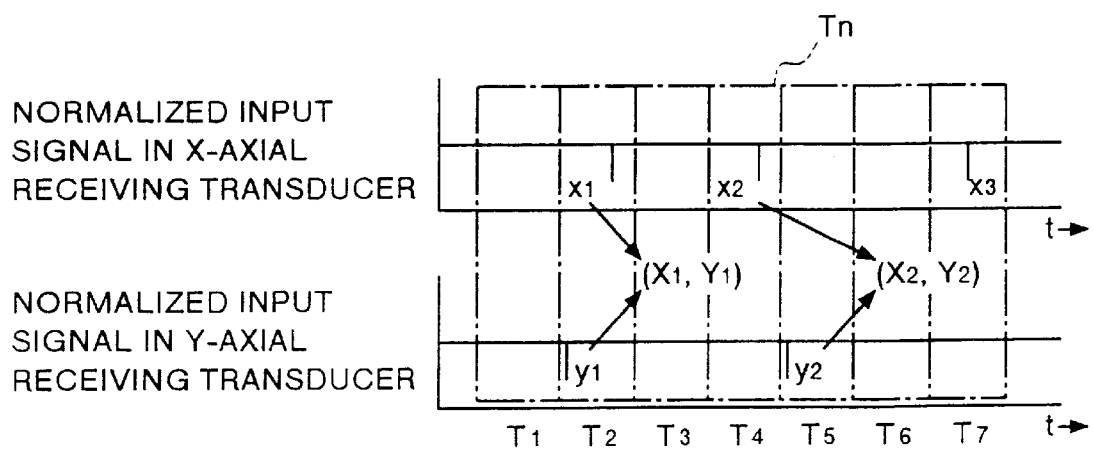

FIG.72
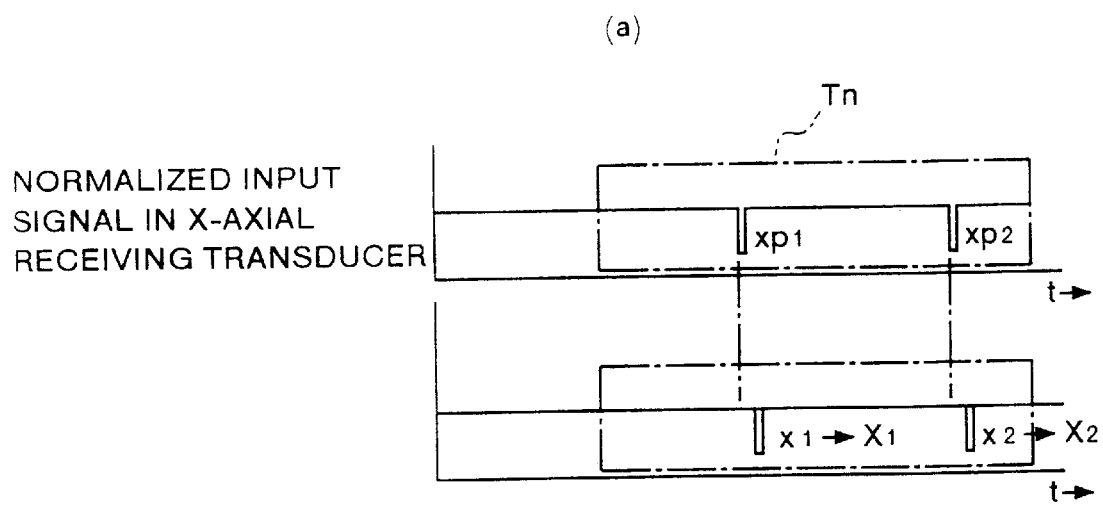
(a)
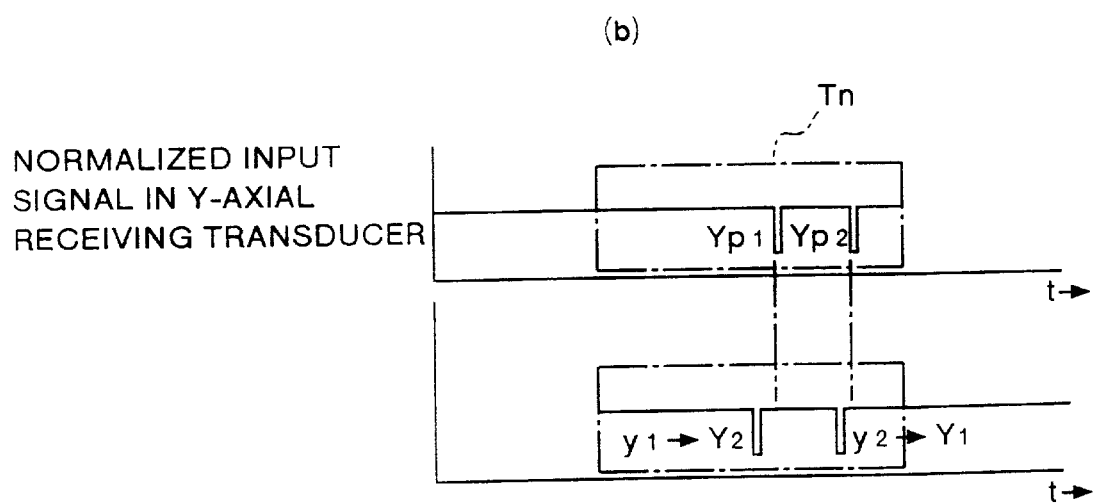
(b)

ELECTRONIC BLACKBOARD SYSTEM

BACKGROUND OF THE INVENTION

1. Field of the Invention

The present invention relates to an electronic blackboard system comprising a display unit for displaying thereon characters and images, a touch input device with a touch panel provided on a front surface of the display unit, and a control unit for providing controls over displays by the display unit according to input from the touch input device capable of forming a display surface and a write-in surface of the electronic blackboard using the display unit and the touch input device, and more specifically to a size-reduced and integrated electronic blackboard system with improved operability, adaptability for handling, and convenience.

2. Discussion of the Background

Conventionally there has been known an electronic blackboard apparatus which can read freehand information written on a whiteboard or a write-in surface of a write-in sheet with some writing tool using a dedicated scanner and outputs the read information onto a recording paper with a dedicated printer, and this type of electronic blackboard apparatus is used as a so-called copy board.

There has been disclosed an electronic blackboard system with a touch panel provided on a write-in surface of the electronic blackboard for inputting freehand information on a write-in surface in real time. For instance, the Soft Board manufactured and provided by the Microfield Graphics, Inc. is a touch input device having an optical touch panel provided on a whiteboard which is a write-in surface and capable of acquiring visual data such as characters and pictures drawn on this whiteboard in real time into a personal computer connected thereto. With the electronic blackboard system using this Soft Board, it is possible to input visual data captured with the Soft Board into a personal computer for displaying the data on a CRT thereof, to display the data on a large-sized screen using a liquid crystal projector, or to output the data with a printer onto a recording paper. It is also possible to project an image on a screen of a personal computer with the Soft Board connected thereto onto the Soft Board with a liquid crystal projector and operate the image on the screen of the personal computer with a dedicated pen on the Soft Board.

Furthermore, there has been disclosed an electronic blackboard system having a display unit for displaying characters and images thereon, a touch input device with a touch panel provided on a front surface of the display unit, and a control unit for providing controls over displays by the display unit according to input from the touch input device and capable of forming a display surface and a write-in surface of the blackboard with the display unit and the touch input device. For instance, in a case of the Smart 2000 manufactured and supplied by the SMART Technologies Inc., an image of a character, a picture, or a graphics is projected with a liquid crystal projector connected to a personal computer onto a panel, freehand information is captured into the personal computer using a touch panel based on the pressure-sensing system (write-in surface) provided on a front surface of the projection surface (display surface) of the panel, the freehand information is synthesized with the image information in the personal computer, and the synthesized information can be displayed with the liquid crystal projector in real time.

When a communicating function for transferring audio or video data is integrated with the electronic blackboard system as described above, the electronic blackboard system can also be used as an electronic conference system by connecting remote sites with a communication line.

Although the conventional type of electronic blackboard system as described above has been used for conferences, presentation, or educational purposes and its effect in actual use has been highly evaluated, the system is constructed assuming that the electronic blackboard is basically used at a fixed place. Therefore, all or a portion of the devices such as a display unit, a touch input device, a personal computer (control unit), and a printer each constituting the electronic blackboard system are provided as discrete units, and a number of devices constituting the system is rather large, which requires to insure a wide space for installation thereof, and it is not easy to move or install the electronic blackboard system. In other words, size of the system is large, and a number of devices constituting the system is large, so that the operability, adaptability for handling, and convenience are disadvantageously insufficient.

More specifically, when one electronic blackboard system is shared by a plurality of conference rooms or a different sections of an organization and is moved from place to place according to the necessity, as there are many component devices, a long time is required for moving it from a place to another place, and in addition it is necessary to reconnect the component devices to each other, so that a disadvantageously long time is required for installing the electronic blackboard system. It is not easy for one person to move and install the system within a short period of time.

Furthermore, with the conventional type of electronic blackboard system, when a surface is used as both a display surface and a write-in surface, it is necessary to use a liquid crystal projector as a display unit, so that size of the system inevitably becomes large, and also it is required to insure a wide space for installation thereof and to reduce brightness at a site where the electronic blackboard system is being used.

It is conceivable to minimize the size (make thinner) of the display unit by using a liquid crystal display as a display unit, but a view field angle of a liquid crystal display unit is narrow, and it is very difficult to see the screen when viewed at a certain angle, so that it is not suited to be used as a display unit for an electronic blackboard system shared by a plurality of users. In addition, when a liquid crystal display having a large screen is used as a display unit for an electronic blackboard system, cost of the electronic blackboard system becomes disadvantageously expensive.

Furthermore, in recent years, in association with progress in the fields of data-processing devices and AV devices, also at the sites of conferences, presentation, or educational activities, such devices as digital cameras, DVD players, or video equipment are frequently used, but design of electronic blackboard systems based on the conventional technology is not based on considerations to concurrent use of the devices as described above, so that the operability, adaptability for handling, and convenience are not sufficient. For instance, when the devices as described above are used, it is necessary to input data once via a control unit such as a personal computer, and connection between component devices is very complicated, and in addition to the necessity of operating each device, it is necessary to operate the personal computer, which makes the work very complicated and troublesome. Especially, when a digital camera, a DVD player, and video equipment are to be alternately switched for use, or when a plurality types of devices are used, connection therebetween and operation becomes still complicated, which may interfere the smooth proceeding of a conference or other activities executed by using the electronic blackboard system.

SUMMARY OF THE INVENTION

The present invention was made in the light of the circumstances as described above, and it is an object of the present invention to provide an electronic blackboard system which has a small size as a whole and also has an improved operability, adaptability for handling and convenience.

It is another object of the present invention to provide an electronic blackboard system in which it is possible to connect and operate various types of data-processing devices and AV equipment to each other without requiring assistance of a personal computer.

In order to achieve the objects described above, the electronic blackboard system according to the present invention comprises at least a display unit for displaying characters and images; a touch input device with a touch panel surface provided on a front surface of the display unit; a printer for outputting image data onto a recording paper; and a control unit for providing controls over displays provided by the display unit as well as over printing operations of the printer according to input from the touch input device, and said electronic blackboard system is capable of forming a display surface and a write-in surface of the electronic blackboard using the display unit and touch input device: wherein said control unit is a personal computer; said display unit is a plasma display; and said touch input device is a touch input device based on a ultrasonic wave surface elastic wave system comprising a transmitting unit for transmitting surface elastic waves, a reflecting unit for reflecting the surface elastic waves transmitted from the transmitting unit in a specified direction, and a receiving unit for receiving the surface electric waves reflected by said reflecting unit for inputting coordinate of a touch position on the touch panel surface according to an attenuation rate of the surface elastic waves by transmitting the surface elastic waves with the transmitting unit onto the touch panel surface, reflecting the surface elastic waves propagating on the touch panel surface with the reflecting unit in the direction of the receiving unit, and receiving the surface elastic waves propagating through the touch panel surface with the receiving unit, and also comprises a shielding member for shuttering off electromagnetic waves provided on a surface of the display unit at a position when a signal line is connected so that the position for connection of the signal line for fetching a received signal for a surface elastic wave received by the receiving unit is covered; further, said electronic blackboard system comprises a frame unit having a holding section for holding a display surface and a write-in surface of the electronic blackboard at a specified height, a printer accommodating section for accommodating the printer therein, and a control unit accommodating section for accommodating the control unit therein, in which the control unit accommodating section, printer accommodating section, and holding section are arranged in the vertical direction in this order from the bottom.

The electronic blackboard system according to the present invention comprises at least a display unit for displaying characters and images; a touch input device with a touch panel surface provided on a front surface of the display unit; and a control unit for providing controls over displays by said display unit according to input from touch input device, and said electronic blackboard system is capable of forming a display surface and a write-in surface of the blackboard with the display unit and touch input device: wherein said touch input device is a touch input device comprising a transmitting unit for transmitting the surface elastic waves, a reflecting unit for reflecting the surface elastic waves transmitted from the transmitting unit in a specified direction, and a receiving unit for receiving the surface elastic waves reflected by the reflecting unit for inputting coordinate of a touch position on the touch panel surface according to an attenuation rate of the surface elastic waves by transmitting the surface elastic wave with said transmitting unit onto a panel surface of the touch panel surface, reflecting the surface elastic waves propagating through the touch panel surface with said reflecting unit in the direction of the receiving unit, and receiving the surface elastic waves propagating through the touch panel with the receiving unit; further, the electronic blackboard system has a shielding member for shuttering off electromagnetic waves provided on a surface of the display unit at a position where a signal line is connected so that the position for connection of the signal line for fetching a received signal for the surface elastic wave received by the receiving unit is covered.

The electronic blackboard system according to the present invention comprises at least a display unit for displaying characters and images; a touch input device with a touch panel surface provided on a front surface of the display unit; a printer for outputting image data onto a recording paper; and a control unit for providing controls over displays provided by the display unit as well as providing control over printing operations by the printer according to input from the touch input device, and said electronic blackboard system is capable of forming a display surface and a write-in surface of the electronic blackboard using the display unit and touch input device: wherein said control unit is a personal computer; further, said electronic blackboard system comprises a frame unit having a holding section for holding a display surface and a write-in surface of the electronic blackboard at a specified height, a printer accommodating section for accommodating the printer therein, and a control unit accommodating section for accommodating the control unit therein, in which the control unit accommodating section, printer accommodating section, and holding section are arranged in the vertical direction in this order from the bottom.

The electronic blackboard system according to the present invention comprises at least a display unit for displaying characters and images; a touch input device with a touch panel surface provided on a front surface of the display unit; and a control unit for providing controls over displays provided by the display unit according to input from the touch input device, and said electronic blackboard system is capable of forming a display surface and a write-in surface of the electronic blackboard using the display unit and touch input device; wherein said touch input device is a touch input device based on a ultrasonic wave surface elastic wave system comprising a transmitting unit for transmitting the surface elastic waves, a reflecting unit for reflecting the surface elastic waves transmitted from the transmitting unit in a specified direction, and a receiving unit for receiving the surface electric waves reflected by said reflecting unit for inputting coordinate of a touch position on the touch panel surface according to an attenuation rate of the surface elastic waves by transmitting the surface elastic waves with the transmitting unit onto the touch panel surface, reflecting the surface elastic waves propagating on the touch panel surface with the reflecting unit in a direction to the receiving unit, and receiving the surface elastic waves propagating through the touch panel surface with the receiving unit.

The electronic blackboard system according to the present invention comprises at least a display unit for displaying characters and images; a touch input device with a touch panel surface provided on a front surface of the display unit; a printer for outputting image data onto recording paper; and a control unit for providing controls over displays provided by the display unit as well as providing control over printing operations of the printer according to input from the touch input device, and said electronic blackboard system is capable of forming a display surface and a write-in surface of the electronic blackboard using the display unit and touch input device: wherein said touch input device is a touch input device based on a ultrasonic wave surface elastic wave system comprising a transmitting unit for transmitting the surface elastic waves, a reflecting unit for reflecting the surface elastic waves transmitted from the transmitting unit in a specified direction, and a receiving unit for receiving the surface electric waves reflected by said reflecting unit for inputting coordinate of a touch position on the touch panel surface according to an attenuation rate of the surface elastic waves by transmitting the surface elastic waves with the transmitting unit onto the touch panel surface, reflecting the surface elastic waves propagating on the touch panel surface with the reflecting unit in a direction to the receiving unit, and receiving the surface elastic waves propagating through the touch panel surface with the receiving unit; further, said electronic blackboard system comprises a frame unit having a holding section for holding a display surface and a write-in surface of the electronic blackboard at a specified height, a printer accommodating section for accommodating the printer therein, and a control unit accommodating section for accommodating the control unit therein, in which the control unit accommodating section, printer accommodating section, and holding section are arranged in the vertical direction in this order from the bottom.

The electronic blackboard system according to the present invention comprises at least a display unit for displaying characters and images; a touch input device with a touch panel surface provided on a front surface of the display unit; and a control unit for providing controls over displays provided by the display unit according to input from the touch input device, and said electronic blackboard system is capable of forming a display surface and a write-in surface of the electronic blackboard using the display unit and touch input device; wherein said touch input device is a touch input device based on a ultrasonic wave surface elastic wave system comprising a transmitting unit for transmitting the surface elastic waves, a reflecting unit for reflecting the surface elastic waves transmitted from the transmitting unit in a specified direction, and a receiving unit for receiving the surface electric waves reflected by said reflecting unit for inputting coordinate of a touch position on the touch panel surface according to an attenuation rate of the surface elastic waves by transmitting the surface elastic wave with the transmitting unit onto the touch panel surface, reflecting the surface elastic waves propagating on the touch panel surface with the reflecting unit in a direction to the receiving unit, and receiving the surface elastic waves propagating through the touch panel surface with the receiving unit, and also comprises a shielding member for shuttering off electromagnetic waves provided on a surface of the display unit at a position where a signal line is connected so that the position for connection of the signal line for fetching a received signal for the surface elastic waves received by the receiving unit is covered.

The electronic blackboard system according to the present invention comprises at least a display unit for displaying characters and images; a touch input device with a touch panel surface provided on a front surface of the display unit; a printer for outputting image data onto recording paper; and a control unit for providing controls over displays provided by the display unit as well as over printing operations of the printer according to input from the touch input device, and said electronic blackboard system is capable of forming a display surface and a write-in surface of the electronic blackboard using the display unit and touch input device; further, said electronic blackboard system comprises a frame unit having a holding section for holding a display surface and a write-in surface of the electronic blackboard at a specified height, a printer accommodating section for accommodating the printer therein, and a control unit accommodating section for accommodating the control unit therein, in which the control unit accommodating section, printer accommodating section, and holding section are arranged in the vertical direction in this order from the bottom.

BRIEF DESCRIPTION OF THE DRAWINGS

FIG. 71 is views showing identification of written-in points in the coordinate input device based on the first example of configuration according to Embodiment 5 of the present invention: (a) is a graph for explaining a cycle of detecting a written-in point, and (b) is a graph for explaining identification of two written-in points;

FIG. 72 shows graphs for explaining identification of a written-in point different from that in FIG. 71;

DETAILED DESCRIPTION OF THE PREFERRED EMBODIMENTS

The electronic blackboard system according to the present invention is described with reference to the attached drawings.

The electronic blackboard system according to Embodiment 1 will be described in detail in the order of:

1. System configuration,
2. Operation, and
3. Effects.

1. System Configuration

Figure 1:
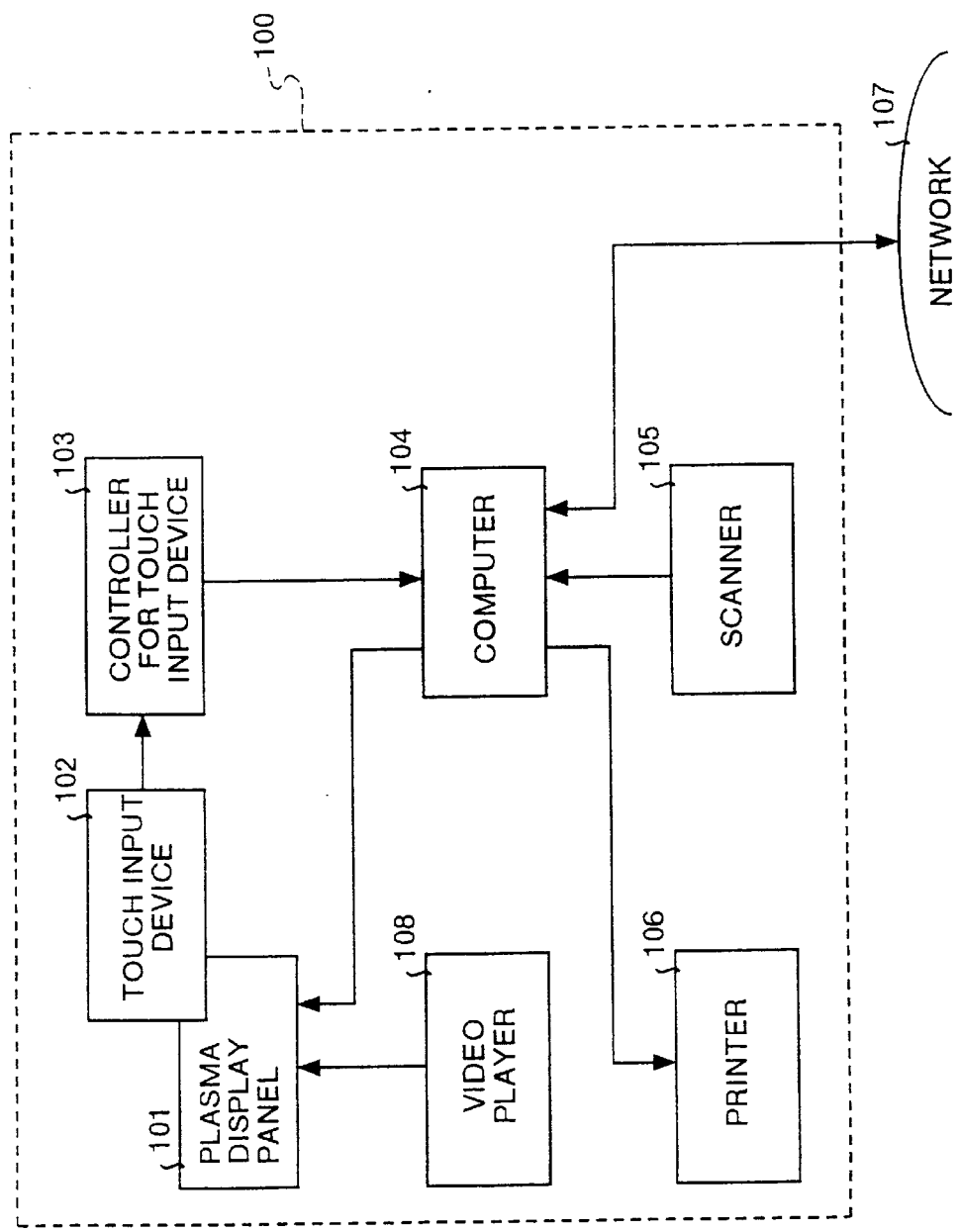
FIG. 1 is a block diagram showing an electronic blackboard system according to Embodiment 1 of the present invention.

FIG. 1 is a block diagram showing the electronic blackboard system according to Embodiment 1. The electronic blackboard system 100 shown in FIG. 1 mainly comprises a plasma display panel (Described "PDP" hereinafter) 101 for displaying the images, a touch input device 102 provided on the front surface of the PDP 101 and capable of inputting characters and graphics by touching a touch surface (write-in surface) with a fingertip or a touch pen, a controller for a touch input device (described "controller" hereinafter) 103 for performing an operation of calculation of a position of coordinates on the touch surface when touched with a fingertip or a touch pen, and a computer 104 (personal computer) for receiving positional information for coordinates from the controller 103 and providing controls over the system as a whole such as processing for illustrating characters and graphics inputted through the touch input device 102 onto the PDP 101.

Various types of peripheral equipment can be connected to the computer 104 of the electronic blackboard system 100. As an example, FIG. 1 shows a scanner 105 for reading images of a document and a printer 106 for outputting image data onto a recording paper are connected to the computer 104. Furthermore, the electronic blackboard system 100 can be connected to a network 107 through the computer 104, which allows data prepared by other computer that are connected on the network 107 to be displayed on the PDP 101 or data prepared by the electronic blackboard system 100 to be transferred to other computer.

Furthermore, a video input terminal and a speaker are provided in the PDP 101 although they are omitted from the figure, and by connecting various types of information equipment and AV equipment such as a video player 108, a laser disk player, a DVD player, or a video camera, the PDP 101 can be used as a large sized screen monitor.

Herein, a 40-inch or 50-inch large sized screen usable as an electronic blackboard is used as the PDP 101. A plasma display is employed as a display in Embodiment 1 because the plasma display has characteristics such that the display can be upsized, has high brightness so that it is not required to darken the room as required when a projector is used, and that a view field angle is wide as compared to that of a liquid crystal display and further moving images can smoothly be reproduced. As described above, as the plasma display is used, the display unit according to Embodiment 1 can be made thinner (minimized).

Figure 2:
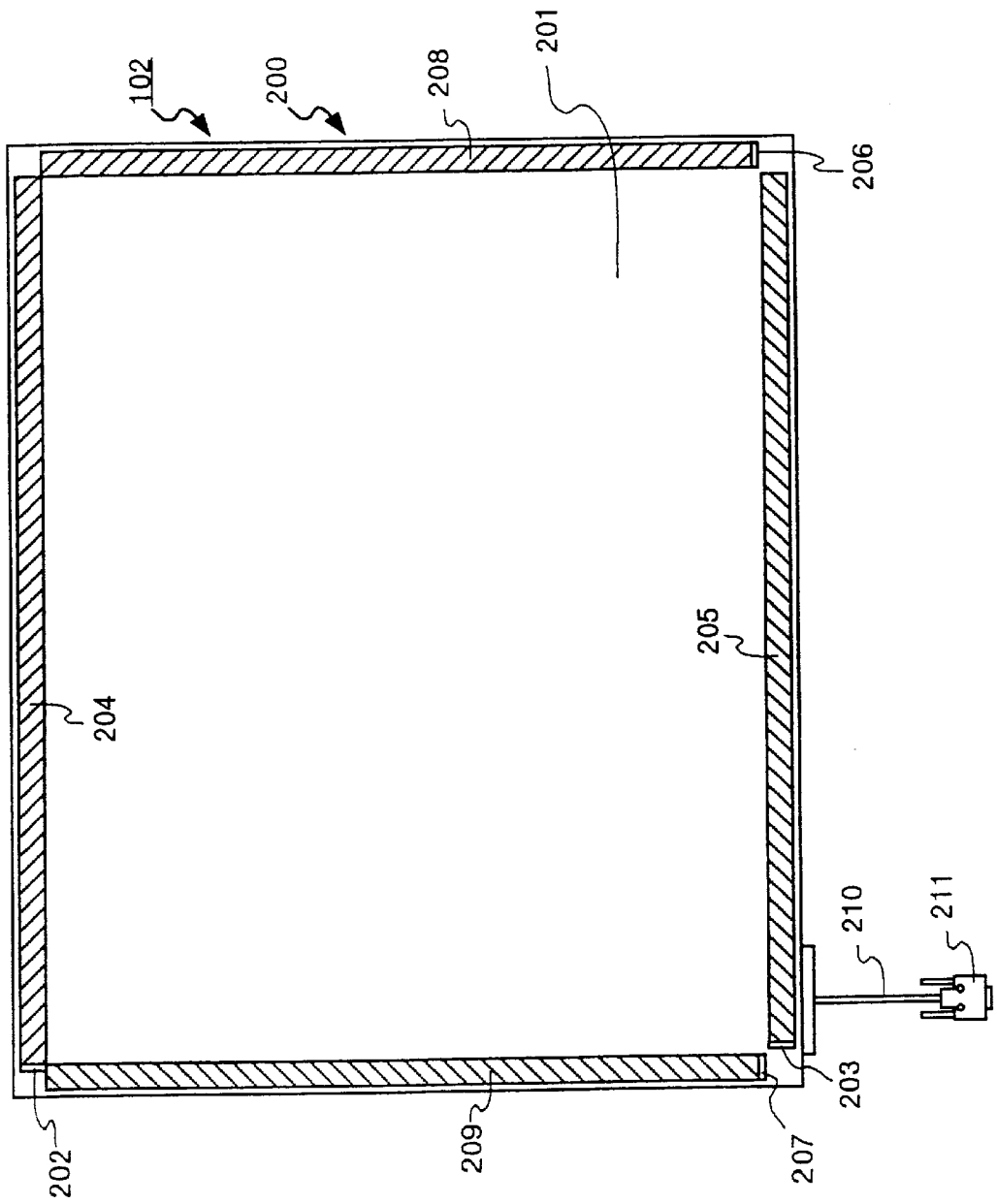
FIG. 2 is a view showing the touch input device constituting the electronic blackboard system according to Embodiment 1 of the present invention.

As a touch input device 102, a touch input device based on a ultrasonic wave surface elastic wave system is employed. FIG. 2 is a view showing the touch input device 102 used in the electronic blackboard system 100. This touch input device 102 comprises a transparent board 200, and one of surfaces of the board 200 as a touch surface (write-in surface) 201 for writing in characters and graphics with a fingertip or a touch pen comprises a transmitting transducer 202 for transmitting surface elastic waves, a receiving transducer 203 for receiving the surface elastic waves transmitted from the transmitting transducer 202, and reflection arrays 204, 205 each for reflecting the surface elastic waves transmitted from the transmitting transducer 202 and guiding the surface elastic waves to the receiving transducer 203, and also comprises a transmitting transducer 206 for transmitting the surface elastic waves, receiving transducer 207 for receiving the surface elastic waves transmitted from the transmitting transducer 206, and reflection arrays 208, 209 each for reflecting the surface elastic waves transmitted from the transmitting transducer 206 and guiding the surface elastic waves to the receiving transducer 207 respectively. It should be noted that a touch surface 201 has a size corresponding to a screen size of the PDP 101.

In FIG. 2, the transmitting transducers 202, 206 and receiving transducers 203, 207 are connected to the controller 103 through a cable 210 and a connector 211 respectively. The cable 210 is preferably wired so that it passes the shortest distance from the transmitting transducers 202, 206 to the receiving transducers 203, 207 along the edge of the board 200, but the figure thereof is omitted herein.

When the cable 210 is connected to the receiving transducers 203. 207, it is required to peel a shield layer of the cable 210 therefrom and to be connected to the receiving transducer 203 and 207. Therefore, a portion of the cable 210 without the shielded layer works as an antenna, and receives the electromagnetic waves generated from the PDP 101 as a noise, therefore, a shielding member such as a copper shielding tape (copper foil tape) is provided between the PDP 101 and the board 200. When the PDP 101 is combined with the touch input device 102 based on a ultrasonic wave surface elastic wave system, this shielding tape is provided because the inventors of the present invention have found that the touch input device 102 does not work with high precision because it is affected by the electromagnetic waves generated by the PDP 101.

Figure 3:
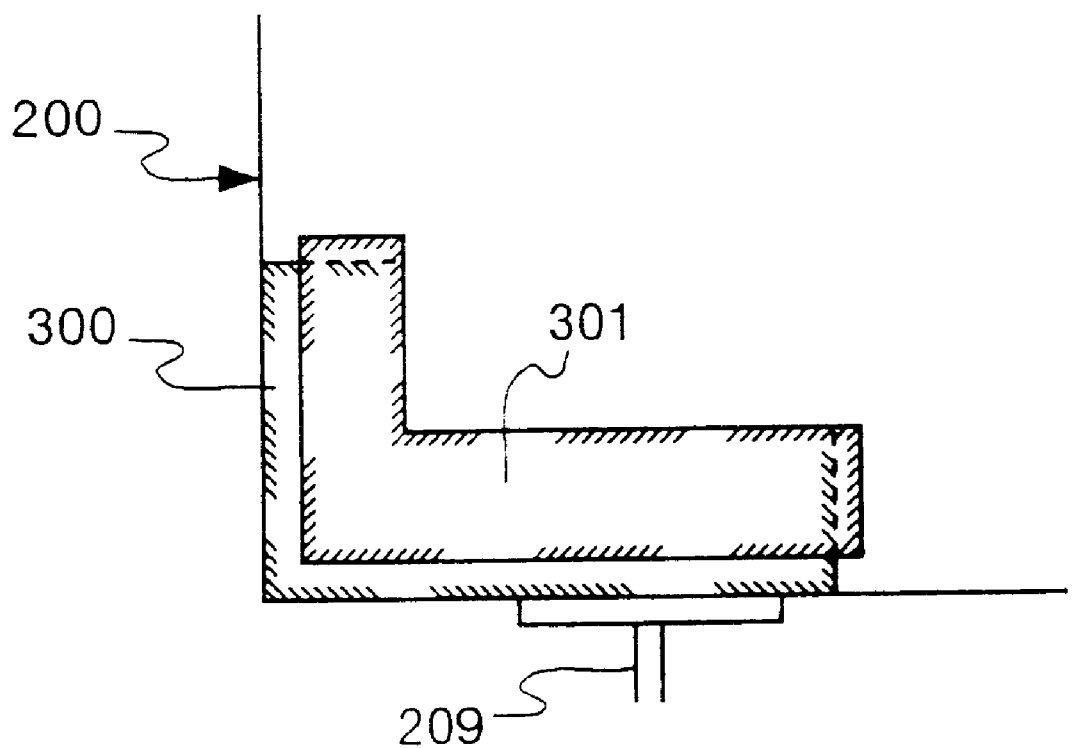
FIG. 3 is an explanatory view for illustrating a shielding tape provided between a PDP and a board of the touch input device in the electronic blackboard system according to Embodiment 1 of the present invention.

FIG. 3 is an explanatory view showing this shielding tape. FIG. 3 shows a state of a portion on the board 200 in which the receiving transducers 202, 206 are provided when viewed from the touch surface 201, and the shielding tape 300 is adhered to a surface opposite to the PDP 101 of the board 200 (a surface opposite to the touch surface 201) with a masking tape 301 therebetween. This shielding tape 300 shown in FIG. 3 has a L-shape and it is confirmed as a result of experiments that a width of 35 mm±3 mm, a length in the longitudinal direction of the board 200 of 70 mm±20 mm, and a length in the lateral direction of the board 200 of 130 mm±20 mm is optimal.

It should be noted that, in FIG. 3, the shielding tape 300 is provided between the PDP 101 and the board 200 so as to cover the receiving transducers 203 and 207, but further provision of the same shielding tape in the touch surface 201 can enhance noise control. In this case, the receiving transducers 203 and 207 may be covered with one sheet of shielding tape. However, when providing a shielding tape in the side of touch surface, it is required to take care so that the shielding tape does not come in contact with the reflecting arrays 205 and 209.

As the board 200, any type of material such as glass plastic may be used on condition that it is transparent and can propagate surface elastic waves. When the board 200 is a glass board, for example, the reflecting arrays 204, 205, 208 and 209 are formed by baking a glass board 200 at a specified temperature after a screen is printed with glass paste.

Figure 4:
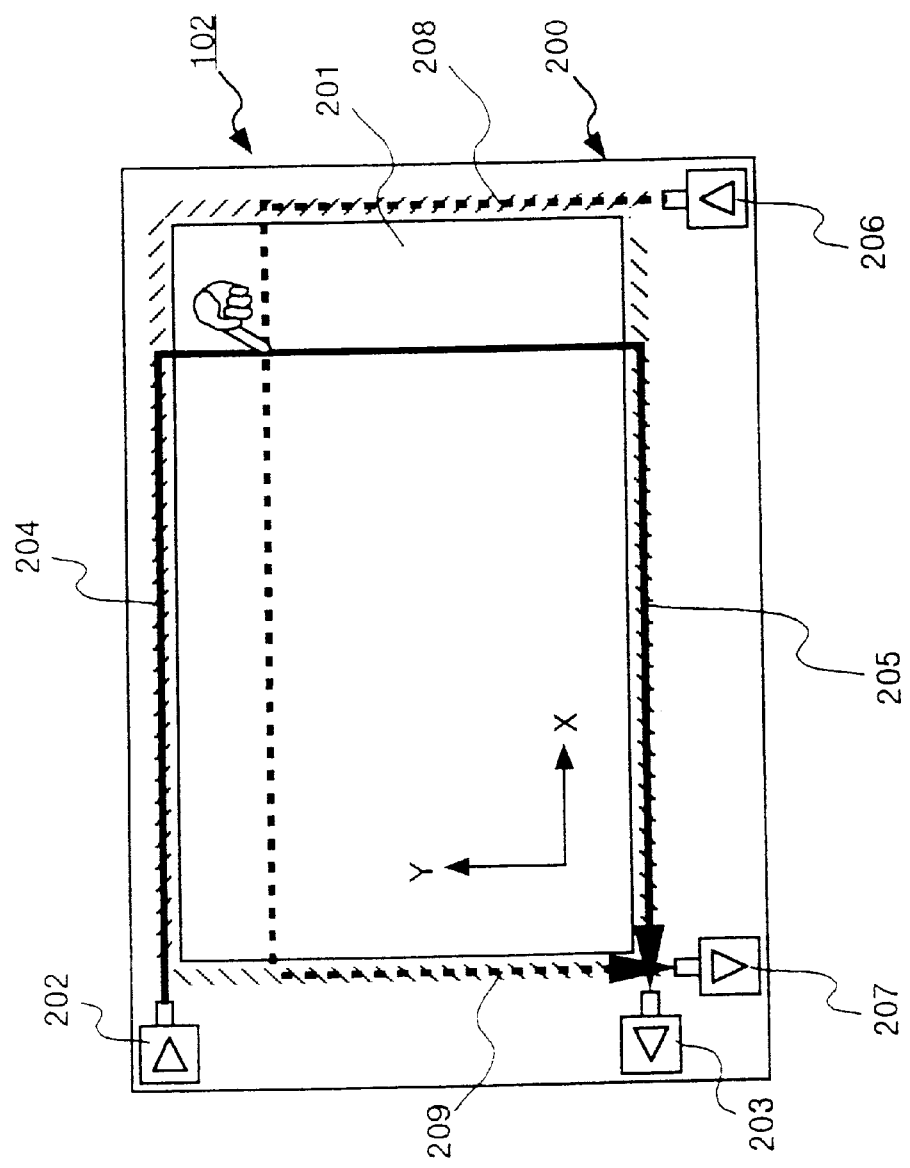
FIG. 4 is an explanatory view for illustrating the processing of identifying coordinates of a touch position in the electronic blackboard system according to Embodiment 1 of the present invention.

Then, description is made for an outline of a method of identifying the coordinates of a position at which the touch surface is touched with a user's fingertip or a touch pen. FIG. 4 is an explanatory view for illustrating processing of identifying coordinates of the touch position. In FIG. 4, the transmitting transducer 202 and the receiving transducer 203 are used for detecting a position of the touch in the X-axial direction, and the transmitting transducer 206 and the receiving transducer 207 are used for detecting a position of the touch in the Y-axial direction. Herein, description is made mainly for processing of detecting a position in the X-axial direction thereof for convenience of the description.

The processing to identify coordinates of a touch position is executed by the touch input device 102 and the controller 103. The transmitting transducer 202 receives an electric signal from the controller 103 and converts the received electric signal to a mechanical vibration. As a result, there surface elastic waves propagating along the surface of the touch surface 201 of the board 200 or along the interface between the board 200 and the touch surface 201 are generated.

The surface elastic waves generated by the transmitting transducer 202 is reflected by 90 degrees with reflecting elements constituting the reflecting array 204 in the order from one closer to the transmitting transducer 202 to propagate along the touch surface 201. Namely, a phenomenon such that a portion of the surface elastic waves is reflected with the reflecting elements constituting the reflecting array 204 and a portion thereof is passed through the elements is repeated, and the surface elastic waves propagate over the entire touch surface 201. The surface elastic waves reflected by each of the reflecting elements constituting the reflecting array 204 propagate along the touch surface 201 in parallel to the longitudinal direction of the touch surface 201 and with a time difference based on a position of any reflecting element on which the wave is reflected. Then the reflecting array 205 reflects the surface elastic waves propagating along the touch surface 201 by 90 degrees and guides the reflected surface elastic waves to the receiving transducer 203.

The receiving transducer 203 receives the surface elastic waves, converts the received waves into an electric signal, and inputs the electric signal into the controller 103. The controller 103 amplifies the received electric signal and subjects it to rectification and A/D conversion. Then, the controller 103 matches a position in the X-axial direction in the touch surface 201 with a time by subjecting the A/D converted signal to signal processing along the time axis.

For example, as shown in FIG. 4, it is assumed that a user touches an arbitrary position on the touch surface 201 with his fingertip. In this case, the surface elastic waves propagating on the touch position are absorbed or dispersed by the fingertip, and are largely attenuated. By identifying a point of time when the wave is attenuated as described above according to the result of signal processing, a position of the touch in the X-axial direction can be identified. Specifically, as shown in FIG. 4, a solid line crossing the touch surface 201 is identified as a position in the X-axial direction of the touch position.

The touch position in the Y-axial direction can be identified by executing the same processing as that for identifying a position in the X-axial direction by using the transmitting transducer 206, receiving transducer 207 and reflecting arrays 208 and 209. Specifically, as shown in FIG. 4, a dotted line crossing the touch surface 201 is identified as a position in the Y-axial direction of the touch position.

The controller 103 identifies the positions in the X-axial direction as well as in the Y-axial direction as described above, and inputs positional information for coordinate into the computer 104 shown in FIG. 1. The computer 104 executes various processing described later such as processing such as matching of a mouse at a position on the touch surface 201 touched by a user and the position is displayed on the PDP 101 according to the received positional information for coordinates.

It should be noted that the surface elastic waves at the time of being received by the receiving transducers 203 and 207 is attenuated due to reflection by the reflecting array as well as to propagation along the touch surface 201, and an electric signal outputted from the receiving transducers 203 and 207 is extremely low. Accordingly, when noise such as the electromagnetic waves generated from the PDP 101 is mixed in the signal, it is impossible to detect attenuation of the surface elastic waves when the touch surface 201 is touched due to influence of the noise. The shielding tape 300 shown in FIG. 3 is provided to prevent generation of the state described above, and coordinates of the touched position can be detected with high precision in Embodiment 1 due to existence of this shielding tape 300. In other words, this shielding tape 300 has a great role to enable employment of a plasma display as a display unit used with the touch input device 102 based on a ultrasonic wave surface elastic wave system.

Figure 5:
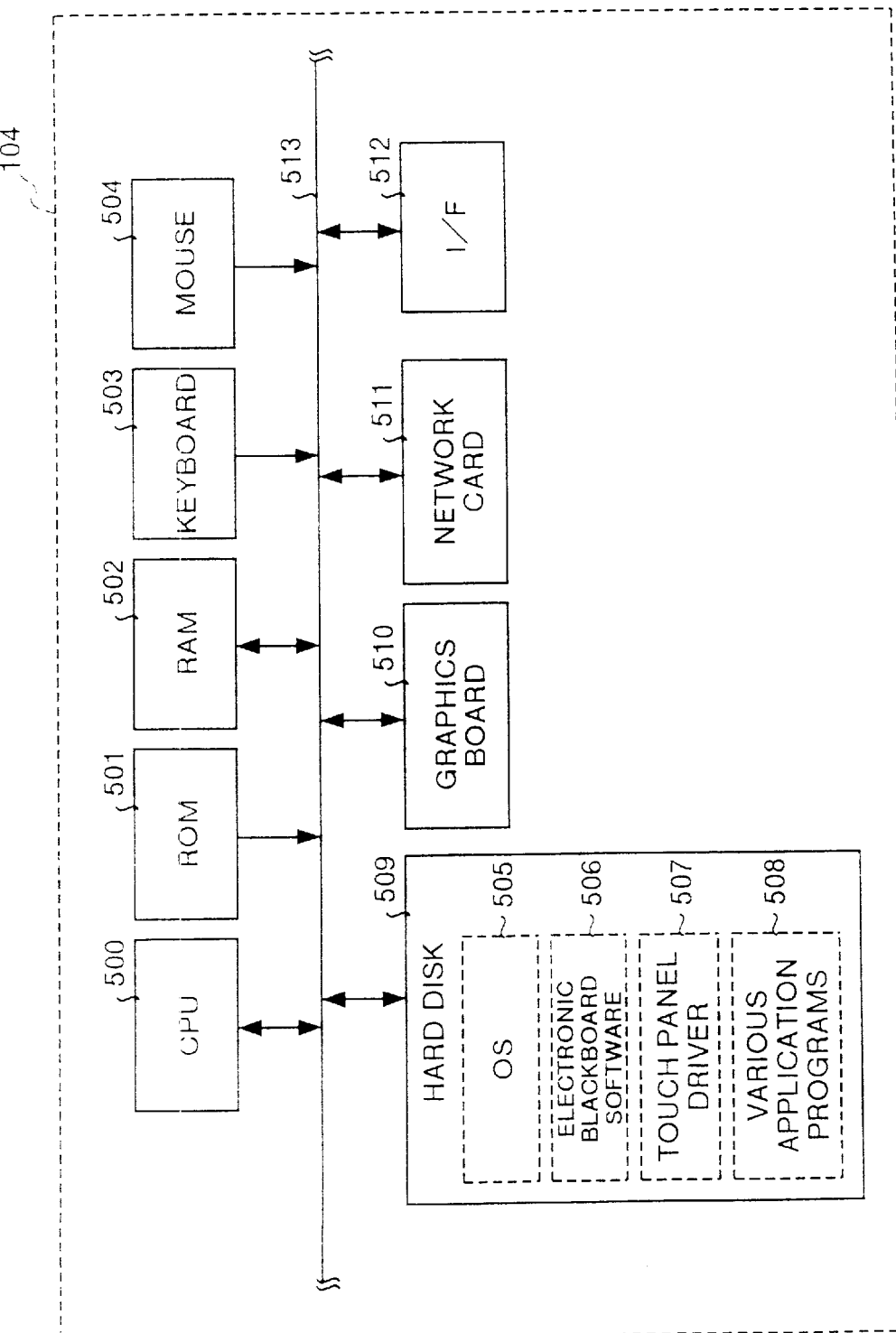
FIG. 5 is a block diagram showing the computer (personal computer) constituting the electronic blackboard system according to Embodiment 1 of the present invention.

Then, description is made for general configuration of the computer 104 shown in FIG. 2. FIG. 5 is a block diagram of the computer 104. The computer 104 shown in FIG. 5 is a personal computer which comprises a CPU 500 for providing controls over the entire system; a ROM 501 for storing therein a boot program or the like; a RAM 502 used as a work area of the CPU 500; a keyboard 503 used for inputting characters, numerical values, and various instructions or some other data; a mouse 504 for moving a cursor and selecting an area; an operating system (OS) 505; electronic blackboard software 506 for making the electronic blackboard system 100 function as an electronic blackboard; a touch panel driver 507 for making the touch input device 102 and controller 103 operate on the computer 104 as a coordinate input device; a hard disk 509 for storing various application programs 508 such as word processor and spreadsheet software; a graphics board 510 connected to the PDP 101 for providing controls over displays of images to the PDP 101; a network card 511 (or may be a modem) for connecting the electronic blackboard system 100 to the network 107 through the computer 104; an interface (I/F) 512 for connecting thereto the controller 103, scanner 105 and printer 106; and a bus 513 for connecting the above mentioned component devices to each other.

Although the interface for connecting peripheral equipment to the computer 104 is shown as one block indicated by I/F 512 in FIG. 5 for convenience, I/F 512 actually comprises a serial interface such as RS-232C for connecting thereto the controller 103, a parallel interface such as Centronics for connecting thereto the printer 106, and a SCSI for connecting thereto a scanner.

It should be noted that, as shown in FIG. 1, the controller 103 is configured independently from the computer 104, however, the controller 103 may be built in inside the computer 104. Although not shown in FIG. 5 a floppy disk drive, a CD-ROM drive, and an MO drive are incorporated in the computer 104.

The component devices constituting the electronic blackboard system 100 as described above are accommodated in the frame unit in an integrated form, and downsizing of a system as a whole, operability, adaptability for handling and convenience can be improved. The electronic blackboard system 100 is accommodated in the frame unit as described above is because, a wide space for installation thereof is required if the component devices are discretely managed and a long time is required for moving it from a place to another place as the electronic blackboard system 100 comprises a plurality of component devices as shown in FIG. 1.

Figure 6:
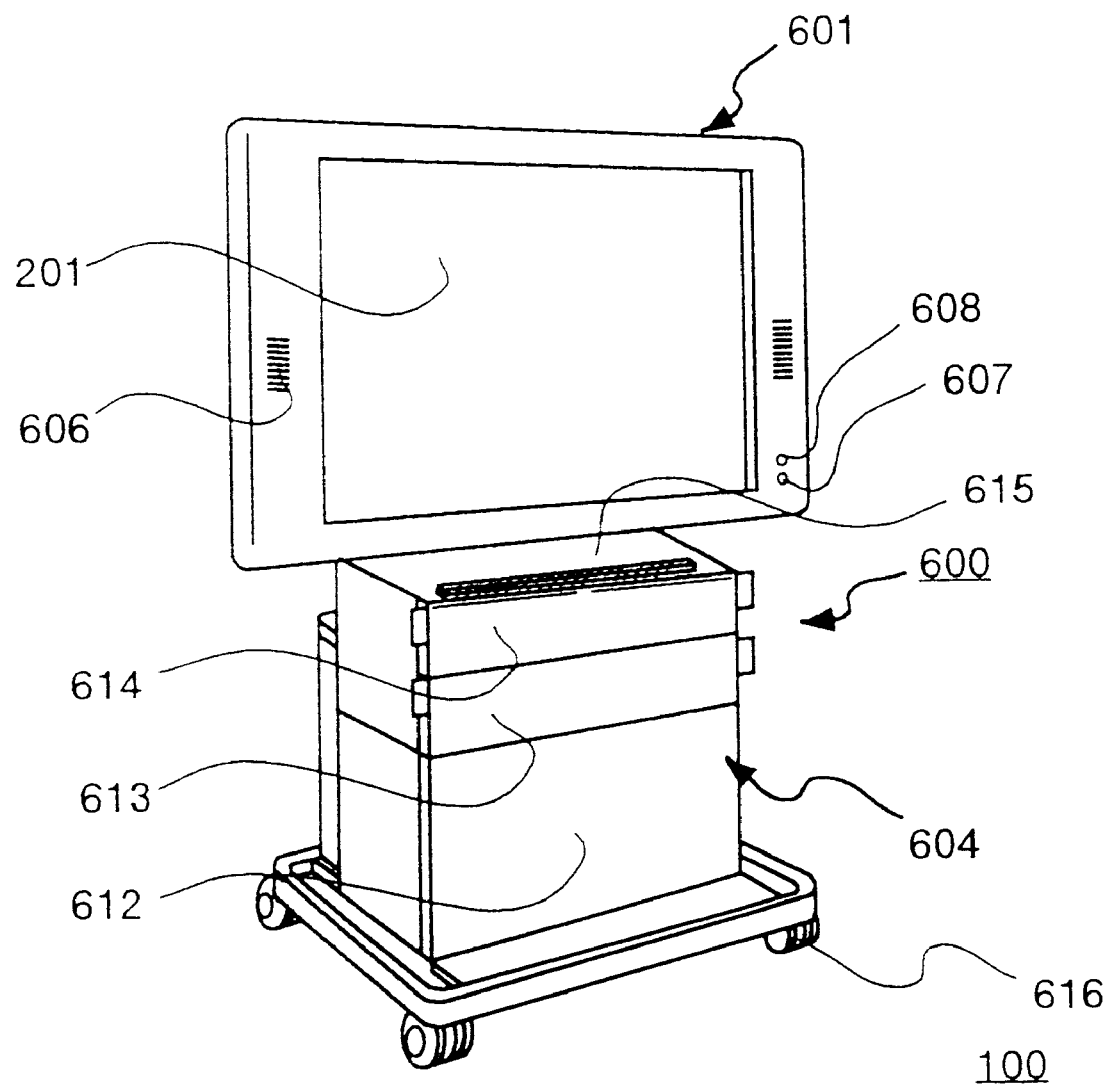
FIG. 6 is a perspective view of the frame unit with the electronic blackboard system according to Embodiment 1 of the present invention accommodated therein viewed from the front side thereof.
Figure 7:
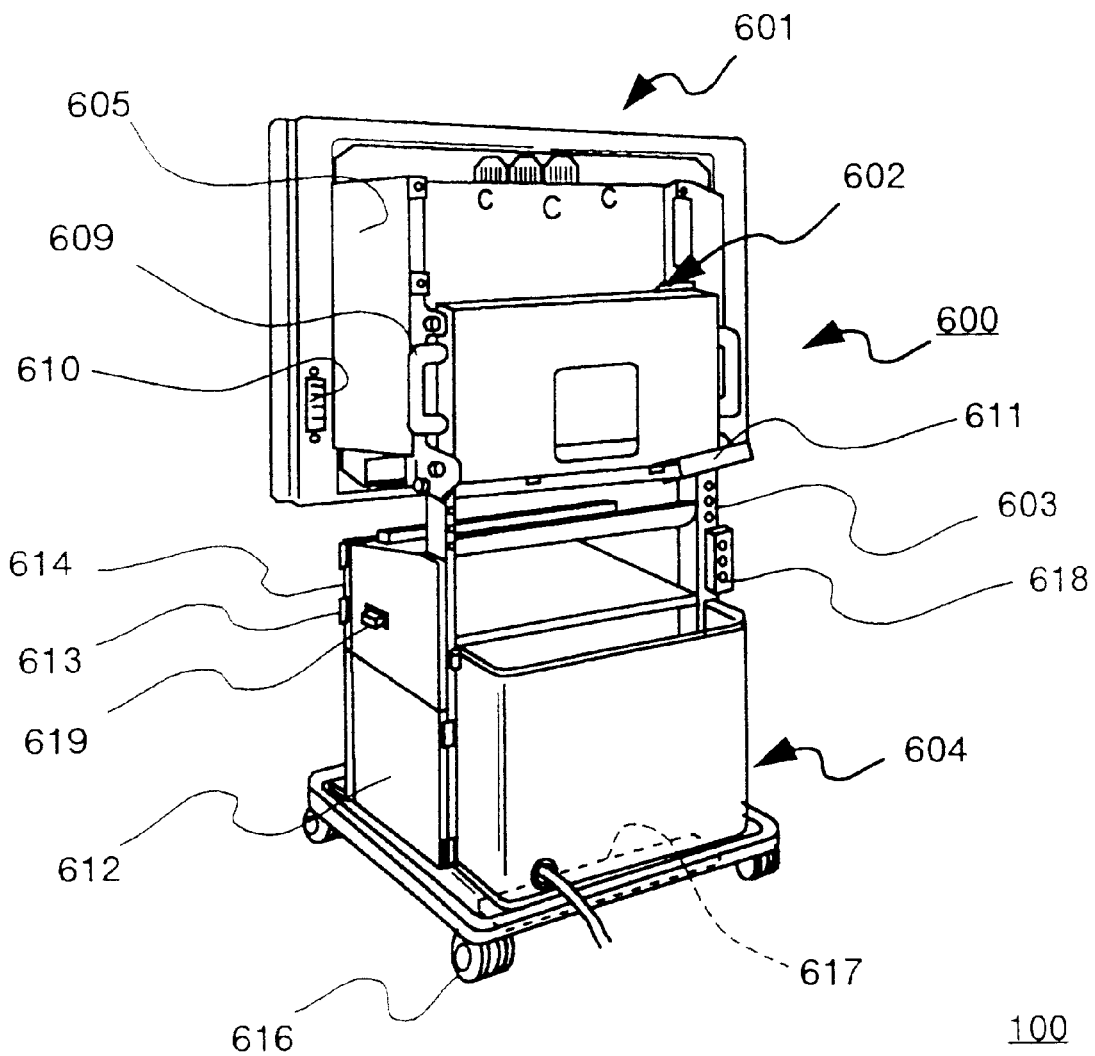
FIG. 7 is a perspective view of the frame unit with the electronic blackboard system according to Embodiment 1 of the present invention accommodated therein viewed from the rear side thereof.

FIG. 6 is a perspective view of the frame unit with the electronic blackboard system 100 accommodated therein viewed from the front side thereof, and FIG. 7 is a perspective view thereof viewed from the rear side thereof. The frame unit 600 shown in FIG. 6 and FIG. 7 comprises a panel section 601 for accommodating the PDP 101 and touch input device 102 therein; a controller accommodating section 602 for accommodating the controller 103 therein; a stand 603 for supporting the panel section 601 and the controller accommodating section 602 at a specified height; and an equipment accommodating section 604 for accommodating the computer 104, scanner 105, printer 106, and a video player 108 or the like therein.

The PDP 101 and touch input device 102 are integrated so that the touch input device 102 is positioned in front of the PDP 101, and as shown in FIG. 6, the touch input device 102 is accommodated in the panel section 601 so that the touch surface 201 of the touch input device 102 appears in the front section of the panel section 601. As described above, the panel section 601 accommodates therein the PDP 101 and touch input device 102, and constitutes a display surface and a write-in surface (touch surface 201) of the electronic blackboard.

Furthermore, the controller 103 is accommodated, as shown in FIG. 7, in the controller accommodating section 602 provided in the rear surface of the panel section 601. The panel section 601 is mounted on the stand 603 of the equipment accommodating section 604 through a stay 605 to be supported so that the image display surface of the PDP 101 and the touch surface 201 of the touch input device 101 are positioned at a specified height. The controller accommodating section 602 is also mounted on the stand 603.

It should be noted that, in the front side of the panel section 601 shown in FIG. 6, the reference numeral 606 indicates a speaker and the reference numeral 607 indicates a power lamp of the PDP 101. Furthermore, in the electronic blackboard system 100 according to Embodiment 1, although detailed description is omitted herein, switching of output sources of images to the PDP 101 of the computer 104 and the video player 108 and adjustment of a volume can be operated with a remote control unit, and the reference numeral 608 corresponds to a remote control light receiving section for receiving light from a remote control unit.

Designated at the reference numeral 609, in the rear surface of the panel section 601 shown in FIG. 7, is a handle for moving the electronic blackboard system 100, at 610 a control panel for setting brightness and contrast or the like of the PDP 101, and at 611 an angle adjusting lever for adjusting the angle of the panel section 601 described later respectively. Furthermore, a connector panel for connecting the computer 104 and video player 108 to the PDP 101 and controller 103 is provided in the bottom surface of the controller accommodating section 602 although it is not shown in the figure.

Namely, an image output cable and an audio output cable for the computer 104 are connected to the PDP 101 through this connector panel, and the computer 104 and controller 103 are connected to each other through this connector panel. Furthermore, various types of information equipment and AV equipment such as a video player 108 are connected to the PDP 101 through this connector panel.

The equipment accommodating section 604 of the frame unit 600 comprises a computer accommodating section 612 for accommodating the computer 104 therein, a video accommodating section 613 for accommodating various information equipment and AV equipment such as a video player 108, a laser disk player, or a DVD player and a printer accommodating section 614 for accommodating the printer 106 in the vertical direction from the bottom thereof. As described, by arranging the devices in the order of the heaviest one to a lighter one from the bottom in the vertical direction, stability of the frame unit 600 at the time of movement and installation thereof can be insured even if there is the board section 601 having the PDP 101 and touch input device 102 in the upper side. Although an accommodating section for accommodating the scanner 105 shown in FIG. 1 is not provided in the equipment accommodating section 604, the accommodating section for the scanner 105 may be provided therein on the condition that the devices are arranged in the order of the heaviest one to a lighter one from the bottom in the vertical direction.

The computer accommodating section 612 has doors on both sides thereof, through which a floppy disk and a CD-ROM are insertable thereinto. The video accommodating section 613 has a door on the front side thereof, through which a video tape and a laser disk are insertable thereinto. Furthermore, the printer accommodating section 614 has a door on the front side thereof, through which a printer can be operated, and there is a place on this door so that a touch pen (not shown in the figure) used for touching the touch surface 201 of the touch input device 102 can be accommodated therein. In addition, the rear surface of the printer accommodating section 614 is not covered with the frame, therefore, the printer 106 can be accommodated with a paper feed tray positioned at the external side of the frame unit 600 (Refer to FIG. 8), and operability can be enhanced.

It should be noted that, in the front side of the equipment accommodating section 604 shown in FIG. 6, the reference numeral 615 indicates a keyboard base for placing thereon a keyboard 503 for the computer 104 so that it can be used at any time, and the reference numeral 616 indicates casters for moving the electronic blackboard system 100 with the entire frame unit 600. Designated at the reference numeral 617, in the rear surface of the equipment accommodating section 604 shown in FIG. 7, is a power tap for supplying power to the PDP 101, controller 103, and computer 104, at 618 a cable guide for wiring various cables, and at 619 a main power switch for the electronic blackboard system 100 respectively.

As described above, by accommodating the electronic blackboard system 100 in the frame unit 600, the electronic blackboard system 100 can easily be moved and installed only by moving the frame unit 600. Furthermore, stability of the frame unit 600 when it is moved and installed can be insured because the devices are arranged in the order of the heaviest one to a lighter one from the bottom in the direction of gravity (vertical direction) in the equipment accommodating section 604 of the frame unit 600.

Furthermore, taking into consideration that, for instance, light of a fluorescent tube directly enters the display surface of the PDP 101, which may cause an image appearing on the PDP 101 to be difficult to be seen, an angle adjusting mechanism section for adjusting an angle of the board 601 (a display surface and a write-in surface of a electronic blackboard) is provided in the frame unit 600 described above. Then, description is made for an example of configuration of this angle adjusting mechanism section.

Figure 8:
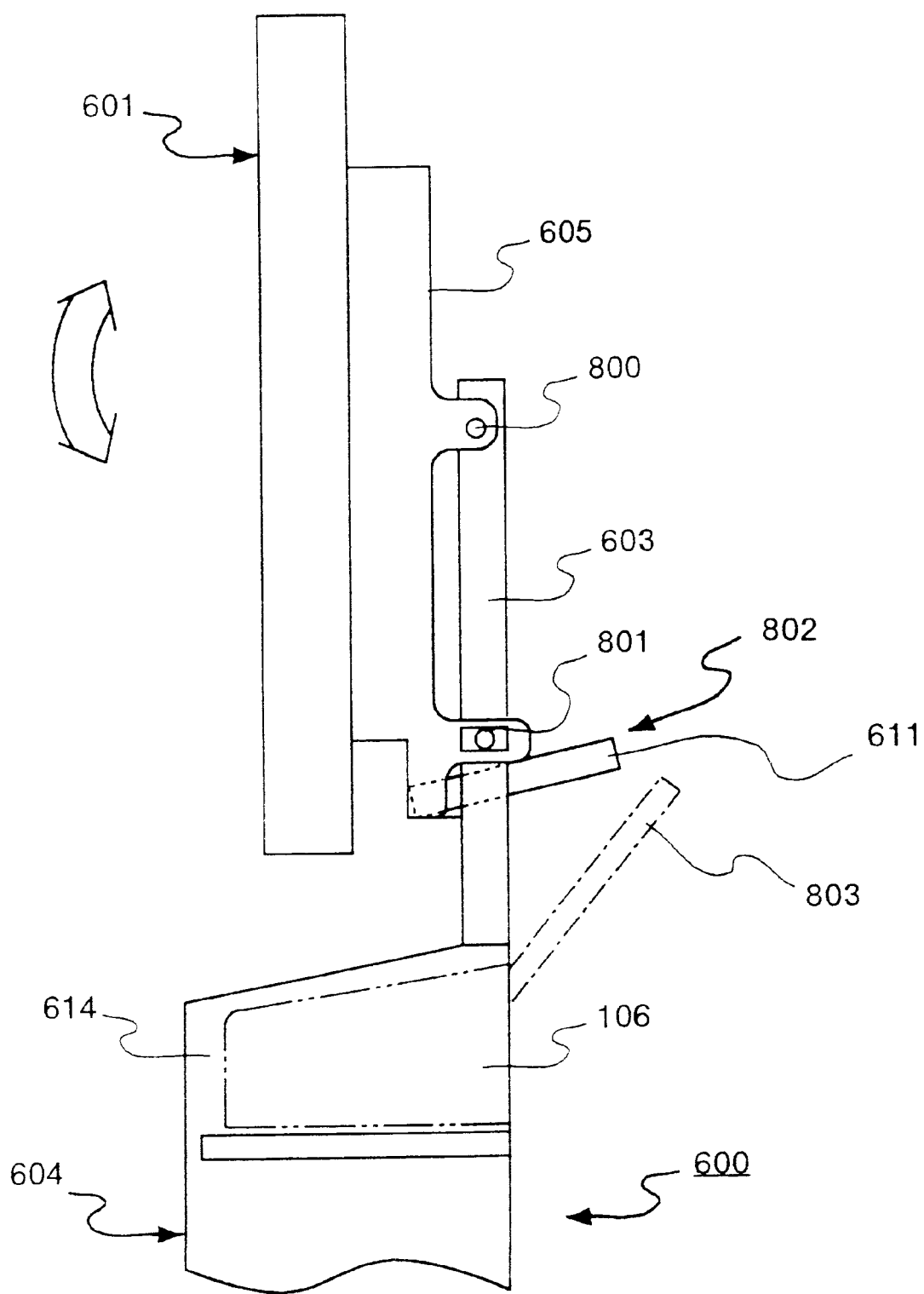
FIG. 8 is a side view of the frame unit according to Embodiment 1 of the present invention viewed from the right side thereof.

FIG. 8 is a side view of the frame unit 600 viewed from the right side thereof. In FIG. 8, the reference numeral 800 indicates a pivotal supporting point, and the reference numeral 801 indicates a pivotal guide, and the board section 601 is rotatably mounted on the stand 603 existing in both sides of the frame unit 600 around the pivotal supporting point 800 through the stay 605. Namely, the board section 601 can be rotated in the direction indicated by the arrow in FIG. 8 around the pivotal supporting point 800 just like nodding so that an angle at which light of a fluorescent tube is not reflected into the PDP 101 can be adjusted. Herein the pivot guide 801 restricts an angle of the board section 601 rotating around the pivotal supporting point 800, and the angle adjusting lever 611 rotates the board section 601 through a mechanism described later to adjust an angle thereof.

In Embodiment 1, it is assumed that the angle of the board section 601 can be adjusted in a range from zero degree (the board section 601 in an upright position) to five degrees (the board section 601 in a downward-slanding position) with an operation of the angle adjusting lever 611. It is also assumed that the angle adjusting mechanism section 802 comprises the pivotal supporting point 800, pivot guide 801, angle adjusting lever 611, and each component member described below.

It should be noted that, in FIG. 8, the reference numeral 803 indicates a tray for the printer 106 accommodated in the printer accommodating section 614. As shown in FIG. 8, the angle adjusting lever 611 for adjusting an angle of the board section 601 is provided at a certain position so as not to interfere with feeding of recording paper to the tray 803.

Figure 9:
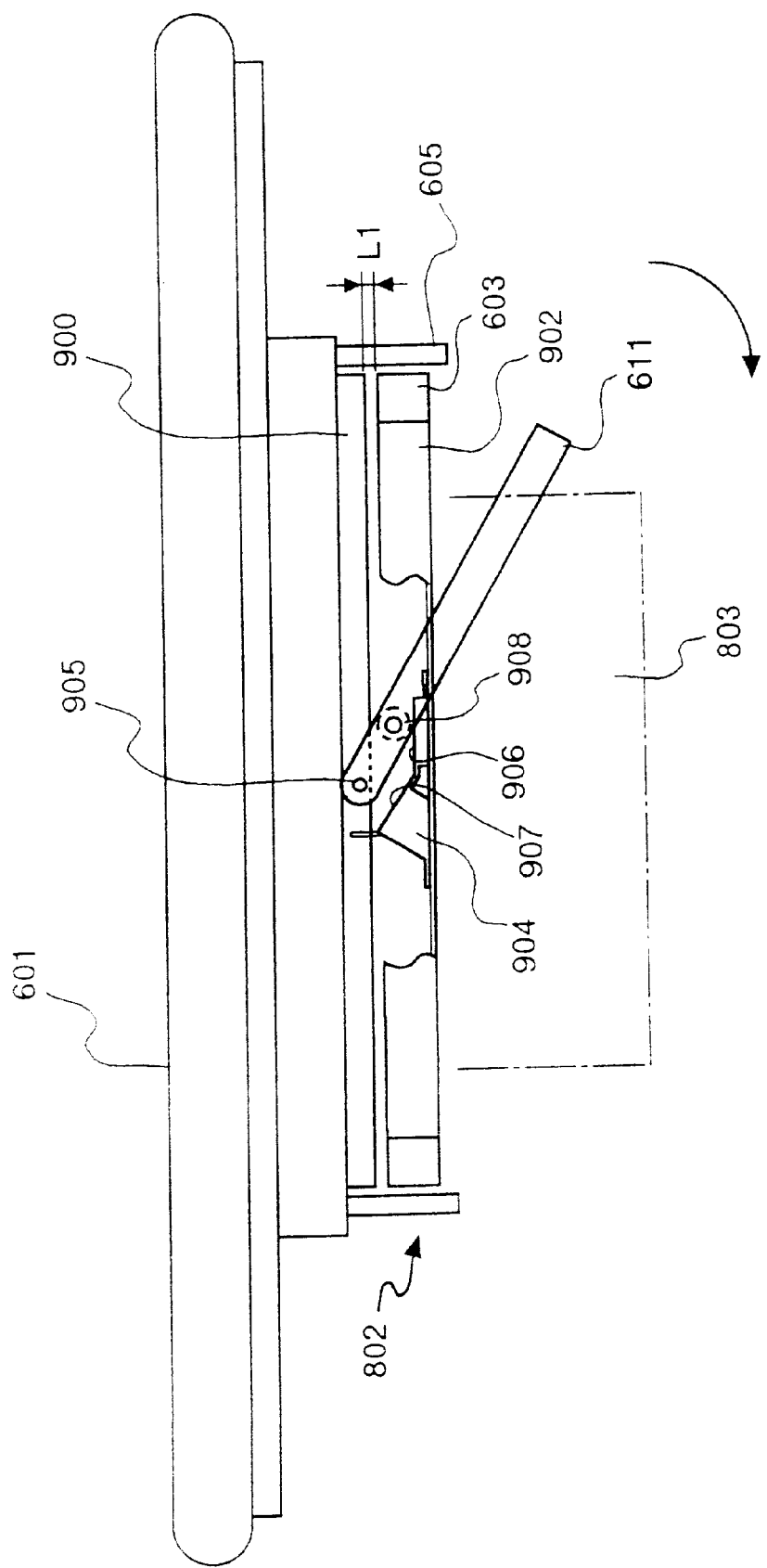
FIG. 9 is a view showing configuration of an angle adjusting mechanism section according to Embodiment 1 of the present invention viewed from the upper side of the frame unit (angle of the board section is five degrees)
Figure 10:
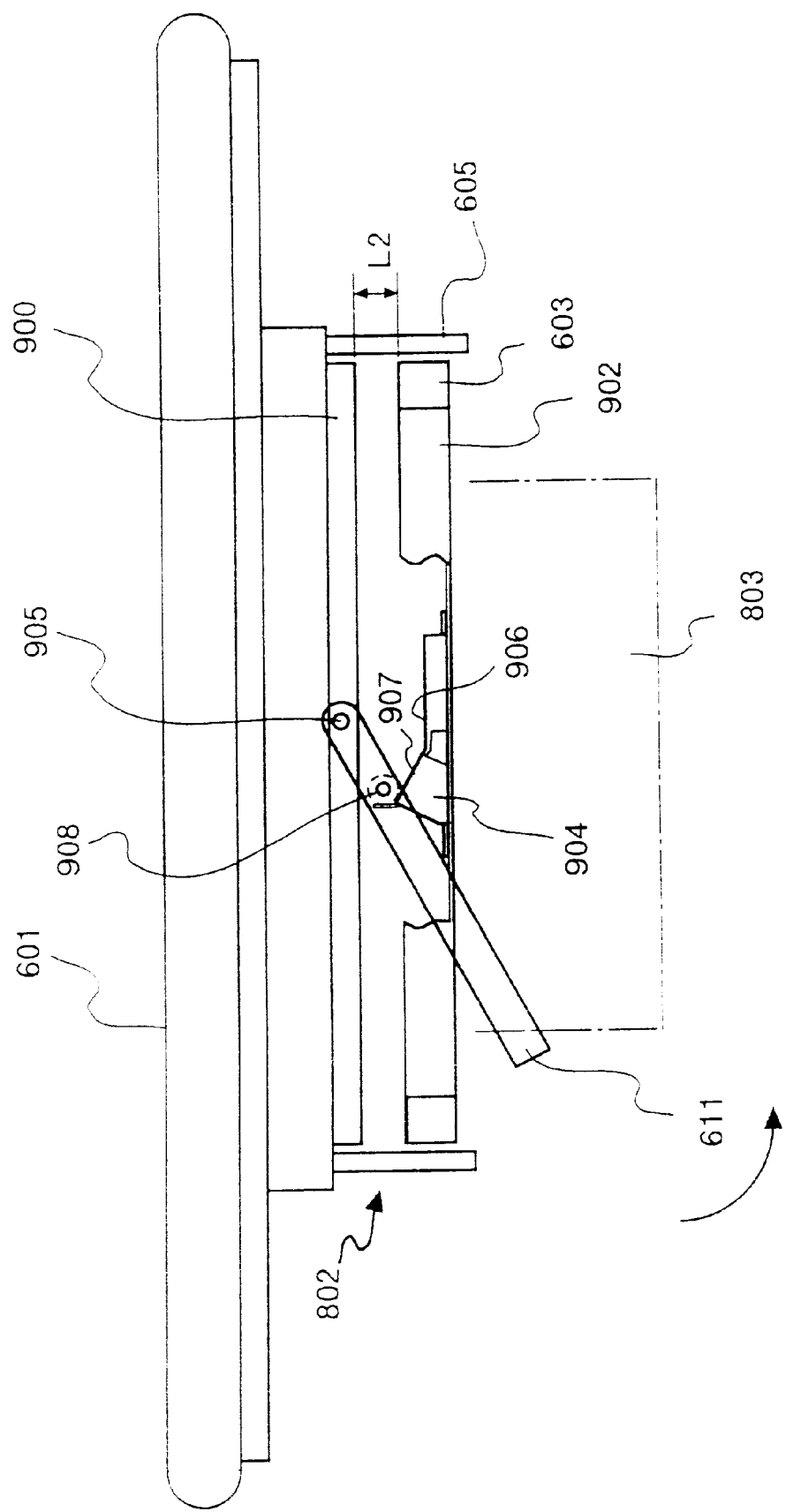
FIG. 10 is a view showing configuration of the angle adjusting mechanism section according to Embodiment 1 of the present invention viewed from the upper side of the frame unit (angle of the board section is zero degree)

FIG. 9 and FIG. 10 are view showing configuration of the angle adjusting mechanism section 802 viewed from the upper side thereof respectively, and FIG. 9 shows the board section 601 positioned at an angle of five degrees and FIG. 10 shows the board section 601 positioned at an angle of zero degree. Furthermore, FIG. 11 is a view showing configuration of the angle adjusting mechanism section 802 shown in FIG. 9 and FIG. viewed from the side thereof, and the figure corresponds to the board section 601 shown in FIG. 10 positioned at an angle of zero degree.

Figure 11:
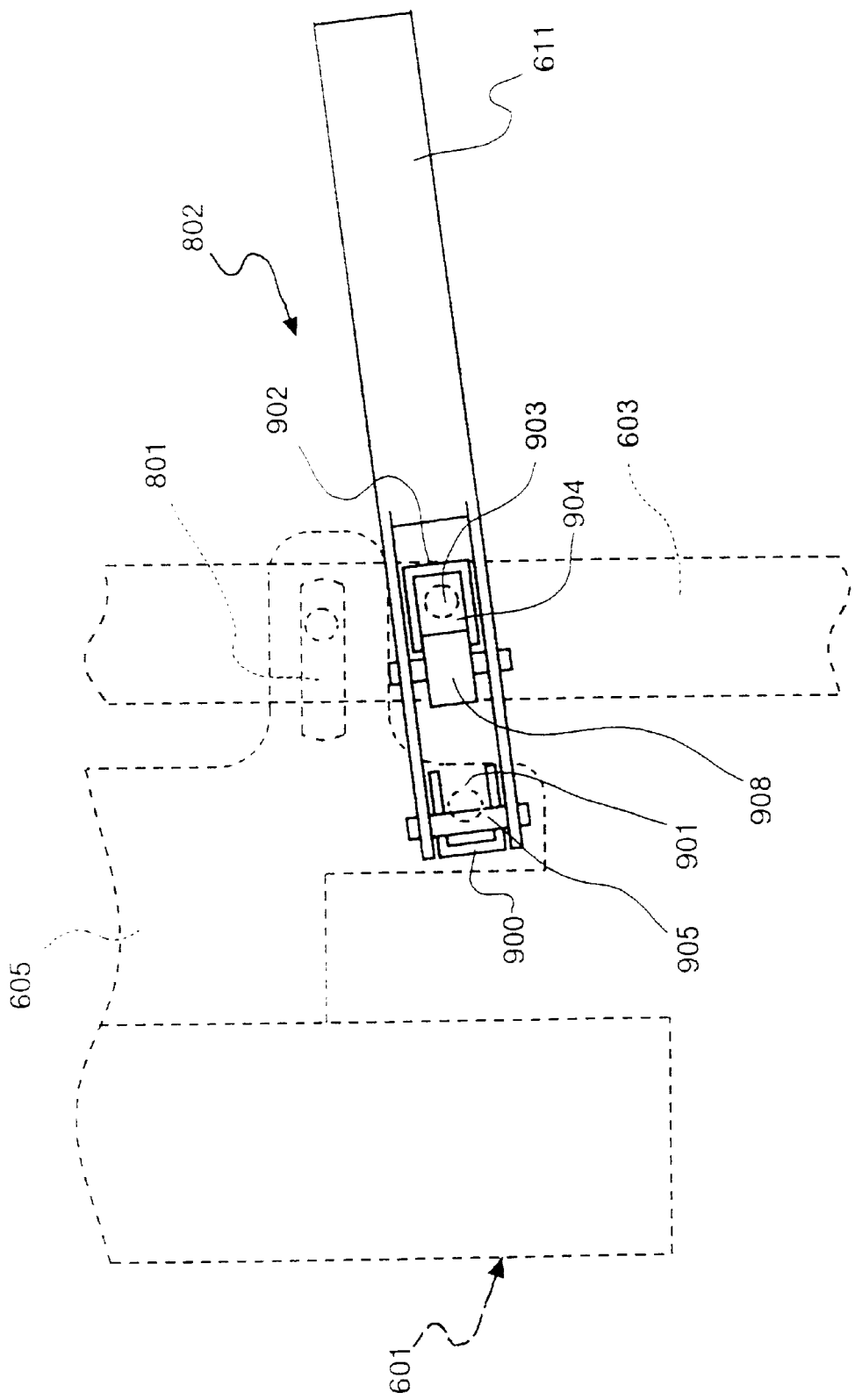
FIG. 11 is a view showing configuration of the angle adjusting mechanism section according to Embodiment 1 of the present invention viewed from the side of the frame unit.

In FIG. 9 to FIG. 11, the reference numeral 900 indicates a PDP angle pivotally mounted between the stays 605 with a PDP supporting point 901, and the reference numeral 902 indicates a stand stay pivotally mounted between the stands 603 with a stand supporting point 903 and with a lever bearer 904 used for angle adjustment of the board section 601 together with the angle adjusting lever 611 mounted thereon.

The angle adjusting lever 611 has a shape for sandwichably holding the PDP angle 900 and the stand stay 902 therebetween and is pivotally mounted on a lever supporting point 905 in the side of the PDP angle 900. In addition, provided in the angle adjusting lever 611 is a bearing 908 contacting a flat section 906 as well as a slant section 907 of the lever bearer 904 mounted on the stand stay 902 for rotating in association with pivot of the angle adjusting lever 611.

Herein, it is assumed that the angle adjusting mechanism section 802 is in a state shown in FIG. 9 and the board section 611 is positioned at an angle of five degrees. When a user operates the angle adjusting lever 611 to the left direction (to the direction indicated by the arrow in the figure), the angle adjusting lever 611 pivots around the lever supporting point 905, the bearing 908 of the angle adjusting lever 611 moves along the flat section 906 of the lever bearer 904 in association with the pivot and also moves upward along the slope of the slant section 907, and as a result, force to push out the PDP angle 900 forward is generated. Namely, the lever bearer 904 is fixed to the stand 603 through the stand stay 902, and the PDP angle 900 is mounted on the stays pivotally supporting the board section 601 at the pivotal supporting points 800 and the pivot guides 801, therefore, the board section 601 can be rotated together with the PDP angle 900 (the lower edge of the board section 601 can be pushed forward) with by operating the angle adjusting lever 611.

Through this operation of the angle adjusting lever 611, the angle adjusting mechanism section 802 is changed from the state shown in FIG. 9 to that shown in FIG. 10, and an angle of the board section 601 can be changed from five degrees to zero degree. Namely, as shown in FIG. 9 and FIG. 10, by enlarging a space between the PDP angle 900 and the stand stay 902 from L1 to L2, the angle of the board section 601 can be changed from five degrees to zero degree.

Similarly, when a user operates the angle adjusting lever 611 from the state shown in FIG. 10 to the right direction (in the direction indicated by the arrow in the figure), the angle of the board section 601 can be changed from zero degree to five degrees.

It should be noted that the angle of the angle adjusting lever 611 shown in FIG. 11 is changed in association with changing of the angle of the board section 601 although it is not shown in the figure. However, each of the PDP angle 900 and the stand stay 902 is rotatably fixed respectively, therefore, both of these sections are not affected even by a change in the angle of the board section 601.

Figure 12:
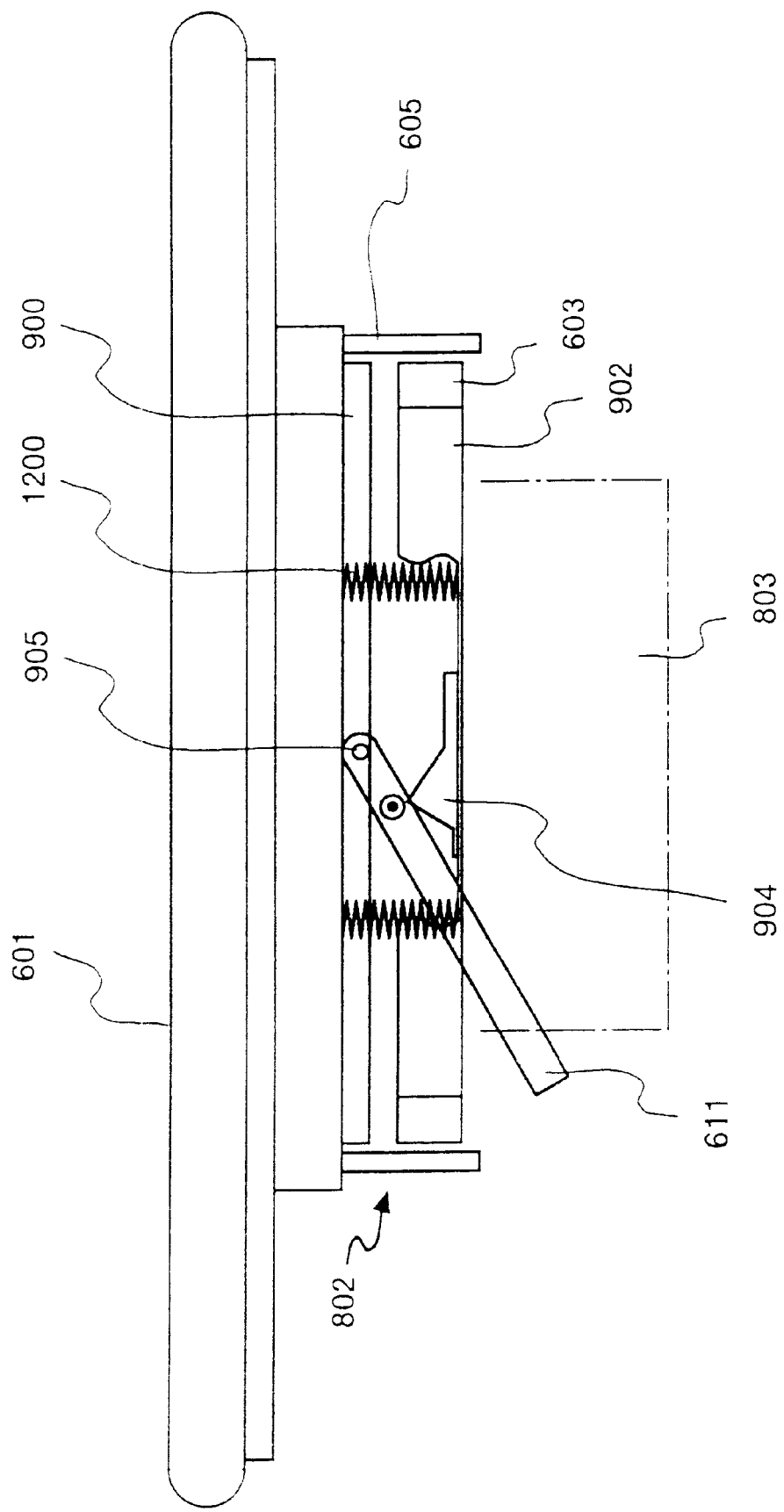
FIG. 12 is a view showing modification of the angle adjusting mechanism section according to Embodiment 1 of the present invention.

As shown in FIG. 12, by providing one or a plurality of springs 1200 between the PDP angle 900 and stand stay 902, operability of the angle adjusting lever 611 can be enhanced. This configuration is obtained based on the consideration that the operation of the angle adjusting lever 611 may be heavy depending on the weight of the board section 901 and the length of the angle adjusting lever 611. Therefore, number of springs 1200 and their force are adjusted according to the weight of the board section 601, which allows operability to be further enhanced.

Also the lever bearer 904 is fixed to the stand stay 902 with, for instance, a screw, and a hole (not shown) on the stand stay 902 into which the screw is put is preferably a rectangular hole. As a result, a fixed position of the lever bearer 904 can be changed to meet the user's need, therefore, an adjustable range of an angle of the board section 601 can be changed.

Figure 13:
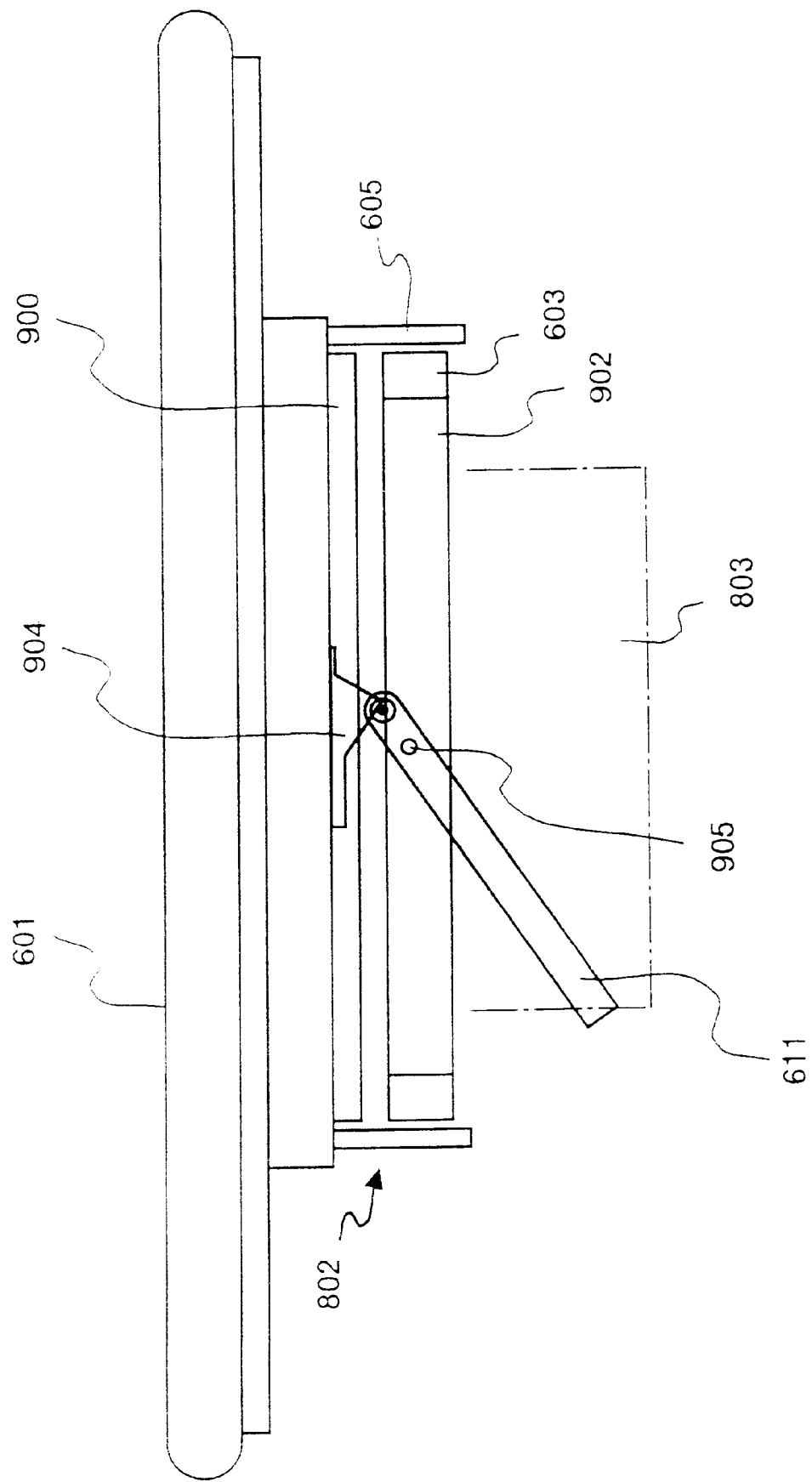
FIG. 13 is a view showing another modification of the angle adjusting mechanism section according to Embodiment 1 of the present invention.

Furthermore, even when the lever bearer 904 is provided on the PDP stay 900 as shown in FIG. 13 with the lever supporting point 905 provided on the stand stay 902 and the configuration is reverse to that of the angle adjusting mechanism section 802 shown in FIG. 9 to FIG. 12, the angle of the board section 601 can also be adjusted.

The configuration of the angle adjusting mechanism section 802 described above is only one of the examples, and it is clear that various designs and modifications are possible. For example, a component member of the angle adjusting mechanism section 802 including the angle adjusting lever 611 shown in FIG. 9 and FIG. 10 may be provided in the upper side of the board section 601 and the pivotal supporting point 800 and the pivot guide 801 may be reversely positioned.

As described above, by providing an angle adjusting mechanism section 802 for adjusting an angle of the board section 601 in the frame unit 600, incoming interference light into the PDP 101, especially, light from lighting equipment such as a fluorescent tube provided on the ceiling can be avoided. Therefore, an image on the screen can easily be seen and convenience of the electronic blackboard system 100 can be improved.

2. Operation

Next, description is made for an operation of the electronic blackboard system 100 having the same configuration as described above in the order of:

(1) Outline, (2) Case of using the system as an electronic blackboard, (3) Case of using the system as a computer, (4) Adjustment of a touch input device, (5) Use of AV equipment, and (6) Connection to a network.

(1) Outline

The electronic blackboard system. 100 according to Embodiment 1 can be called a communication tool applicable to a conference, a meeting or similar occasions by merging the PDP 101 having a large-sized screen with the touch input device 102 based on the ultrasonic surface elastic wave system, and enabling free write-in onto a large-sized screen such as a projector with a fingertip or a touch pen and clear display of computer data thereon.

More specifically, when a user writes characters and draws graphics on the touch surface 201 of the touch input device 102 with his fingertip or a touch pen, the characters and graphics can be displayed on the PDP 101 as they are. Furthermore, a screen of word processor or spreadsheet program is captured, and it is possible to write characters and graphics onto the captured screen and underline a part of the written data on the screen with a pen tool.

In the system, a screen displayed on the PDP 101 is set to one page, and written information is managed as page units, therefore editing processing such as displaying a list of whole pages, sorting the pages, adding pages thereto, and deleting pages therefrom can be performed. Each created page can be saved as a file, and used by calling it any number of times when a conference on the same subject is held several times. The called file can be processed, and the called file can be reused for preparing a new material.

A file prepared with other computer using a presentation software is read in through the network 107, and a presentation can also be performed using the read-in file. As presentation can be performed using data in a file, an OHP film required for presentation using a projector is not needed. As described above, during the presentation, marking can be made onto certain data on the screen on which any file prepared with the presentation software is open through the touch input device 102, therefore more effective presentation can be carried out.

Furthermore, the system is applicable as an ordinary computer, and can also be utilized for an educational activity on a computer operating method using a large-sized PDP 101.

(2) Case of Using the System as an Electronic Blackboard

Description is made hereinafter for the case of using the electronic blackboard system 100 as an electronic blackboard in the order of:

1) Electronic blackboard software,
2) Write-in of freehand characters and graphics,
3) Deletion of freehand characters and graphics,
4) Drawing of graphics,
5) Creation of a new page,
6) Operation for opening a previously prepared file,
7) Operation for capturing a screen of word processor, a spreadsheet program, or presentation software,
8) Operation for displaying pages in creation in a list form,
9) Operation for saving created pages,
10) Printing, and
11) Other.

1) Electronic Blackboard Software

The electronic blackboard system 100 can be operated as an electronic blackboard by executing the electronic blackboard software 506 shown in FIG. 5 using the CPU 500. This electronic blackboard software 506 is one of application programs operating under the control by the OS 505 the same as the various types of application program 508 such as word processor and spreadsheet program. In Embodiment 1, it is preferable for an aspect of workability if the program is set to a sequence that, in response to turning ON the main power switch 619 for the system shown in FIG. 7, the OS 505 is started and then the electronic blackboard software is immediately started. However, the following sequence may be allowable that a desktop screen provided by the OS 505 is displayed on starting the system, one of the icons appearing on the desktop screen is selected, and the electronic blackboard software 506 is started.

Figure 14:
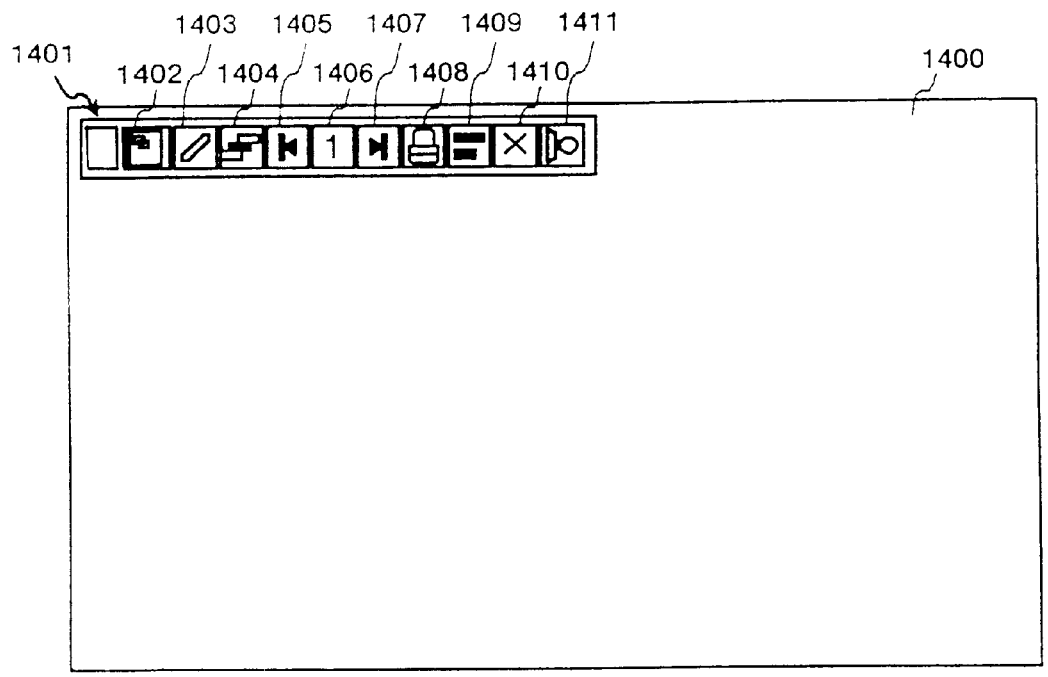
FIG. 14 is an explanatory view showing one example of the screen of the electronic blackboard and a toolbar displayed on the PDP in the electronic blackboard system according to Embodiment 1 of the present invention.

When the electronic blackboard software 506 is started, an electronic blackboard screen 1400 as shown in FIG. 14 appears on the PDP 101. This electronic blackboard screen 1400 corresponds to, for instance, a write-in surface of a white board. When a user draws characters and graphics with his fingertip or a touch pen on the touch surface 201 of the touch input device 102 positioning in the front side of the PDP 101 displaying this electronic blackboard screen 1400, the characters and graphics created by the user on the touch surface 201 appear on the electronic blackboard screen 1400 of the PDP 101 through the touch input device 102, controller 103, and computer 104 as they are as if the characters and graphics were created on a white board with a pen.

The electronic blackboard software 506 is designed so as to manage information in units of pages, and the electronic blackboard screen 1400 corresponds to an information write-in area by one page managed by the electronic blackboard software 506. A user can create a plurality of pages by operating the electronic blackboard software 506, and an arbitrary page of the pages can be displayed as the electronic blackboard screen 1400.

Figure 15:
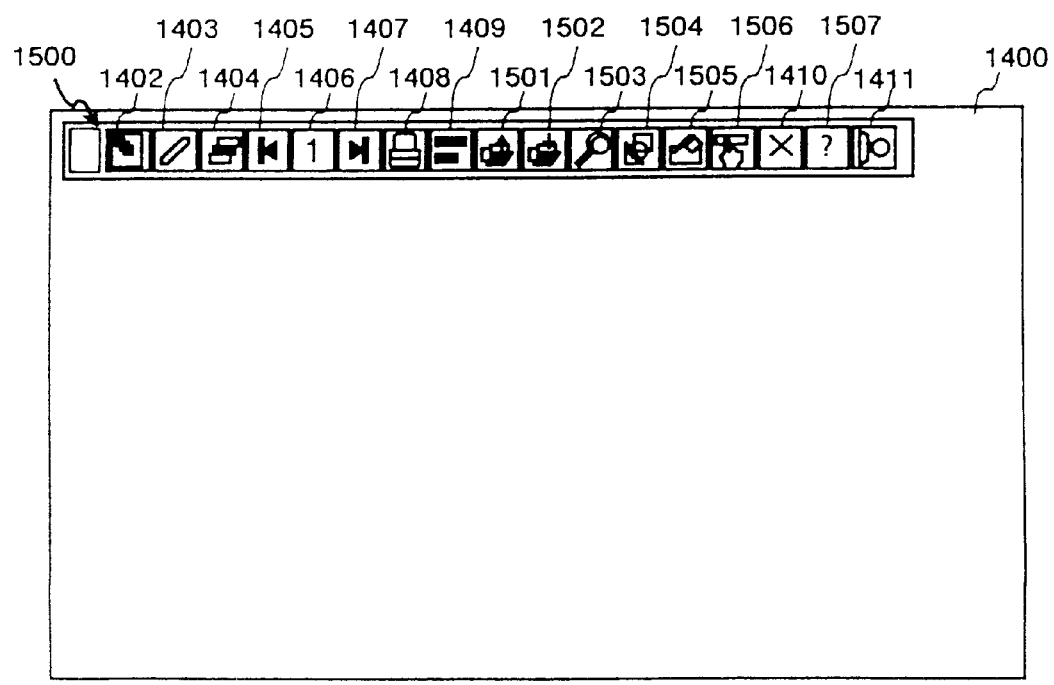
FIG. 15 is an explanatory view showing one example of an extension toolbar displayed on the PDP in the electronic blackboard system according to Embodiment 1 of the present invention.

Furthermore, the electronic blackboard software 506 displays a toolbar 1401 including a plurality of buttons for various operations on the electronic blackboard screen 1400. Description is made herein for an outline of functions assigned to the buttons in the toolbar 1401. It should be noted that, in addition to the toolbar 1401, an extension toolbar (Refer to FIG. 15) and a graphics drawing toolbar (Refer to FIG. 16) are created in the toolbar appearing on the electronic blackboard screen 1400 as described later.

computer screen button 1402:
Display on the PDP 101 is switched to a screen for a computer (a desktop screen or a screen for other application program).

pen button 1403:
Characters and lines can be drawn freehand on the PDP 101 (use of a pen tool is specified).

eraser button 1404:
Freehand characters and lines can be deleted.

previous page button 1405:
A previous page is displayed.

page number window 1406:
A page number of a page currently displayed as an electronic blackboard screen 1400 is displayed.

next page button 1407:
A next page is displayed.

printing button 1408:
A page or pages in creation are printed.

thumbnail button 1409:
Pages constituting a file in preparation are displayed in a list form.

end button 1410:
An electronic blackboard software 506 is ended.

extension button 1411:
An extension toolbar 1500 shown in FIG. 15 is displayed. When the extension button 1411 in the extension toolbar 1500 is touched, the extension toolbar is returned to the toolbar 1401 shown in FIG. 14.

Figure 16:
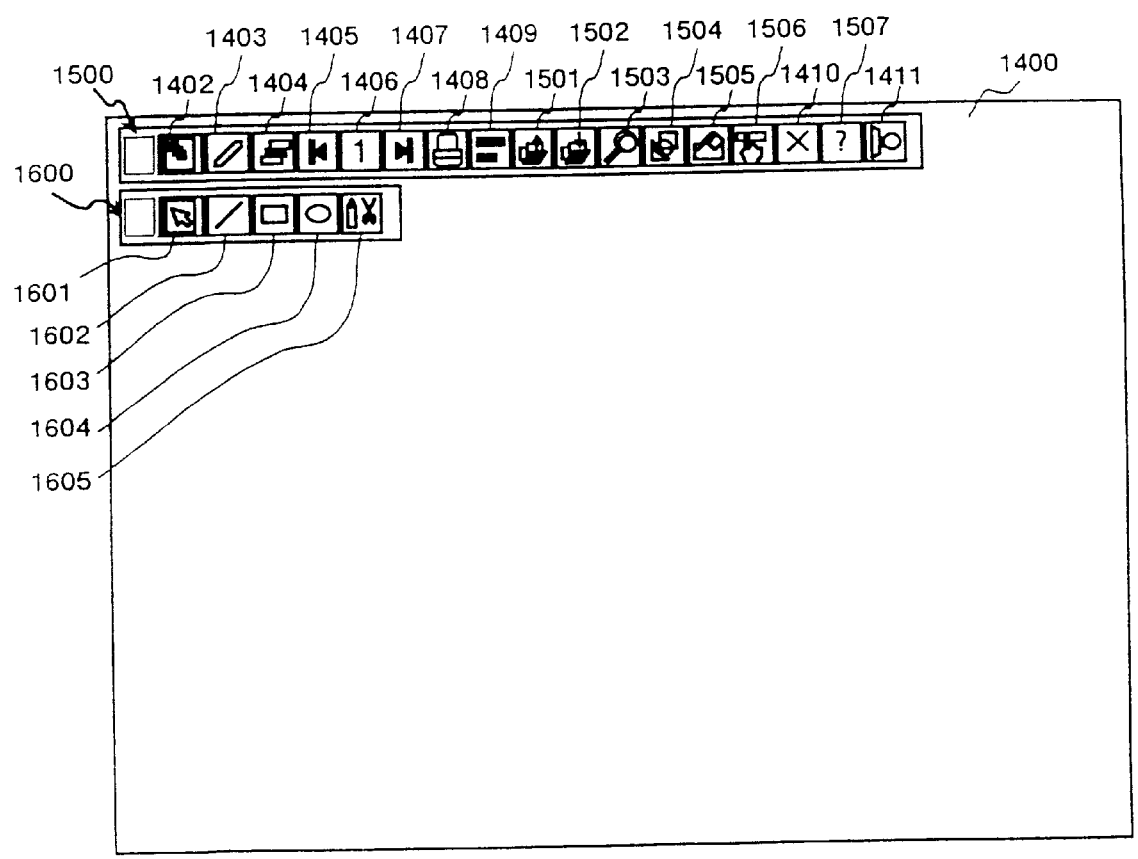
FIG. 16 is an explanatory view showing one example of a drawing toolbar together with the extension toolbar displayed on the PDP in the electronic blackboard system according to Embodiment 1 of the present invention.

Description is made for functions assigned to buttons in the extension toolbar 1500 displayed when the extension button 1411 is touched with reference to FIG. 15. It should be noted that, the same reference numerals are assigned to the buttons corresponding to those in the toolbar 1401 shown in FIG. 14 and description thereof is omitted herein.

file button 1501:
  A new page is opened or a previously prepared file can be opened.
save button 1502:
  A currently prepared file is saved.
display button 1503
  Switching to any of thumbnail display, whole display, or to window display, and zoom (enlarged) display can be set.
graphics drawing button 1504:
  A graphics drawing toolbar 1600 shown in FIG. 16 is displayed, and lines, rectangles, ovals can be created (Use of graphics drawing tool is specified). Each button in the graphics drawing toolbar 1600 is described later.
background setting button 1505:
  A background color of the electronic blackboard screen 1400 displayed on the PDP 101 can be set.
option button 1506:
  Display of the electronic blackboard software 506 when power is ON and processing is ended and insertion of a page when other screen is captured can be set, which is described later. Furthermore, change of work folders can be set.
help button 1506:
  A help screen with operations and instruction of functions described thereon can be displayed.

Furthermore, description is made for functions assigned to buttons in the graphics drawing toolbar 1600 displayed when the graphics drawing button 1504 is touched with reference to FIG. 16.

select button 1601:
  When created graphics is to be edited, any graphics to be edited can be selected.
line button 1602:
  A line can be drawn.
rectangle button 1603:
  A rectangle can be drawn.
ellipse button 1604:
  An ellipse can be drawn.
edit button 1605:
  A created graphics is edited.

It should be noted that, in the electronic blackboard software 506, it can be found which of the buttons a user has touched according to positional information for coordinates inputted from the controller 103.

Also the user touches a specified position of each of the toolbars shown in FIG. 14 to FIG. 16 with his fingertip and moves the fingertip as it is, so that the toolbar can be moved to a desired place.

Furthermore, the electronic blackboard screen 1400 shown in FIG. 14 is displayed on the whole display area of the PDP 101 in a display format so-called full screen display. The user touches the display button 1503 in the extension toolbar 1500 and carries out a specified operation, and the electronic blackboard screen 1400 can be switched to window display. Furthermore, as the electronic blackboard software 506 is one of the application programs operating on the OS 505, by touching the computer Screen button 1402 in the toolbar 1401 (or extension toolbar 1500) as described above, the display of the PDP 101 can easily be switched from the electronic blackboard screen 1400 to a desktop screen or a display screen of the word processor or the like.

Furthermore, an operation of the touch input device 102 (touch the touch surface 201) may be performed with any tool, in addition to a fingertip and a touch pen, on condition that it can attenuate surface elastic waves. Therefore, even if expression of, for instance, "touch with a fingertip" is found in the description below, the same operation can be carried out by touching the touch surface with a touch pen or some other thing.

2) Write-in of Freehand Characters and Graphics

Description is made for various operations using the electronic blackboard software 506 one after another. Herein, description is made for a method of writing in characters and graphics freehand.

Figure 17:
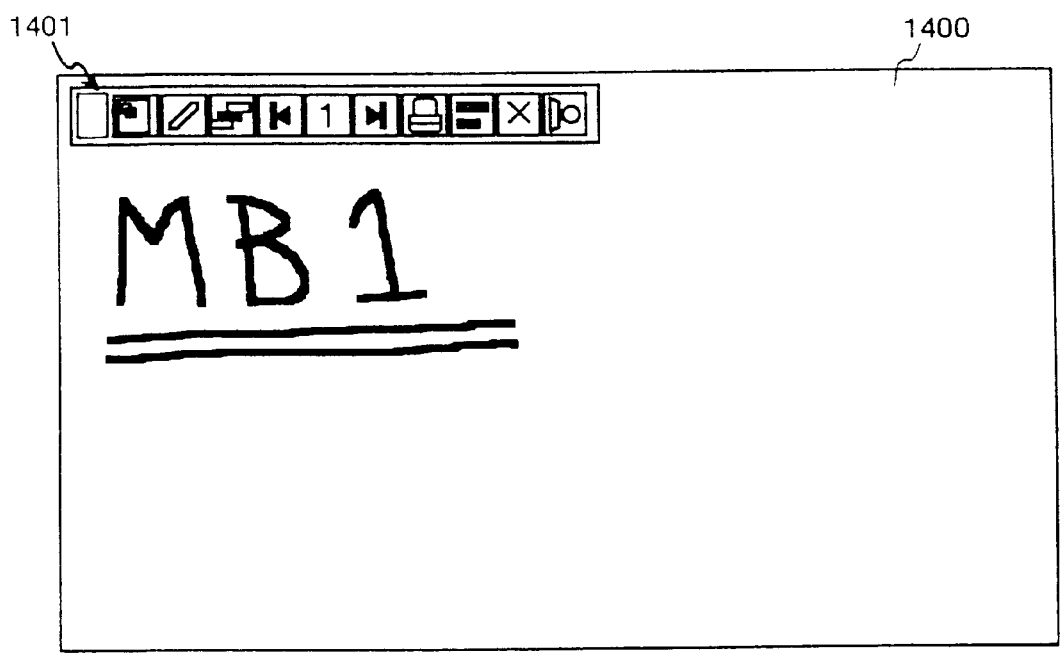
FIG. 17 is an explanatory view showing one example of how a result of freehand characters and lines on the touch surface is displayed on the screen of the electronic blackboard on the PDP in the electronic blackboard system according to Embodiment 1 of the present invention.

Prepared in the electronic blackboard software 506 is a pen tool for writing characters and graphics freehand on the electronic blackboard screen 1400 using a user's fingertip or a touch pen just like a real pen. This pen tool is made available when a user touches the pen button 1403 in the toolbar 1401 (or extension toolbar 1500). The user writes a character or a line with his fingertip or the touch pen on the touch surface 201 as when a character is written freehand on a blackboard or a whiteboard, it I possible to display the corresponding character and line on the electronic blackboard screen 1400. In a case of this pen tool, the user's fingertip or the touch pen works like a real pen, and it is also possible to set a color and a thickness of a line of characters and graphics which can be written with the fingertip. FIG. 17 is an explanatory view showing one example of how a result of writing characters and lines freehand is displayed on the electronic blackboard screen 1400 on the PDP 101.

Herein, simple description is made for processing of displaying a character on the electronic blackboard screen 1400 with reference with FIG. 1, FIG. 4 and FIG. 5. When the user writes a character with his fingertip on the touch surface 201, the surface elastic waves propagating on the touch surface 201 are attenuated. As a result, the controller 103 can obtain positional information for coordinates corresponding to a trail of the fingertip according to the attenuation of the surface elastic waves, and the obtained positional information for coordinates is successively inputted into the computer 104. In the computer 104, the electronic blackboard software 506 and the OS 505 generate drawing information for drawing a line with the preset color and thickness of the line when receiving the positional information for coordinates from the controller 103, and write the generated information in a video memory (not shown) of the graphics board 510 matching a position of corresponding coordinates. The graphics board 510 transmits an image signal to the PDP 101 according to the contents of the video memory, and provides controls for the processing of displaying the same character as that written on the touch surface 210 by the user on the PDP 101.

In simple words, the computer 104 recognizes the touch input device 102 and the controller 103 as a pointing device such as a mouse, therefore, the same processing as that when a character is written with a mouse on the drawing software is executed in the computer 104. It should be noted that, the processing is executed in the steps described above also in the processing for deleting a character and creating graphics described below.

3) Deletion of Freehand Characters and Graphics

Figure 18:
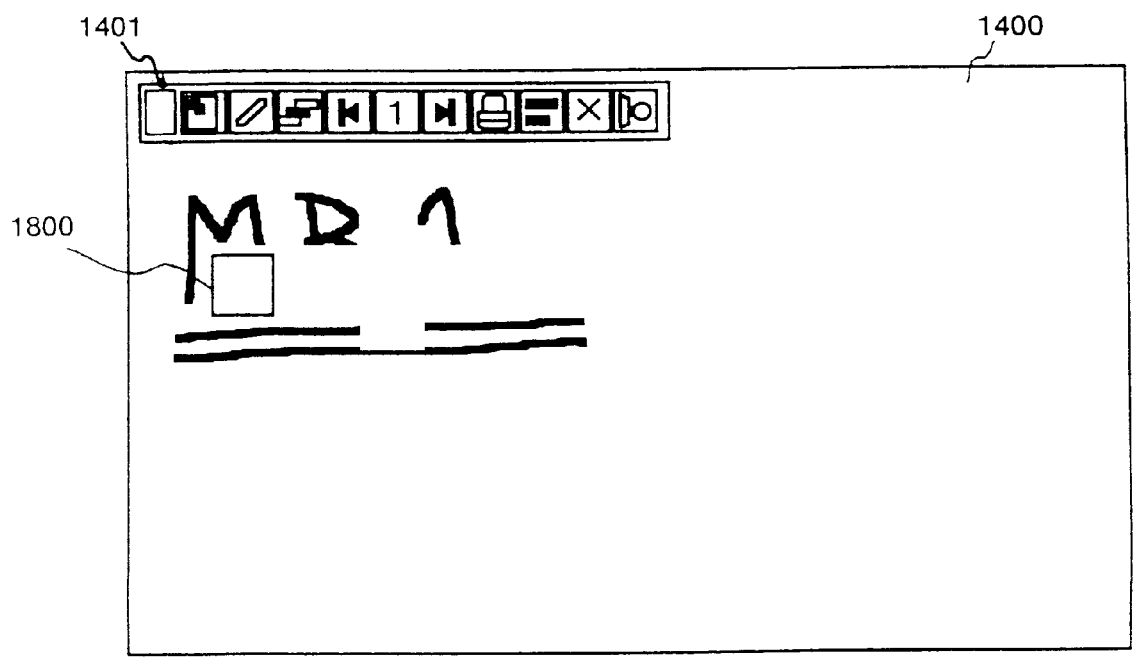
FIG. 18 is an explanatory view showing one example of how the freehand characters and lines displayed on the screen of the electronic blackboard are deleted with an eraser in the electronic blackboard system according to Embodiment 1 of the present invention.

A user can delete freehand characters and graphics on the electronic blackboard screen 1400 like deleting them with an eraser by touching the eraser button 1404. When the eraser button 1404 is touched, a user's fingertip or a touch pen can be used like a real eraser, and a size of the eraser, namely an area in which characters and graphics are to be deleted in one operation can be set. FIG. 18 is an explanatory view showing how the freehand characters and lines shown in FIG. 17 are deleted with an eraser 1800.

Figure 19:
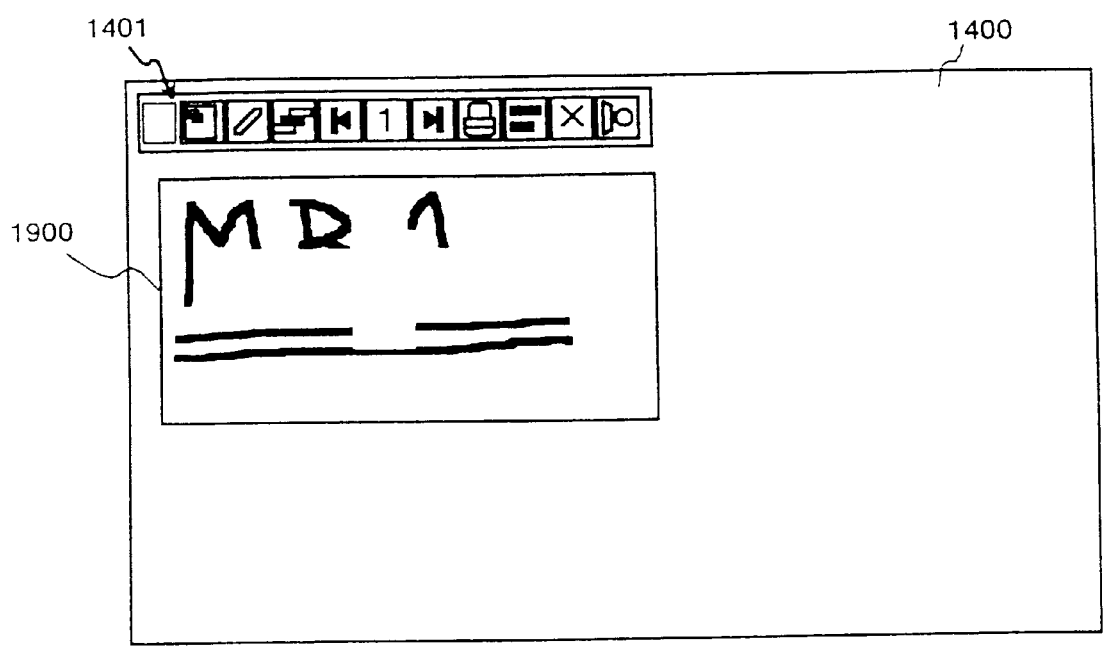
FIG. 19 is an explanatory view showing one example of how the freehand characters and lines displayed on the screen of the electronic blackboard are enclosed with a box and the characters and lines in the box are deleted in one operation in the electronic blackboard system according to Embodiment 1 of the present invention.

In this mode of deleting freehand characters, as shown in FIG. 19, freehand characters and lines to be deleted are enclosed with a box 1900 and the characters and lines in the box 1900 can be deleted in one operation (data enclosed and deleted).

4) Drawing of Graphics

In the electronic blackboard software 506 graphics drawing tools for drawing graphics such as lines, rectangles and ellipse are made available. The graphics drawing tools can be used through the drawing toolbar 1600 shown in FIG. 16. A user touches the extension button 1401 in the toolbar 1400 (Refer to FIG. 14) and gets the extension toolbar 1500 displayed (Refer to FIG. 15), and then touches the graphics drawing button 1504 in the extension toolbar 1500, so that the drawing toolbar 1600 shown in FIG. 16 can be displayed on the electronic blackboard screen 1400.

① Drawing of a Line

Figure 20:
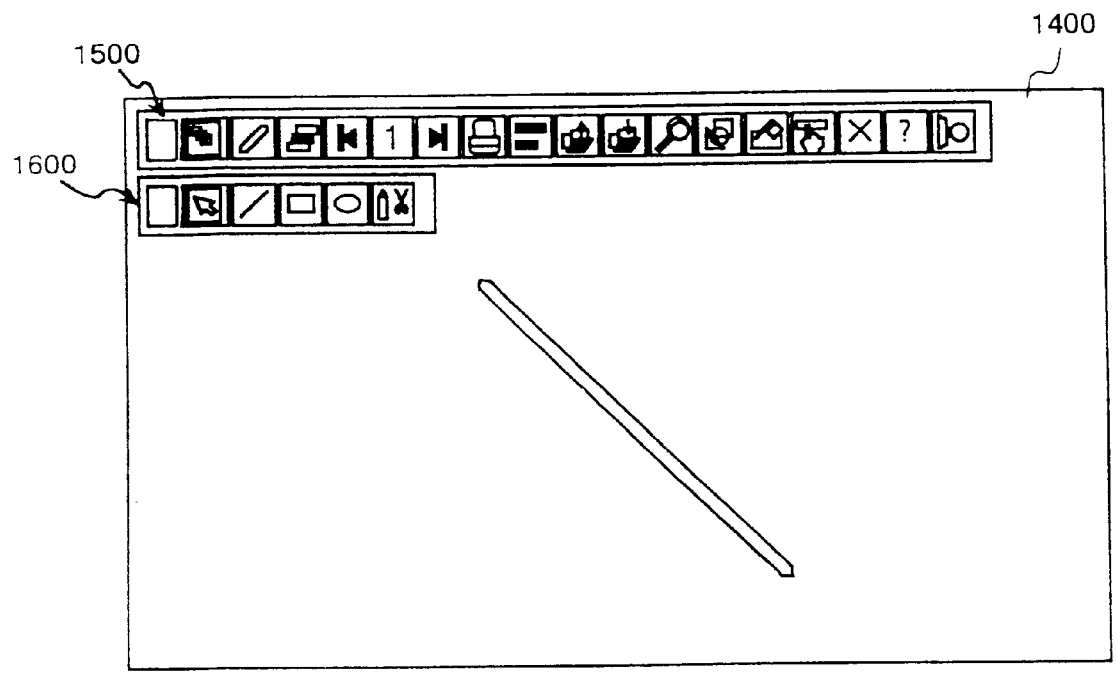
FIG. 20 is an explanatory view that shows a line drawn on the screen of the electronic blackboard in the electronic blackboard system according to Embodiment 1 of the present invention.

When a line is to be drawn, a user may perform operations of touching the line button 1602 in the drawing toolbar 1600 with his fingertip, touching an arbitrary place on the touch surface 201 as a starting point of the line with the fingertip, moving the fingertip kept in its state as far as a place which is the end point, and moving the fingertip off the touch surface 201. As a result, as shown in FIG. 20, a line is created on the electronic blackboard screen 1400.

② Drawing of a Rectangle

Figure 21:
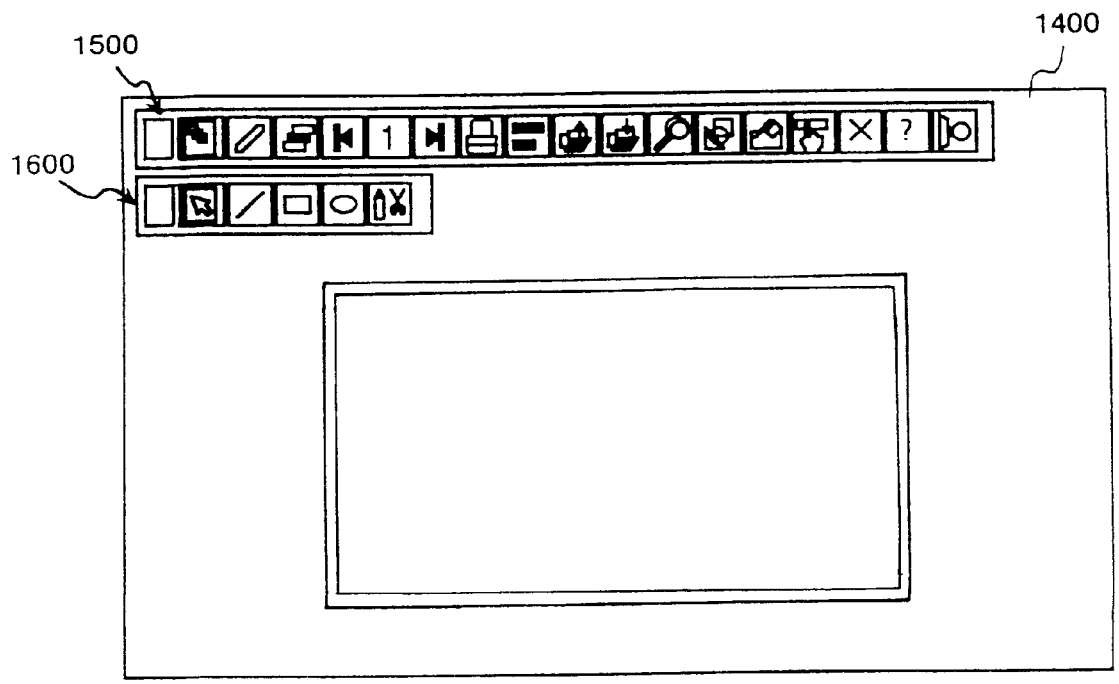
FIG. 21 is an explanatory view that shows a rectangle drawn on the screen of the electronic blackboard in the electronic blackboard system according to Embodiment 1 of the present invention.

When a rectangle is to be created, a user may perform operations of touching the rectangle button 1603 in the drawing toolbar 1600 with his fingertip, touching an arbitrary place on the touch surface 201 with the fingertip, moving the fingertip kept in its state in an arbitrary direction, and moving the fingertip off the touch surface 201. As a result, as shown in FIG. 21, a rectangle is created on the electronic blackboard screen 1400.

Furthermore, in the electronic blackboard software 506, a function enabling easy creation of a table using the rectangle created as described above. At first, there is performed setting of touching the background setting button 1505 in the extension toolbar 1500 to display a setting screen (not shown), and displaying a grid on the background of the electronic blackboard screen 1400. In that case, longitudinal and lateral distance of a grid, and a left-start position and a upper-start position can be specified. In addition, for convenience of use when a table is created with a grid, there is prepared a setting that a created rectangle is displayed so as to match the grid.

Figure 22:
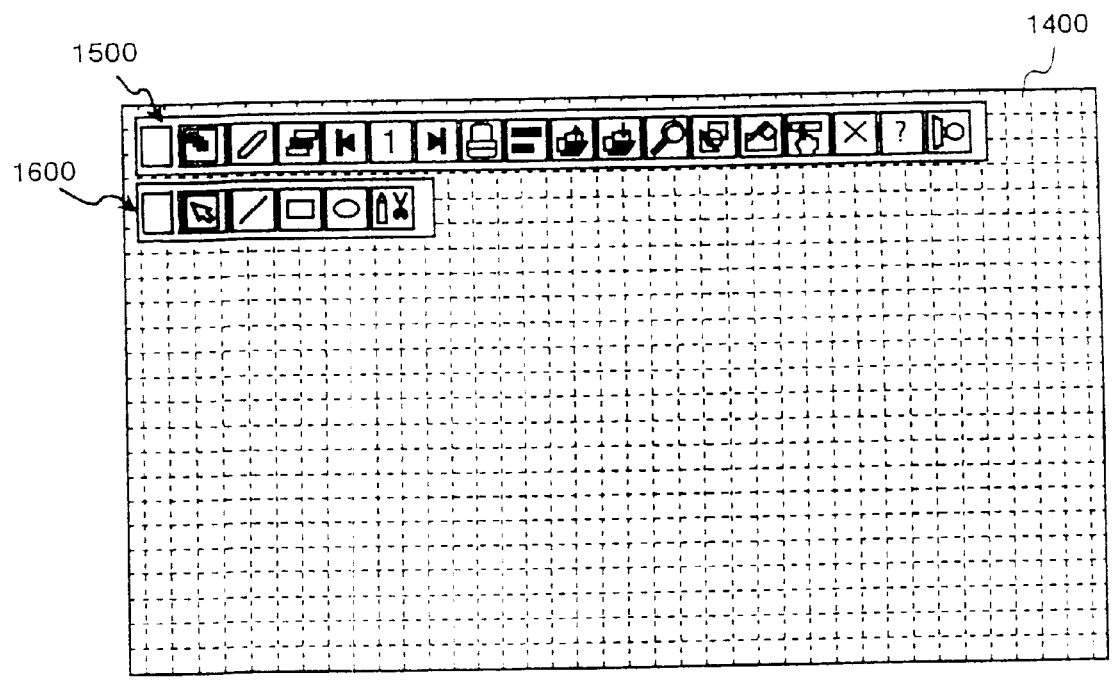
FIG. 22 is an explanatory view showing a grid pattern displayed as a background of the screen of the electronic blackboard in the electronic blackboard system according to Embodiment 1 of the present invention.
Figure 23:
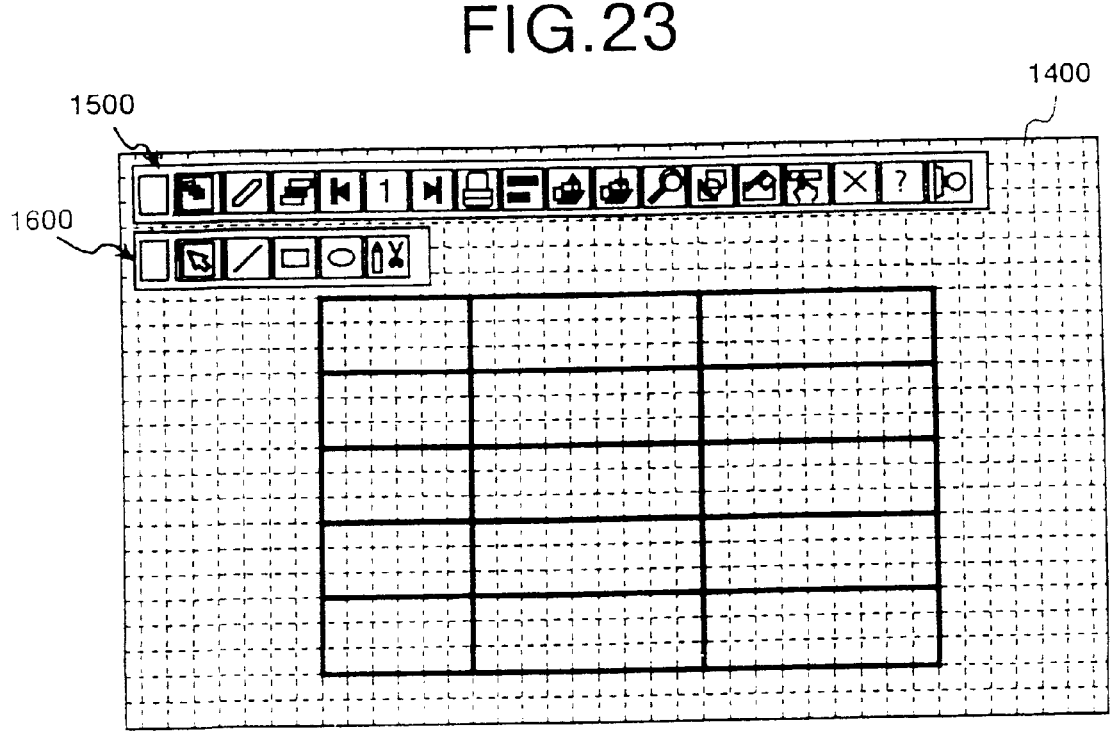
FIG. 23 is an explanatory view that shows a table created on the screen of the electronic blackboard in the electronic blackboard system according to Embodiment 1 of the present invention.

When a setting for the grid is ended, the grid appears on the electronic blackboard screen 1400 as shown in FIG. 22. By repeatedly drawing a rectangle as described above, the table as shown in FIG. 23 can be created. It should be noted that, if a setting that a created rectangle is displayed so as to match the grid is executed when a grid is to be set, the electronic blackboard software 506 executes the processing of drawing rectangles along the grid.

③ Drawing of an Ellipse

Figure 24:
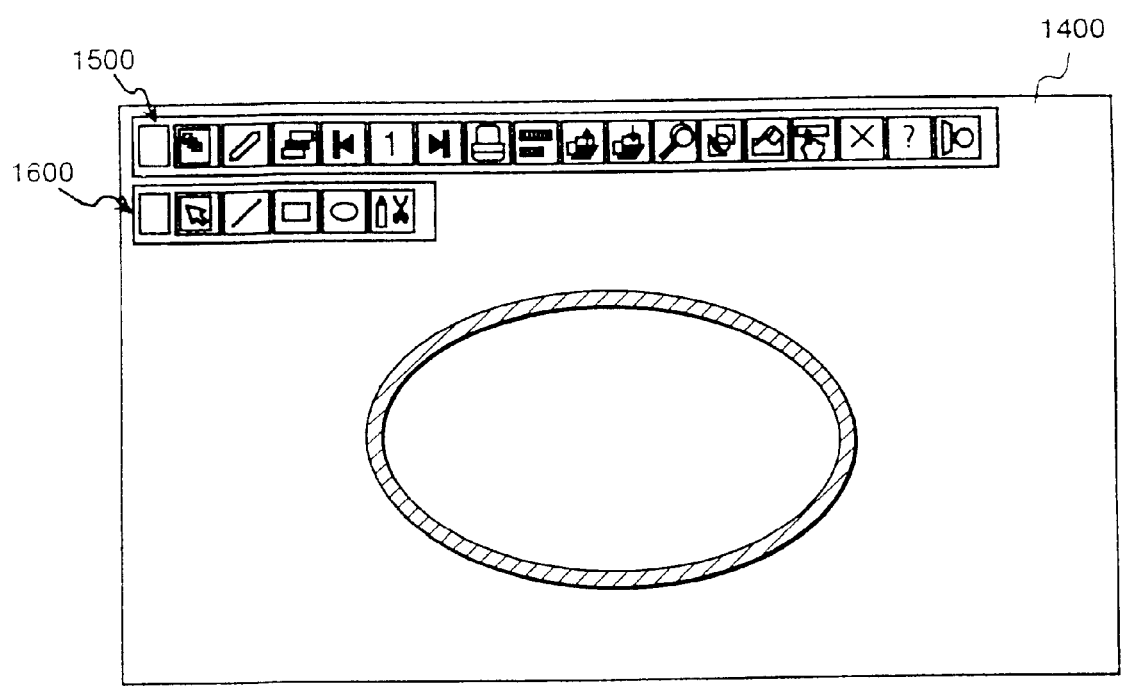
FIG. 24 is an explanatory view that shows an ellipse created on the screen of the electronic blackboard in the electronic blackboard system according to Embodiment 1 of the present invention.

When an ellipse is to be created, a user may perform operations of touching the ellipse button 1604 in the drawing toolbar 1600 with his fingertip, touching an arbitrary place on the touch surface 201 with the fingertip, moving the fingertip kept in its state in an arbitrary direction, and moving the fingertip off the touch surface 201. As a result, as shown in FIG. 24, an ellipse is created on the electronic blackboard screen 1400.

④ Modification of a Created Graphics

Figure 25A:
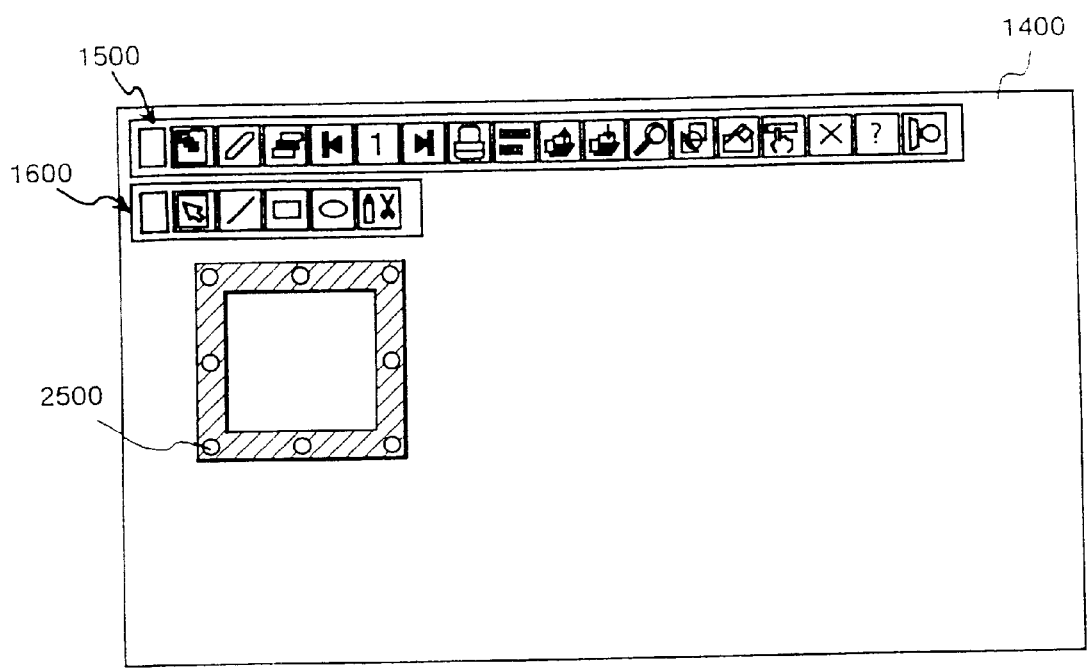
FIG. 25(*a*) is an explanatory view showing selection of a graphics as an object for modification and (*b*) is an explanatory view showing the graphics after its modification in the electronic blackboard system according to Embodiment 1 of the present invention.
Figure 25B:
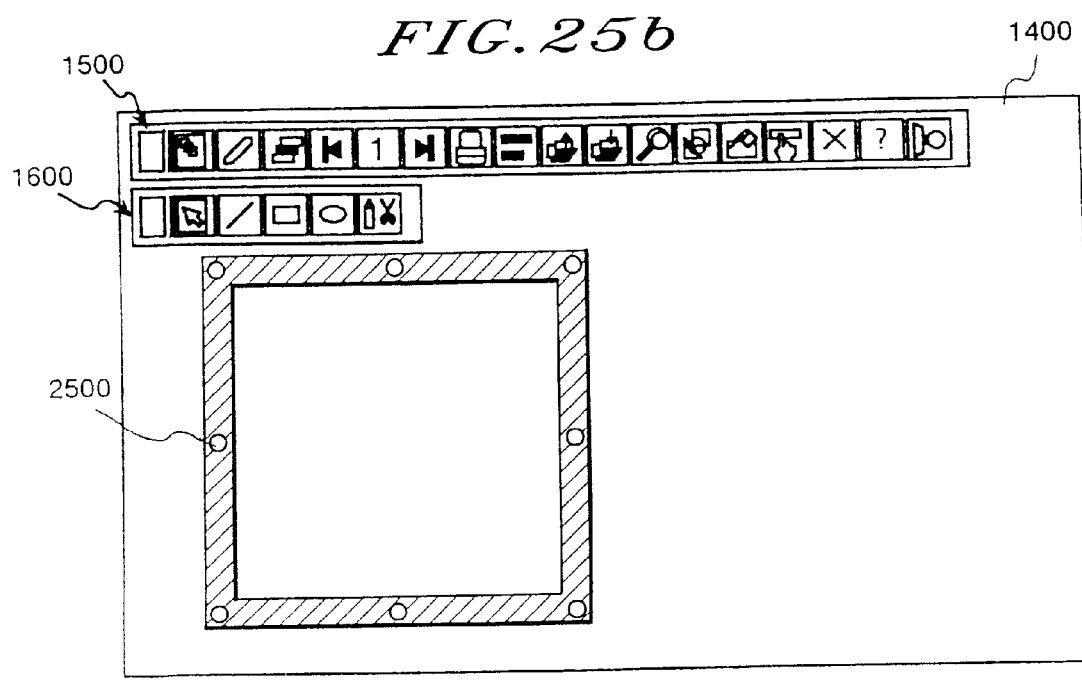

When a created graphics is to be modified, a user touches the select button 1601 in the drawing toolbar 1600 with his fingertip, touches any part of a line of the graphics to be modified, and selects the graphics. As a result, as shown in FIG. 25(*a*), a rectangular mark (handle) 2500 surrounding the selected graphics is displayed.

Then, the user touches any part of the handle 2500 with his fingertip, and moves the fingertip kept in its state, so that a size and a shape of the graphics can be transformed in association with its movement. FIG. 25(*b*) shows how a graphics is enlarged by moving the part of the handle 2500 in the right lower side of the handle 2500 shown in FIG. 25(*a*).

⑤ Movement of a Created Graphics

Figure 26A:
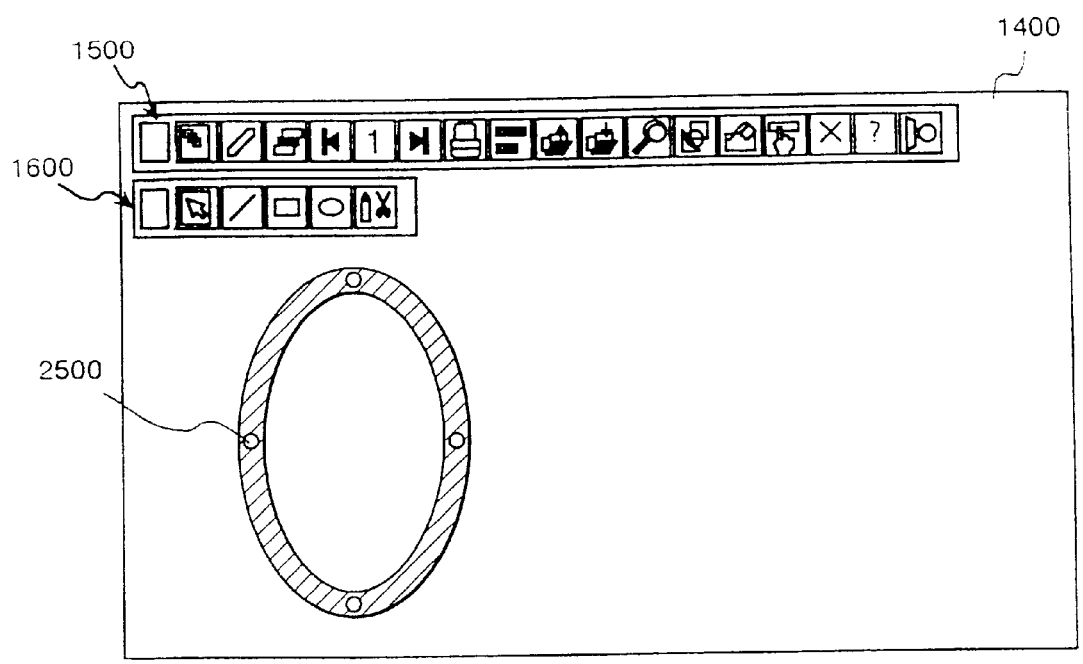
FIG. 26(*a*) is an explanatory view showing selection of a graphics as an object to be moved and (*b*) is an explanatory view showing the graphics after its movement in the electronic blackboard system according to Embodiment 1 of the present invention.
Figure 26B:
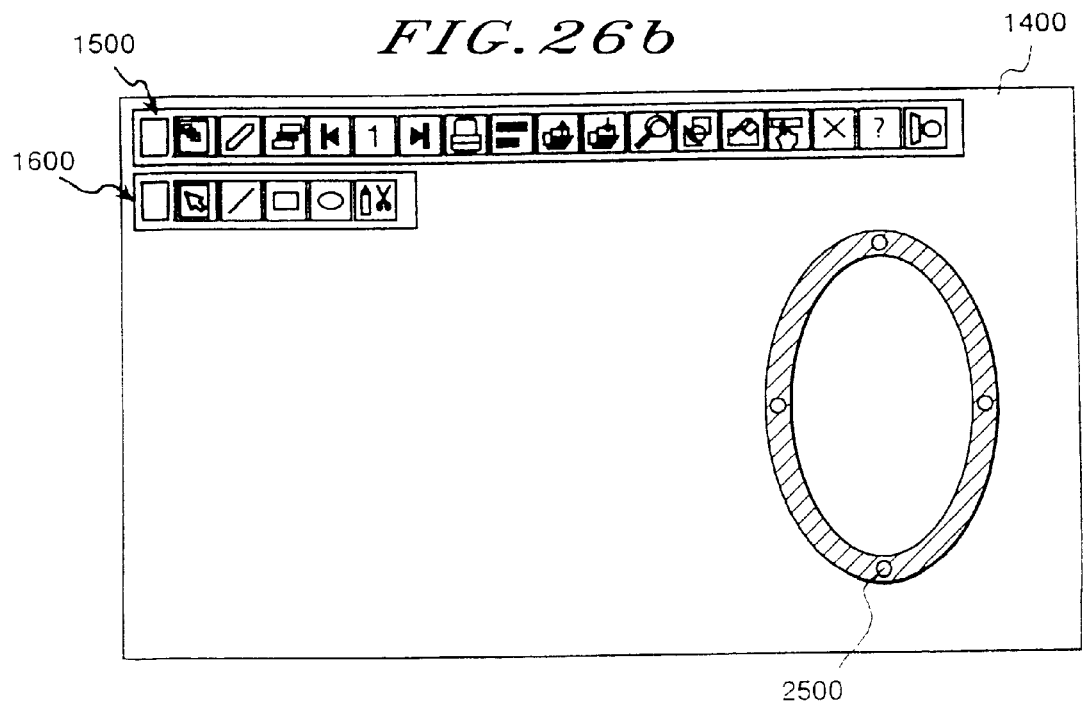

When an already created graphics is to be moved, a user touches the select button 1601 in the drawing toolbar 1600 with his fingertip, touches any part of a line of the graphics to be modified, and selects the graphics. As a result, as shown in FIG. 26(*a*), a handle 2500 surrounding the selected graphics is displayed.

Then, the user touches any part of a line of the graphics with his fingertip, and moves the fingertip kept in its state, so that the graphics can be moved in association with its movement. FIG. 26(*b*) shows how the graphics shown in FIG. 26(*a*) has been moved in the right direction.

⑥ Edition of a Created Graphics

Figure 27:
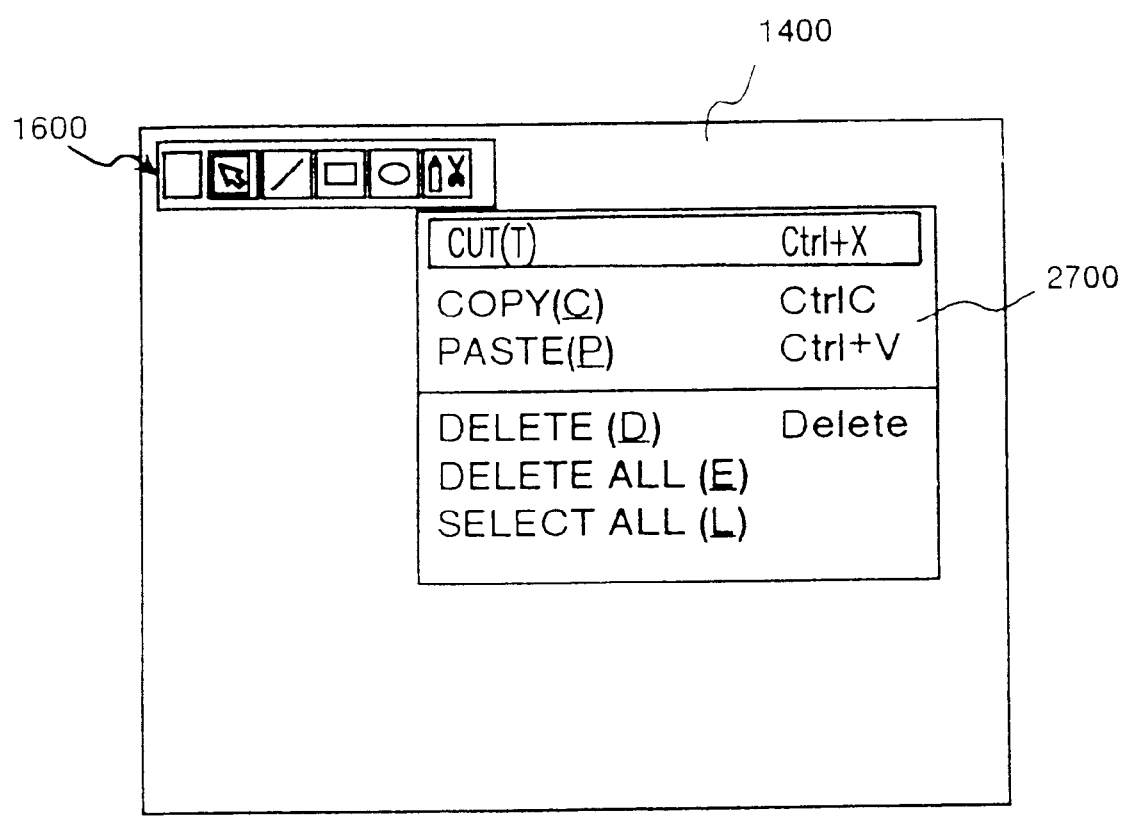
FIG. 27 is an explanatory view showing one example of an edit menu displayed when a created graphics is to be edited in the electronic blackboard system according to Embodiment 1 of the present invention.

Herein, edition of a created graphics indicates cut or copy of the graphics or the like. At first, when a created graphics is to be cut out and pasted at an arbitrary position, the user touches the select button 1601 in the drawing toolbar 1600 with his fingertip, and touches any part of a line of the graphics to be cut out to select the graphics. Then, when the edit button 1605 in the drawing toolbar 1600 is touched with the fingertip, an edit menu 2700 shown in FIG. 27 is displayed on the electronic blackboard screen 1400. Then, when the user touches "cut" in the edit menu 2700, the selected graphics is cut out.

In order to paste the cut-out graphics, the edit menu 2700 is displayed again, in which "paste" is touched, and when an arbitrary place on the electronic blackboard screen 1400 is touched, the cut-out graphics is pasted at the touched place.

However, when the cut-out graphics is to be pasted not in a currently displayed page but in another page, the user may perform operations of touching the previous page button 1405 or the next page button 1407 in the extension toolbar 1500, making a desired page displayed, and pasting the graphics as described above.

When a created graphics is to be copied and pasted in an arbitrary place, the same operation as those in the case of cut may be performed except touching "copy" in the edit menu 2700.

Next description is made for a case of deleting a created graphics. As described in the cut operation for cutting of a graphics, a graphics to be deleted is selected and the edit menu 2700 is displayed. When "delete" in the edit menu 2700 is touched, the selected graphics is deleted.

It should be noted that, when a user wants to select all of the created graphics and cut, copy, or delete it, "select all" in the edit menu 2700 is touched, so that all of the created graphics is selected and the operation of cut, copy, or delete can be carried out to all the graphics. It should be noted that, if "select all" is touched, a handle surrounding all the graphics is displayed, and all the graphics can be moved with the fingertip.

5) Creation of a New Page

When a new page other than a page currently displayed as the electronic blackboard screen 1400 is to be created, a user may touch the next page button 1407 in the toolbar 1401 (or Extension toolbar 1500). When the next page button 1407 is touched, the electronic blackboard software 506 generates a new page and display it as electronic blackboard screen 1400.

It should be noted that, if a plurality of pages are currently created, the next page button 1407 is touched to display the final page, and by touching the next page button 1407 again, a new page can be created.

Furthermore, when a previous page is to be opened, the user may touch the previous page button 1405 in the toolbar 1401 (or extension toolbar 1500). When the previous page button 1405 is touched, the electronic blackboard software 506 displays a corresponding page as electronic blackboard screen 1400.

6) Operation for Opening a Previously Prepared File

Figure 28:
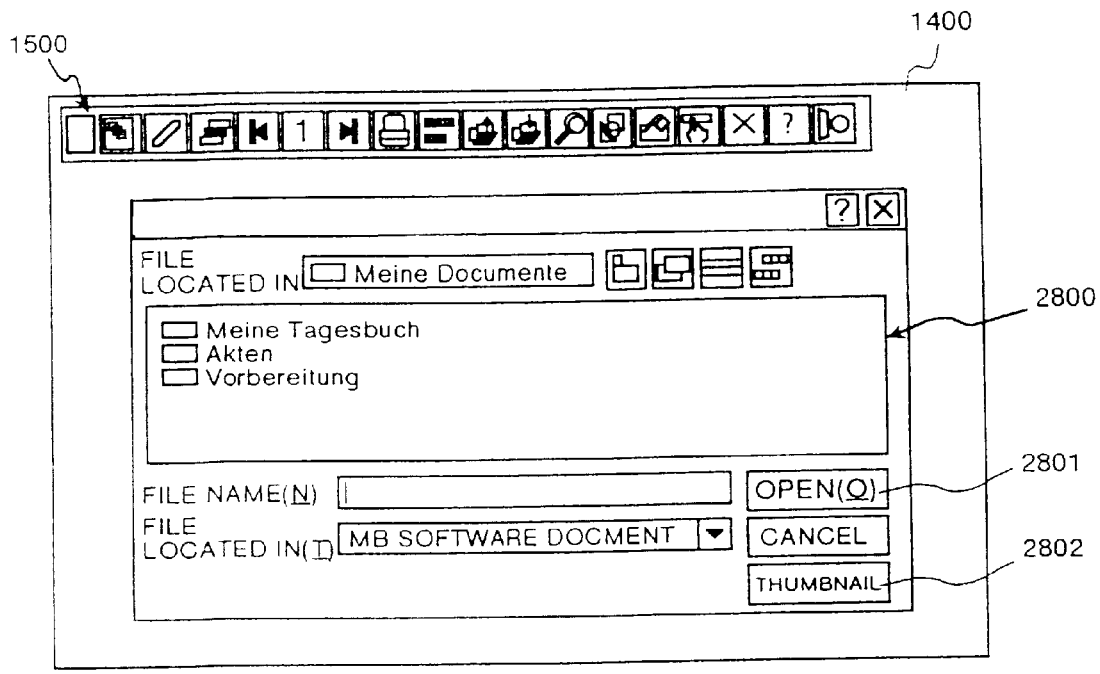
FIG. 28 is an explanatory view for illustrating the processing for opening a prepared file in the electronic blackboard system according to Embodiment 1 of the present invention.

In order to open a previously prepared file, the file button 1501 in the extension toolbar 1500 is touched to display a file menu (not shown), and "open" in the file menu is touched to display a dialog box 2800 shown in FIG. 28. Then, a required file name is touched for selection, and an "open" button 2801 is touched, so that a page of a corresponding file is displayed as the electronic blackboard screen 1400. It should be noted that, a file can be opened by touching a file name twice in a row (described "double touch" hereinafter) like so-called "double click".

Figure 29:
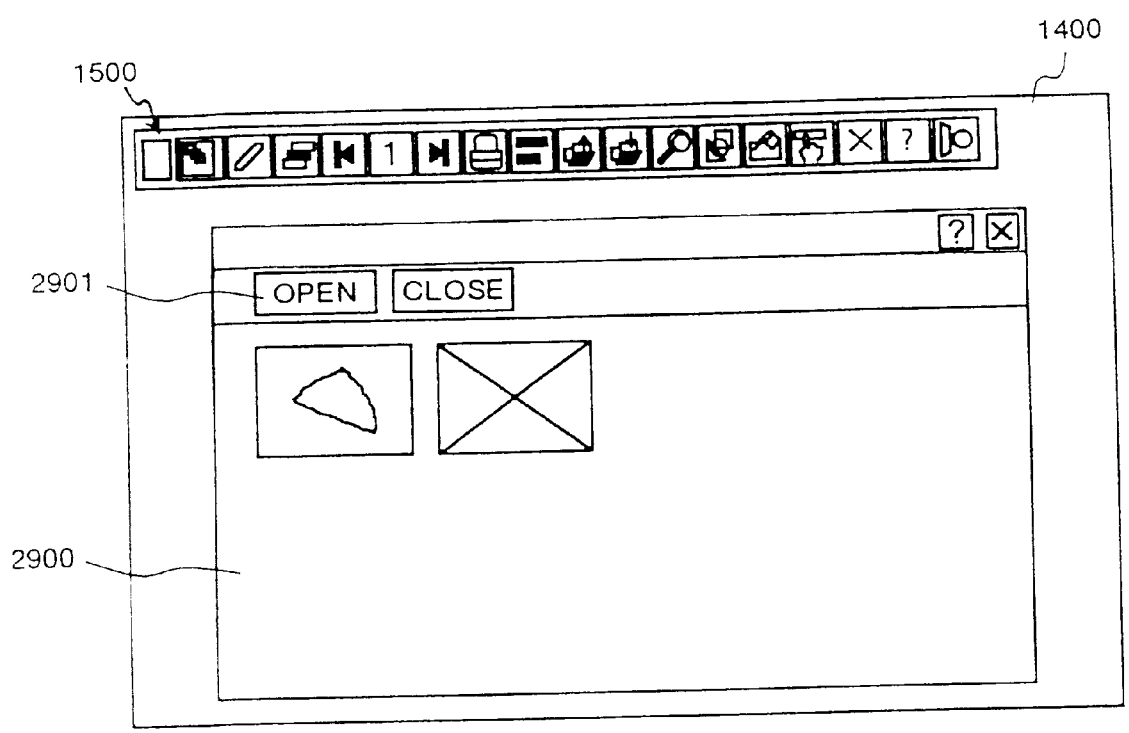
FIG. 29 is an explanatory view for illustrating the processing for opening a prepared file using thumbnail images in the electronic blackboard system according to Embodiment 1 of the present invention.

When the contents of previously prepared file is not clear, operations of displaying a list of the files by using a file thumbnail function, confirming the contents, and opening the target file can be performed. To use the file thumbnail function, a "thumbnail" button 2802 in the dialog box 2800 is touched to display the thumbnail dialog box 2900 as shown in FIG. 29, and a list of the files is displayed in the thumbnail form in the box. Thumbnail images to be displayed here are header pages of the files respectively. Then, a desired thumbnail is touched to be selected, and "open" button 2901 is touched, or the desired thumbnail image is double-touched, so that a page of a corresponding file is displayed as the electronic blackboard screen 1400.

It should be noted that in order to prepare a new file, the file button in the extension toolbar 1500 is touched to display the file menu (not shown), and when "new file" in the file menu is touched, a new page is displayed on the electronic blackboard screen 1400.

7) Operation for Capturing a Screen of Word Processor, a Spreadsheet Program, or Presentation Software (Capturing Function)

The electronic blackboard software 506 has a "capture" function for capturing the contents of a file prepared with the word processor, a spreadsheet program, or presentation software as a background of the electronic blackboard screen 1400. Description is made hereinafter for the processing of capturing the screen of word processor, spreadsheet program, or presentation software by using this capturing function.

Figure 30:
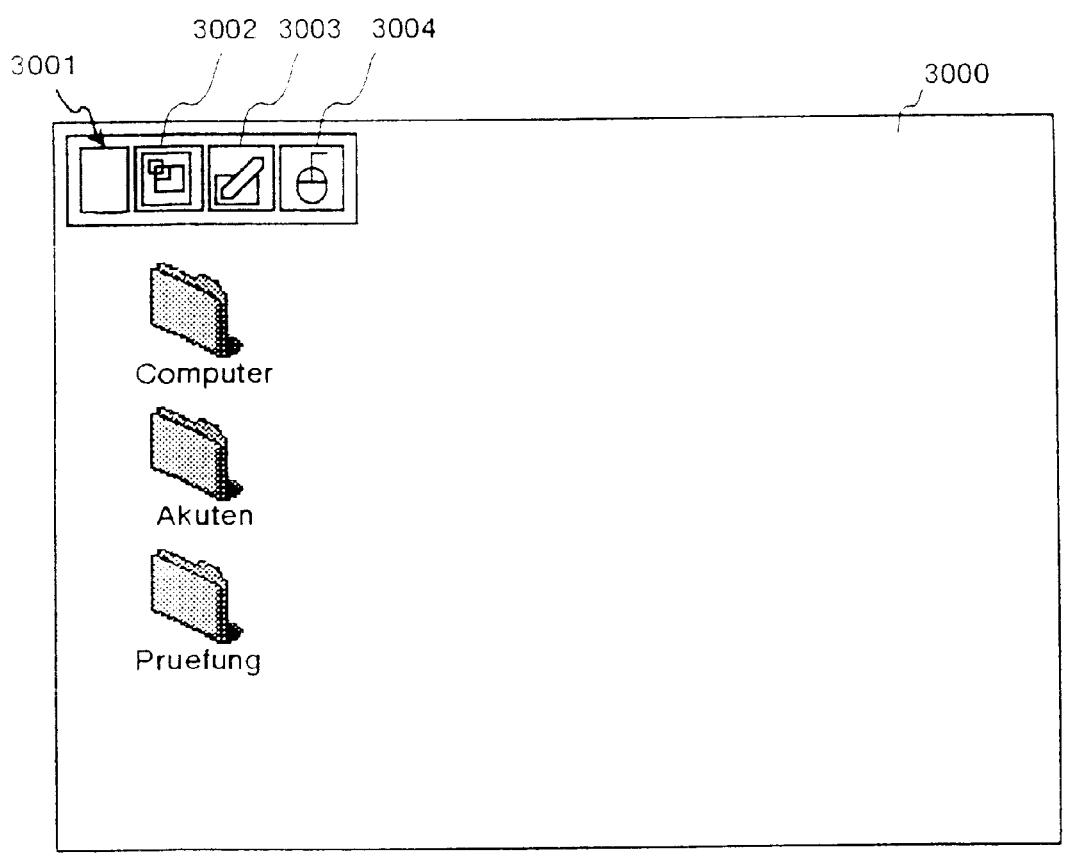
FIG. 30 is an explanatory view showing one example of the screen of the computer and a capture toolbar displayed on the PDP in the electronic blackboard system according to Embodiment 1 of the present invention.

At first, by touching the computer screen button 1402 in the toolbar 1401 (or the extension toolbar 1500 by a user, as shown in FIG. 30, the display of the PDP 101 is switched from the electronic blackboard screen 1400 to a computer screen 3000. In FIG. 30, the reference numeral 3001 indicates a capture toolbar displayed when the display is switched to the computer screen 3000. Functions allocated to the buttons in the capture toolbar 3001 are as follows.

electronic blackboard screen button 3002:

Display is switched from the computer screen 3000 to the electronic blackboard screen 1400.

capture button 3003:

A screen displayed on the computer screen 3000 is captured.

mouse button 3004:

In an environment where a right button of a two-button type of mouse is usable (e.g., when Windows (trademark) of Microsoft is used as OS), functions assigned to the right button of the mouse become available.

Then, in the computer screen 3000 shown in FIG. 30, the user touches (double touch) an icon of a desired application program or an icon of a desired file to start a corresponding application program, and also touches the capture button 3003 after displaying the target file on the PDP 101. As a result, the electronic blackboard software 506 captures the currently displayed screen and switches the display on the PDP 101 to the electronic blackboard screen 1400, as shown in FIG. 31, to display the captured screen as a background of the electronic blackboard screen 1400.

Figure 32:
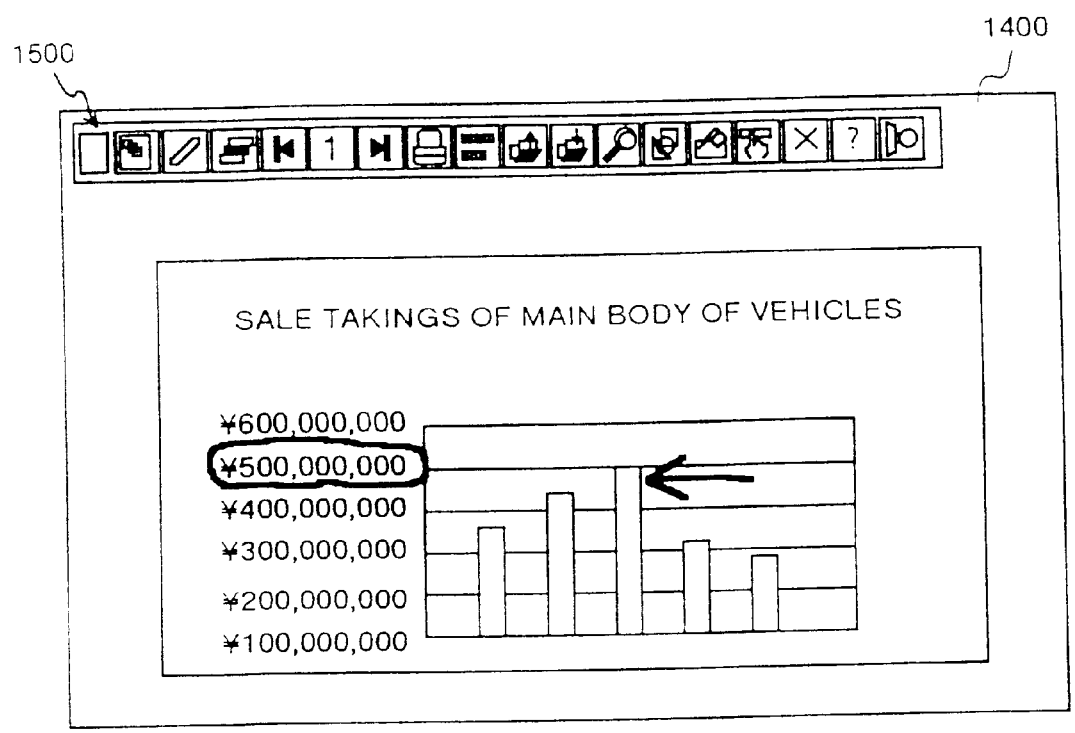
FIG. 32 is an explanatory view showing one example of how a screen of a captured application program is displayed as a background of the screen of the electronic blackboard and characters or the like are written on the screen in the electronic blackboard system according to Embodiment 1 of the present invention.

Then, as shown in FIG. 32, the user can write characters and graphics on the electronic blackboard screen 1400 in the method as described above. As the screen of word processor, a spreadsheet program, or presentation software or the like can easily be captured as a background of the electronic blackboard screen 1400 as described above, effective presentation can be carried out by using the electronic blackboard system 100.

Figure 31:
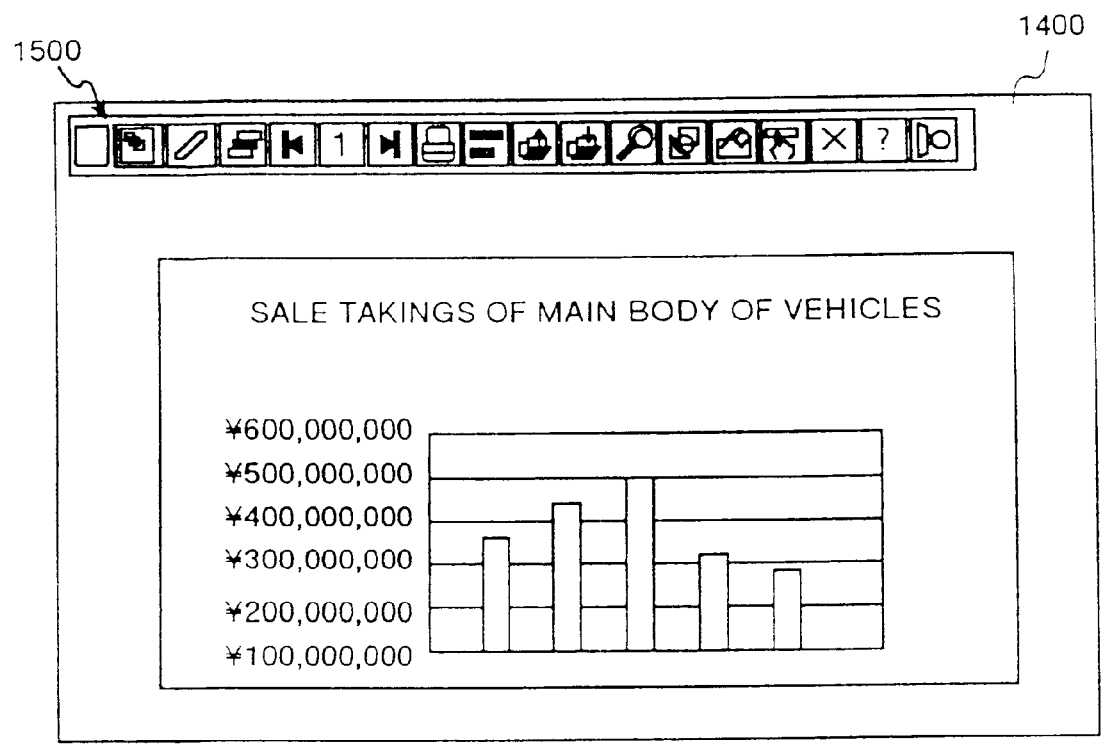
FIG. 31 is an explanatory view showing one example of how a screen of a captured application program is displayed as a background of the screen of the electronic blackboard in the electronic blackboard system according to Embodiment 1 of the present invention.

Namely, while presentation is being carried out by using presentation software with the electronic blackboard system 100, if a user wants to write something on the screen to describe it, the current screen is captured as soon as the capture button 3003 is touched to switch to the electronic blackboard screen 1400 as shown in FIG. 31, and the user can write a desired topic on the screen. Then, when the user wants to return the presentation software, the screen is switched to the screen of the presentation software (computer screen 3000) in response to touching the computer screen button 1402 with the user. The captured screen with characters or the like written thereon can be saved as described later.

It should be noted that, description has been made here for the method of displaying the computer screen 3000 once, starting the application program, and capturing a desired screen, but by directly specifying a file of the word processor or spreadsheet program from the electronic blackboard software 506, a corresponding application program is started from the to electronic blackboard screen 1400 and a specified file can be opened. When the user wants to capture the screen of the application program, the same operations as those described above may be carried out. Furthermore, when other screen of the application program is captured, touching the next page button 1407 allows the screen of the application program to be displayed again on the PDP 101.

8) Operation for Displaying Pages in Creation in a List Form

Figure 33:
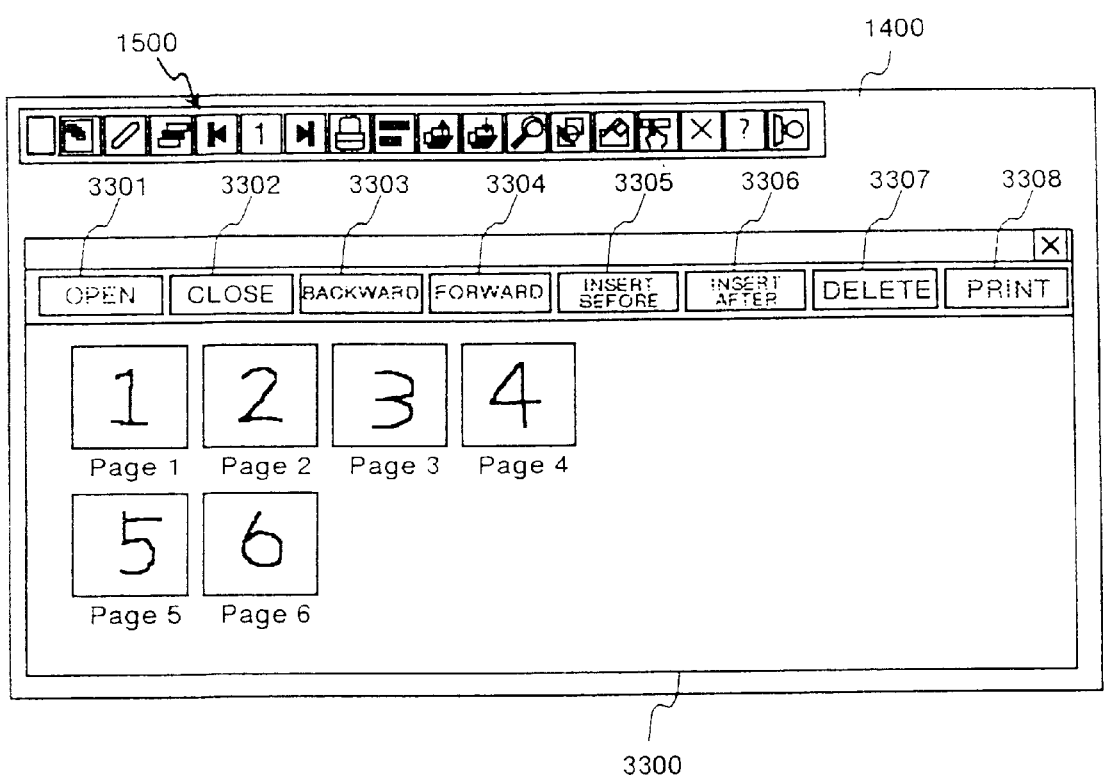
FIG. 33 is an explanatory view showing how a thumbnail display dialog box for displaying pages in creation in a list form is displayed in the electronic blackboard system according to Embodiment 1 of the present invention.

In the Electronic Blackboard Software 506, all of the pages in creation can be displayed in a thumbnail form. When the pages are displayed in a list form with thumbnails, a user touches the thumbnail button 1409 in the toolbar 1401 (or the extension toolbar 1500). The electronic blackboard software 506 displays, when the thumbnail button 1409 is touched, a thumbnail display dialog box 3300 for displaying pages in creation in a thumbnail form on the electronic blackboard screen 1400 as shown in FIG. 33.

Designated at the reference numeral 3301, in this thumbnail display dialog box 3300, is an open button, at 3302 a close button, at 3303 a backward button, at 3304 a forward button, at 3305 an insert before button, at 3306 an insert after button, at 3307 a delete button, and at 3308 a print button respectively.

When the thumbnail display dialog box 3300 is displayed, the user can perform operations described below.

① Operation for Specifying and Opening a Page

A desired thumbnail (page) in the thumbnail display dialog box 3300 is touched and selected, and the open button 3301 is touched, then the selected page can be displayed on the electronic blackboard screen 1400. Furthermore, a desired page is double-touched, so that the page can also be displayed as an electronic blackboard screen 1400.

② Movement of a Page

A page to be moved in the thumbnail display dialog box 3300 is touched and selected, and when the page is to be moved backward from the current page, the backward button 3303 is touched, and the forward button 3304 is touched when the page is to be moved forward from the current page. By moving the page as described above, an operation for replacing pages can be carried out.

③ Operation for Inserting a New Page

A previous page or a next page of a page to be inserted anew in the thumbnail display dialog box 3300 is touched and selected, and when the page is to be inserted before the selected page, the insert before button 3305 is touched, and the insert after button 3306 is touched when the page is to be inserted after the selected page. By operating as described above, a new page can be inserted in a desired position.

It should be noted that, by selecting the final page and touching the insert next button 3306, the same operation as that for creating a new page by touching the next page button 1407 described above can be performed.

④ Operation for Deleting a Page

A page to be deleted in the thumbnail display dialog box 3300 is touched to be selected, and the delete button 3307 is touched, so that the selected page can be deleted.

⑤ Operation for Printing a Page

A page to be printed in the thumbnail display dialog box 3300 is touched and selected, and the print button 3308 is touched, so that the selected page can be printed. It should be noted that, various settings can be performed when printing is executed. Print setting will be described later.

9) Operation for Saving Created Pages

As described above, a page created on the electronic blackboard software 506 can be saved as a file. For saving, the save button 1502 in the extension toolbar 1500 is touched, and either "save (overwrite)" or "save as . . . " is selected. When "save as . . . " is selected, the electronic blackboard software 506 provides current date/month/year and files name having serial numbers on the date as a default. The user inputs a file name and specifies a folder as required, and instructs to save them, and then a created page can be saved as a file. It should be noted that, a file name can be entered through the keyboard 503 (Refer to FIG. 5).

On the other hand, when "save (overwrite)" is selected, the electronic blackboard software 506 overwrites a corresponding file and saves it.

It should be noted that the electronic blackboard software 506 divides the electronic blackboard screen 1400 into a plurality of layers for management. They are, for instance, a background layer for managing a background of the electronic blackboard screen 1400 (which includes a captured screen: bitmap data), a grid layer for managing grid lines (vector data), a graphics layer for managing graphics created with graphics drawing tools (vector data), and a freehand layer for managing freehand characters and graphics (vector data). Then, when the "save as . . . " is selected, the electronic blackboard software 506 generates a file with those layers maintained as they are. Therefore, when the file is read out again, the contents of each page thereof can easily be processed. In addition, depending on a setting, data for the plurality of layers is integrated as one bitmap data, which can be saved as a bitmap file.

10) Print

Figure 34:
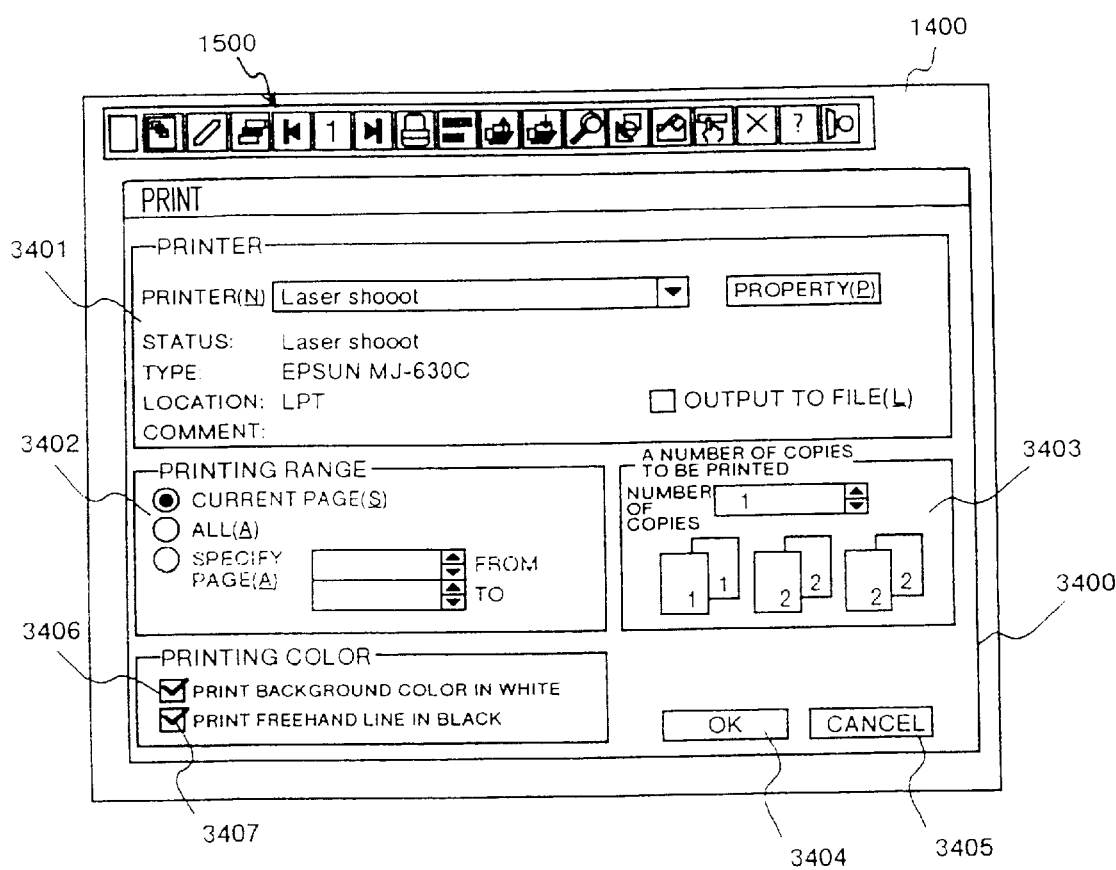
FIG. 34 is an explanatory view showing how a printing dialog box for printing pages in creation is displayed in the electronic blackboard system according to Embodiment 1 of the present invention.

When pages in creation are to be printed, a user touches the print button 1408 in the toolbar 1401 (or extension toolbar 1500), and touches "print" in the print menu (not shown). The electronic blackboard software 506 displays a print dialog box 3400 shown in FIG. 34 according to the operation by the user. The user specifies a an area to be printed and a number of copies to be printed in a printer specification column 3401, a print-area setting column 3402, and a number of copies setting column 3403 in this print dialog box 3400, and when the OK button 3404 is touched, printing is carried out by the preset printer (printer 106). It should be noted that, a cancel button 3405 is touched for stopping the printing.

Here, a background color of the electronic blackboard screen 1400 can also be set to blank and printed. When the processing of printing described above is to be executed, the user may perform operations for touching a check box 3406 "print background color in white" to select it, and touching the OK button 3404. The electronic blackboard software 506 executes, when the check box 3406 "print background color in white" is selected, the processing of printing regarding the background color of the electronic blackboard screen 1400 as blank. The provision of the setting described above allows consumption of ink or toner for the printer to be reduced.

A freehand line can also be printed in black. When the processing of printing described above is to be executed, the user may perform operations for touching a check box 3407 "print freehand line in black" to select it, and touching the OK button 3404. The electronic blackboard software 506 executes, when the check box 3406 "print freehand line in black" is selected, the processing of printing regarding the freehand line as black.

It should be noted that a size or a margin of recording paper for printing can be set and a printed image can be displayed although detailed description thereof is omitted herein.

11) Other

It is possible to set a display magnification of characters or the like displayed on the electronic blackboard screen 1400 and a method of displaying the electronic blackboard screen 1400 in a window form by touching the display button 1503 in the extension toolbar 1500 to open a menu.

It is also possible to set a background color of the electronic blackboard screen 1400 using a color pallet by touching the background setting button 1505 in the extension toolbar 1500 to open a menu.

Furthermore, it is also possible to set a work folder in which files to be used for the electronic blackboard software 506 are stored as a unit by touching the option button 1506 in the extension toolbar 1500 to open a menu.

(3) Case of Using the System as a Computer

In order to use the electronic blackboard system 100 as a computer, like in a case of using the capture function, the screen is switched to the computer screen 3000 as shown in FIG. 30 by touching the computer screen button 1401 on the electronic blackboard screen 1400 or ending the electronic blackboard software 506. By switching the display on the PDP 101 to the computer screen 3000, the electronic blackboard system 100 can be used as a computer. As the electronic blackboard system 100 has a large-sized PDP 101, it is possible to make an effective use of the system for educational activities of operating a computer or the like.

Furthermore, the touch input device 102 is usable as a pointing device like a mouse, therefore various applications can be operated on the screen. Furthermore, by touching the mouse button 3004 shown in FIG. 30, the functions assigned to the right button of the mouse can be used with a fingertip or a touch pen.

(4) Adjustment of a Touch Input Device

Created in the touch panel driver 507 shown in FIG. 5 is a tool for matching a display position of a mouse cursor on the PDP 101 with a touch position obtained by touching the touch surface with the fingertip or the touch pen. Description is made hereinafter for an operation of positional correction for matching a display position of a mouse cursor with a touch position.

Figure 35:
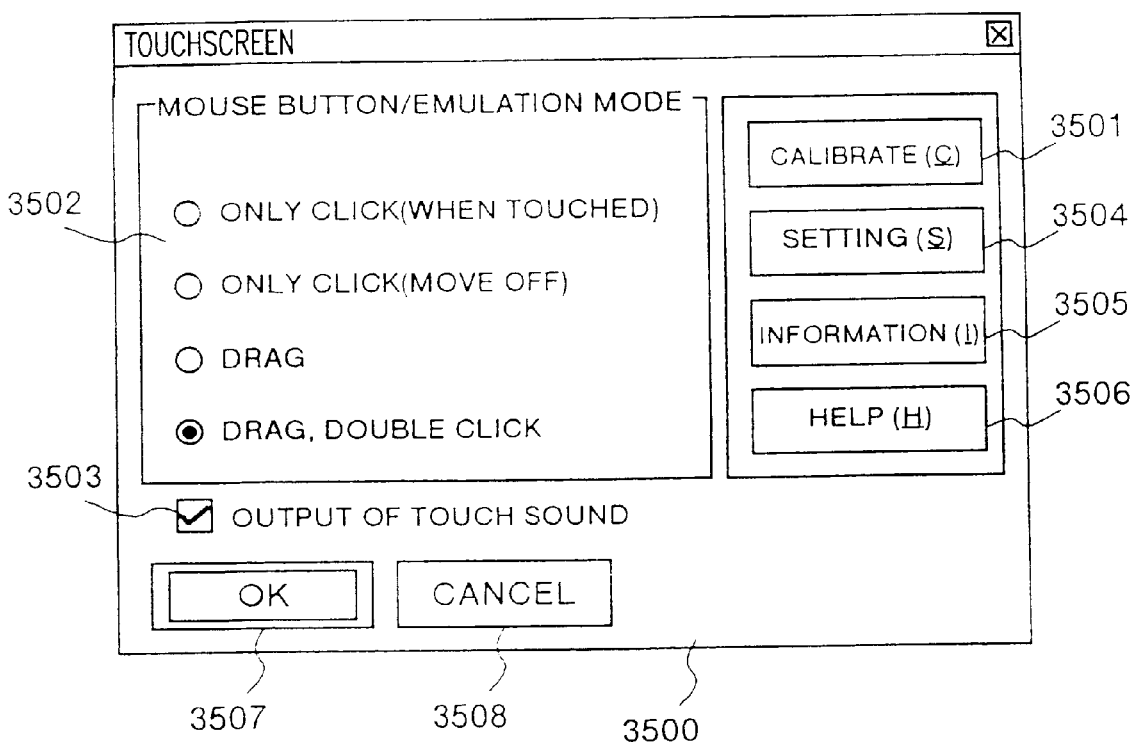
FIG. 35 is an explanatory view showing one example of a setting screen for the touch input device in the electronic blackboard system according to Embodiment 1 of the present invention.

FIG. 35 is an explanatory view showing one example of a setting screen of the touch input device 102. When a calibrate button 3501 in the setting screen 3500 shown in FIG. 35 is touched, a display screen of the PDP 101 and a correction screen for adjusting coordinate of the touch surface 201 in the touch input device 102 appear on the PDP 101. This display screen displays, for instance, three correction points on the upper left side, upper right side, and lower right side of the PDP 101. The user may touch the three points on the PDP 101 with his fingertip or the touch pen.

When any of the three correction points are touched by the user, the touch panel driver 507 executes positional correction processing for matching the display position of the mouse cursor with the touch position according to the touched position, and a result of positional correction is saved in a prespecified file.

However, the operation for positional correction is previously performed when the electronic blackboard system 100 is actually shipped as a product, therefore, a user need not perform the procedure for positional correction unless resolution or the like is changed.

It should be noted that, description is made for an outline of other setting items in the setting screen 3500. The reference numeral 3502 indicates a mouse button/emulation mode setting column, which is used for setting which processing is to be executed when the touch surface 201 is touched with the fingertip or the touch pen. In the mouse button/emulation mode setting column 3502, for instance, the following settings can be carried out:

① Setting so as to regard a point of time when the touch surface 201 is touched with a fingertip or a touch pen as a click, ② Setting so as to regard a point of time when a fingertip or a touch pen having touched the touch surface 201 is moved off as a click, ③ Setting so as to regard a point of time when a fingertip or a touch pen touching the touch surface 201 is moved along the surface in its touched state as drag, and ④ Setting so as to regard a case where the touch surface 201 is touched twice in a row with a fingertip or a touch pen (double touch) as a double click as well as to regard a point of time when a fingertip or a touch pen touching the touch surface 201 is moved along the surface in its touched state as drag (this setting is required when the electronic blackboard software 506 is used).

Furthermore, the reference numeral 3503 indicates an output setting check box for touch sound, and when this check box 3503 is checked, a beep is outputted each time when the touch surface 201 is touched. The reference numeral 3504 indicates a setting button, and when the setting button 3504 is touched, a screen for setting a method of connecting the controller 103 appears. Furthermore, designated at the reference numeral 3505 in the figure is an information button for displaying information on the controller 103 as well as on the touch panel driver 507, at 3506 a help button for displaying a help screen, at 3507 an OK button for validating an item or items set in the setting screen 3500, and at 3508 a cancel button for invalidating an item or items set in the setting screen 3500 respectively.

(5) Use of AV Equipment

Connected to the PDP 101 in the electronic blackboard system 100, as shown in FIG. 1, are various types of information equipment and AV equipment such as a video player 108, a laser disk player, a DVD player, and a video camera to enable reproduction of video and audio. In addition, an external speaker can be connected to the PDP 101 through an amplifier, which allows a user to enjoy a powerful sound with a large-sized display. Signals inputted from the information equipment, AV equipment, or the computer 104 to the PDP 101 can easily be switched using a remote control or the like which is not shown.

As described above, various types of information equipment and AV equipment can be connected to the PDP 101 and operated without the computer 104, so that the PDP 101 can be used as a large-sized screen monitor, which allows operability, adaptability for handling, and convenience of the electronic blackboard system 100 to be improved without requiring other equipment such as a television to be prepared.

(6) Connection to a Network

Figure 36:
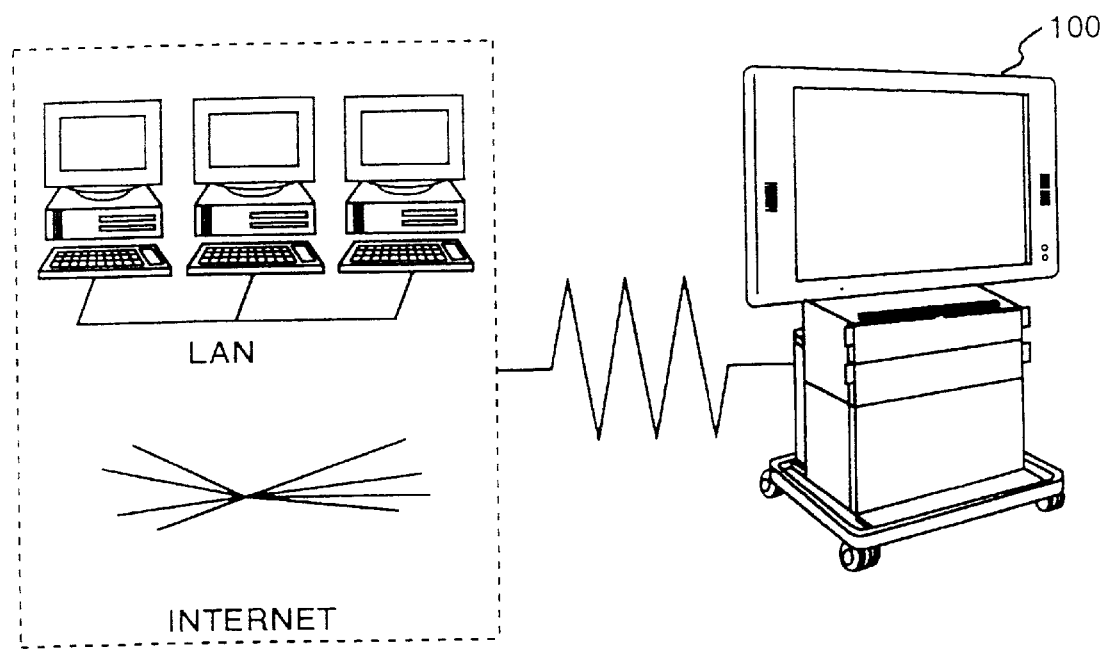
FIG. 36 is an explanatory view for illustrating network connection for the electronic blackboard system according to Embodiment 1 of the present invention.

Furthermore, as shown in FIG. 36, the electronic blackboard system 100 can be connected to a network such as an LAN and the Internet. Therefore, applicability of the electronic blackboard system 100 can be widened to the extent of: transmitting materials or the like for a conference prepared with the electronic blackboard software 506 to other computer, reading in data prepared by other computer and using it in a conference, teleconferencing by connecting a plurality of electronic blackboard systems 100 to each other, and applying the electronic blackboard system 100 in a video conference system or some other occasions. In addition, the electronic blackboard system 100 can be connected to a network based on radio with a PHS.

3. Effects

As described above, with the electronic blackboard system according to Embodiment 1, the electronic blackboard system 100 comprises the board section 601 constituting a display surface and a write-in surface of an electronic blackboard with the PDP 101 and the touch input device 102; and the frame unit 600 having an equipment accommodating section 604 in which the computer 104, video player 108, and printer 106 are accommodated in the vertical direction, therefore, movement and installation of the system can easily be performed only by moving the frame unit 600. As the devices are arranged in the order of the heaviest one to a lighter one from the bottom in the direction of gravity (vertical direction), stability of the frame unit 600 when it is moved and installed can be insured. Furthermore, a shielding tape 300 for shuttering off electromagnetic waves is provided in the surface of the PDP 101 side in the touch input device 102 based on the ultrasonic surface elastic wave system, so that the PDP 101 can be used as a display unit, and the display unit can be made thinner (minimized) and brightness of the display screen can be enhanced. Namely, with the electronic blackboard system 100 according to Embodiment 1, it is possible to enhance downsizing and integration of the electronic blackboard system 100 as a whole and also improve operability, adaptability of handling, and convenience thereof.

In addition, the electronic blackboard system 100 has an angle adjusting mechanism section 802 for adjusting an angle of the board section 60.1 with the PDP 101 and touch input device 102 accommodated therein, so that incoming interference light into the display surface of the PDP 101, especially, light from lighting equipment such as a fluorescent tube provided on the ceiling can be avoided, therefore, an image on the screen can easily be seen and convenience of the electronic blackboard system 100 can be improved.

Furthermore, the PDP 101 can be used as a large-sized screen monitor by using a plurality of connecting terminals for connecting various types of information equipment and AV equipment such as a digital camera, a DVD player, and a video equipment to the system, therefore, it is possible to provide an electronic blackboard system 100 for enabling connection and operation of the various types of information equipment and AV equipment without the computer 104 connected thereto.

Next description is made in Embodiments 2 to 6 for an image display unit, an input device, and a coordinate input device each applicable in the electronic blackboard system 100 according to Embodiment 1.

When the size of a display screen of a display unit such as the PDP 101 according to Embodiment 1 is about 100 inches in a width across corners, for example, it will be difficult for a presenter standing at the left side to the screen to directly point a display point (touch the touch surface 201) at the upper right corner. Therefore, in Embodiment 2, description is made for an image display unit in the electronic blackboard system which allows a presenter to perform a pointing operation in his natural posture to an image displayed on the screen toward the audience, which is required for a case when a presenter performs a pointing operation to an image displayed on a large screen.

The image display unit according to Embodiment 2 displays an icon for selecting create a point-operating area with the icon such as a press button at some corner of the display screen. When a presenter selects create a point-operating area with this icon and specifies a position where the point-operating area is created, a point-operating area creating section creates a rectangular point-operating area in a position instructed by the image display unit and displays the area. The presenter confirms the displayed point-operating area and points to a position corresponding to a display point on the display screen within the point-operating area in place of directly pointing to the display point on the display screen. When the presenter points to a position corresponding to a display point on the screen within the point-operating area, a pointer moving section moves a pointer (mouse cursor) on the display screen to the display point and points to the display point. Thus, the presenter can easily and accurately point to a display point on a large screen which the presenter can not reach.

Figure 37:
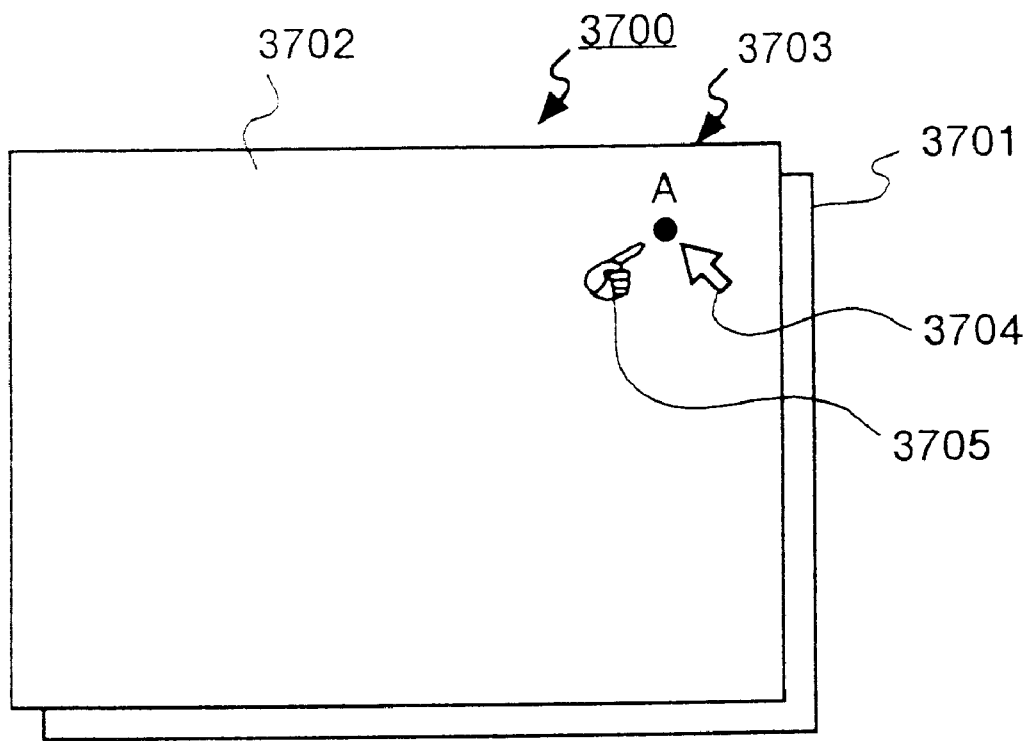
FIG. 37 is an appearance view showing an image display unit according to Embodiment 2 of the present invention.

FIG. 37 is an outer view of the image display unit according to Embodiment 2. The image display unit 3700 shown in FIG. 37 comprises an image display section 3701 (corresponding to the PDP 101 according to Embodiment 1) and a large-sized screen display having a touch input device 3702 (corresponding to the touch input device 102 according to Embodiment 1) based on a ultrasonic elastic wave system provided on the surface of the image display section 3701.

Figure 38:
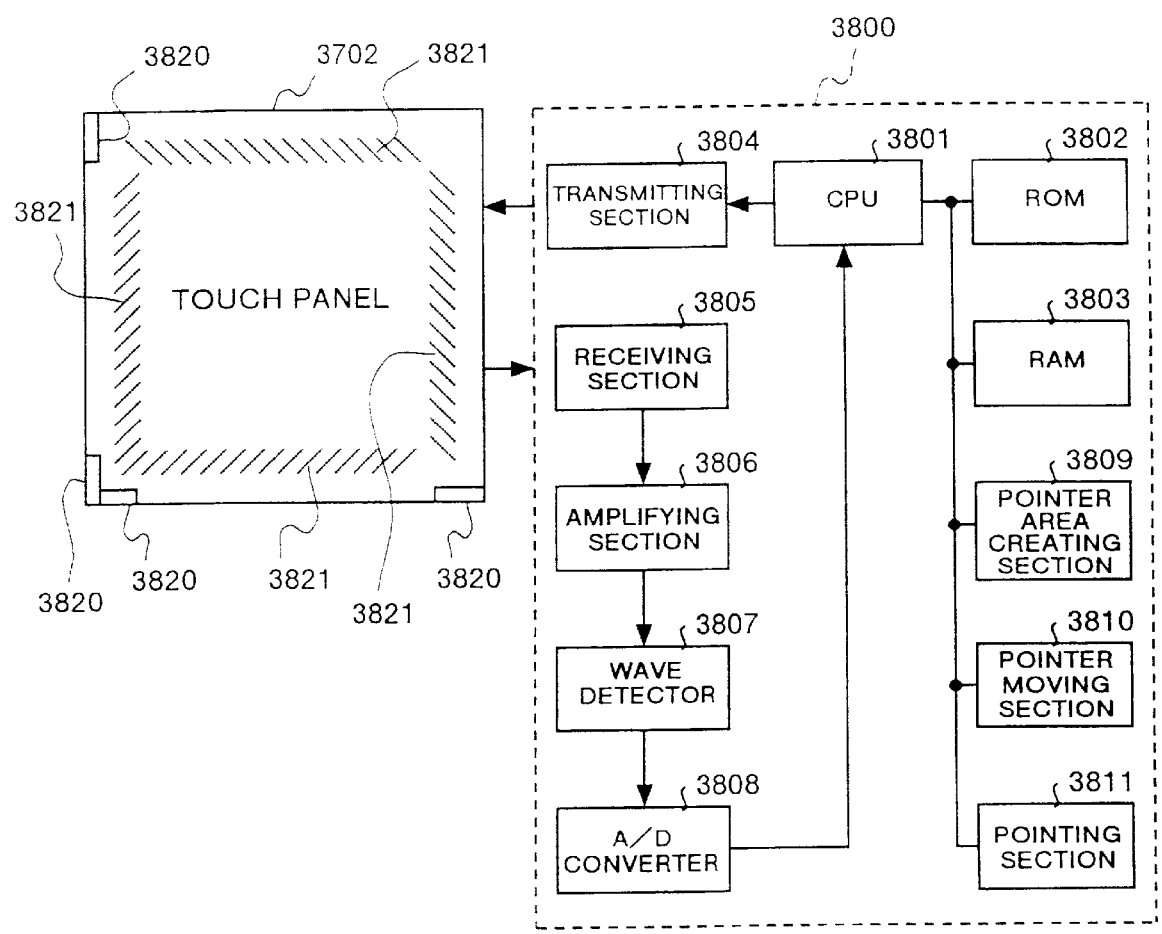
FIG. 38 is a block diagram showing a control section in the image display unit according to Embodiment 2 of the present invention.

As shown in the block diagram in FIG. 38, a control section 3800 in an image display unit 3700 comprises a CPU 3801, a ROM 3802, a RAM 3803, a transmitting section 3804, a receiving section 3805, an amplifying section 3806, a wave detector 3807, an A/D converter 3808, a pointer area creating section 3809, a pointer moving section 3810 and a pointing section 3811. It should be noted that, the control section 3800 shown in FIG. 38 corresponds to the controller 103 and computer 104 according to Embodiment 1.

Figure 39:
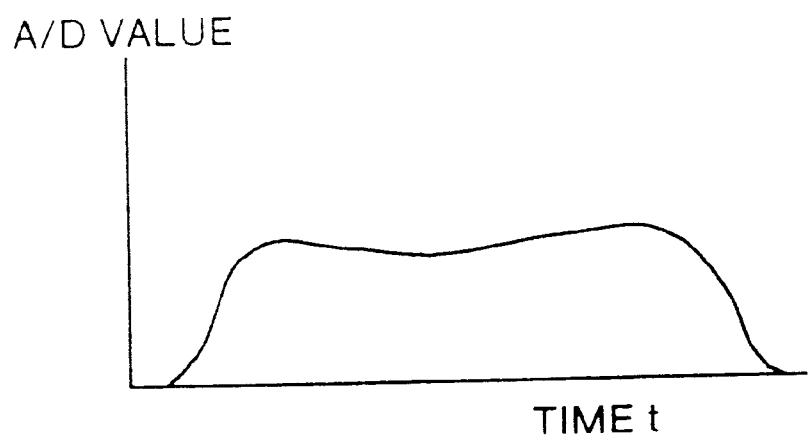
FIG. 39 is an explanatory view showing an output waveform from the touch input device at the time of its non-contact state in the image display unit according to Embodiment 2 of the present invention.
Figure 40:
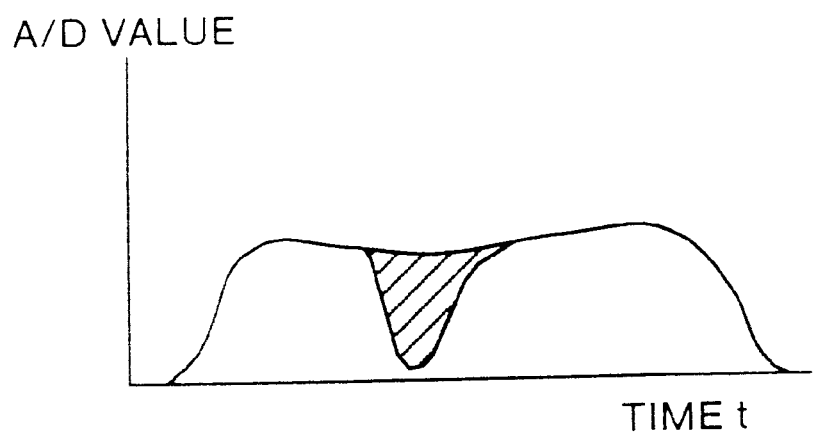
FIG. 40 is an explanatory view showing an output waveform from the touch input device at the time of its contact state in the image display unit according to Embodiment 2 of the present invention.

The CPU 3801 manages the device as a whole. The transmitting section 3804 electrically generates a burst wave, and transmits the generated electric vibrations to the touch input device 3702. A transducer 3820 on the touch input device 3702 converts the transmitted electric vibrations to mechanical vibrations, and sends surface elastic waves onto the touch input device 3702. These surface elastic waves have a capability of rectilinear movement and proceed substantially straight ahead. Some of the surface elastic waves moving rectilinearly are reflected by 90 degrees with a first reflecting element 3821 on the touch input device 3702, and some passe therethrough. The transmitting surface elastic waves are affected similarly by the next first reflecting element 3821. The surface elastic waves reflected as described above proceed each with a time difference in parallel to the vertical axis of the touch input device 3702. The surface elastic waves having this time difference are reflected again by 90 degrees with a second reflecting element. The surface elastic waves reflected for the second time pass through one route and are received by a transducer 3820 located diagonally and symmetrically with respect to a central section of the touch input device 3702. The mechanical vibrations are converted again to electric vibrations by this receiving transducer 3820 and sent to the receiving section 3805. As the electric vibrations received with this receiving section 3805 are very low, the low electric vibrations are amplified by the amplifier 3806, rectified by the wave detector 3807 to be converted to waveforms as shown in FIG. 39 and FIG. 40 respectively. This waveform is digitized by the A/D converter 3808 and stored on the RAM 3803.

Herein, the waveform shown in FIG. 39 is a received waveform when a fingertip does not touch the touch input device 3702, and a received waveform shown to the time axis corresponds to a position along the reflecting element 3821 from a transmitting/receiving section on the touch input device 3702. The waveform shown in FIG. 40 is a received waveform when a fingertip or the like touches the touch panel 3702. Surface elastic waves passing along the touch panel 3702 touched with the finger tip are attenuated due to touching, therefore, a received signal level corresponding to the position becomes low. This received waveform in non-touching is stored in the RAM 3803, and compared to the received waveform in touching, so that a position where a fingertip touches the panel can be decided. Namely, a touched position indicates a portion where the level of attenuation becomes maximum, therefore, the touched position is found out through careful observation thereof, or a zerocrossing position is decided as a touched position by differentiating the received waveform. This detection of a touched position is made in the X-axial direction and Y-axial direction, and a touched position on the touch input device 3702 can be detected.

Figure 41:
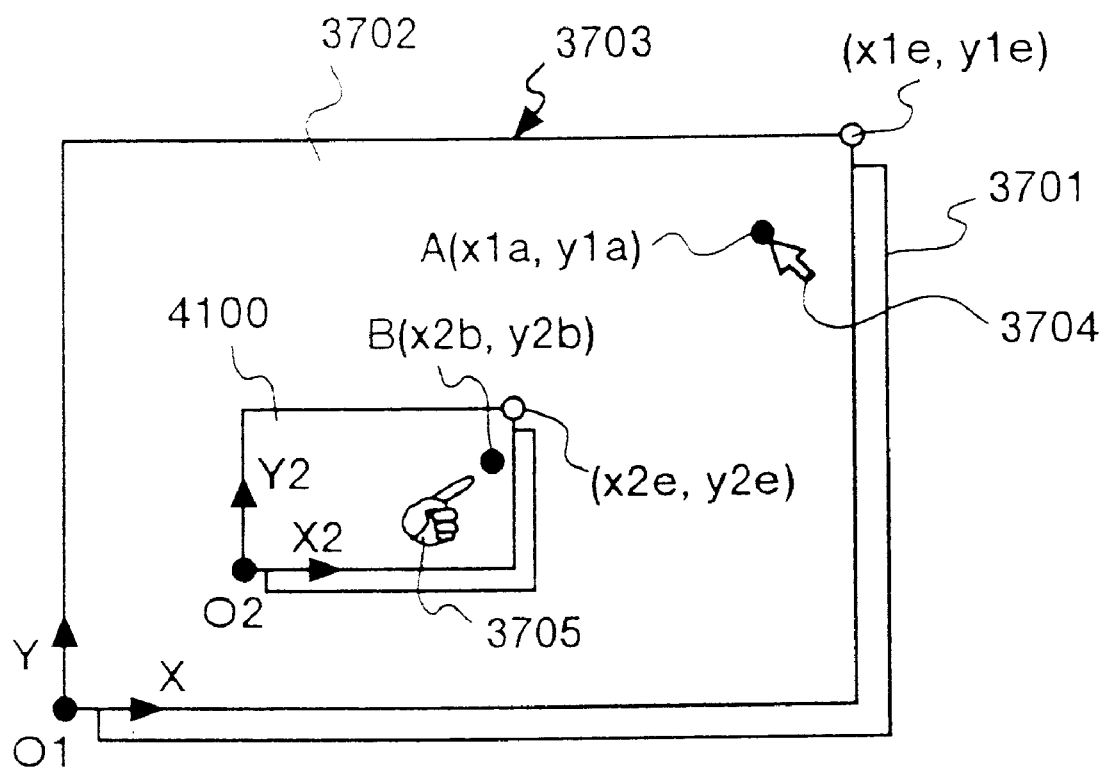
FIG. 41 is an explanatory view showing a screen displaying a point-operating area on the image display unit according to Embodiment 2 of the present invention.
Figure 42:
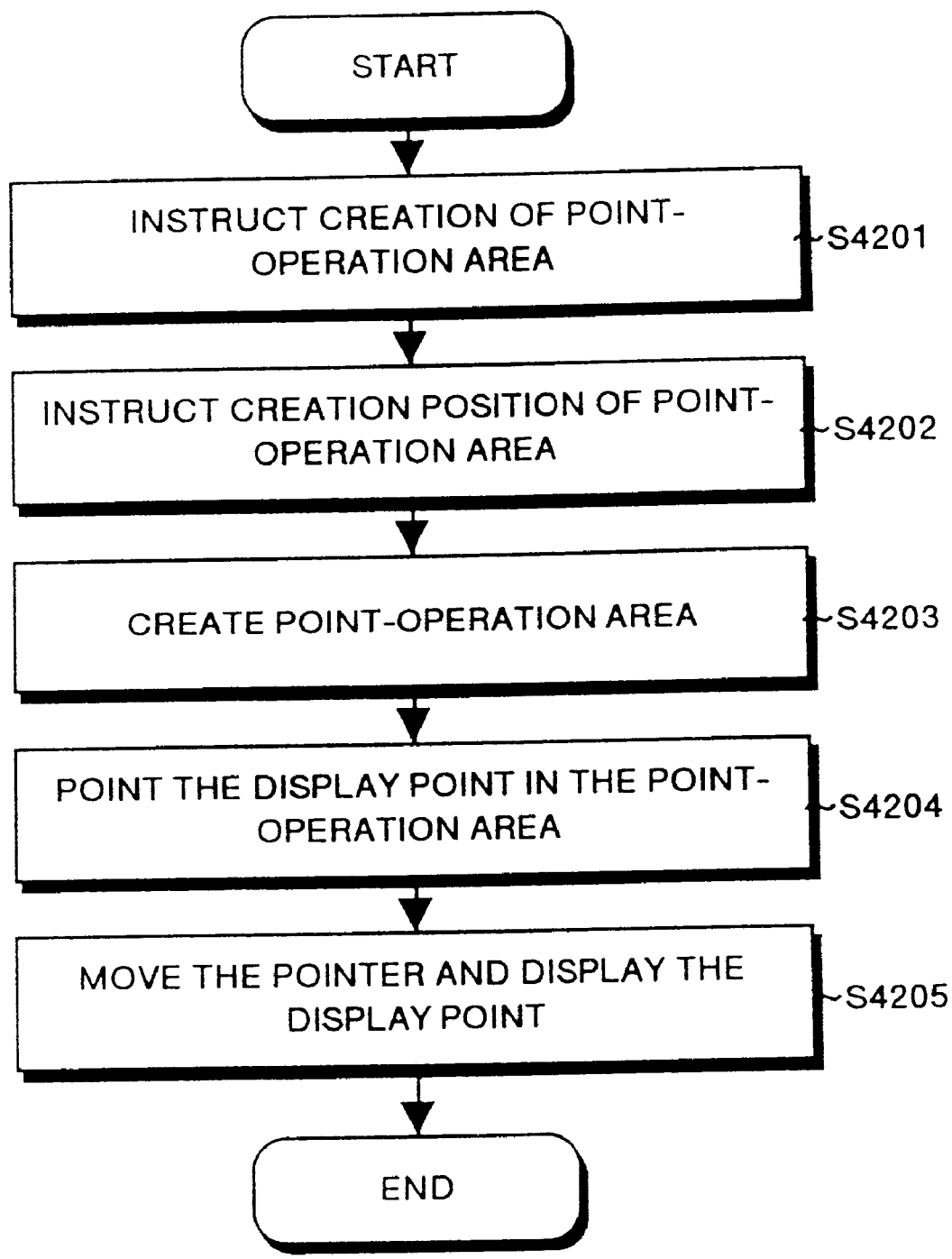
FIG. 42 is a flow chart showing a point operation in the image display unit according to Embodiment 2 of the present invention.

In the image display unit 3700 configured as described above, description is made for an operation when a point A on the display screen of the image display section 3701 is pointed, for example, as shown in FIG. 37 with reference to the view with points displayed thereon in FIG. 41 and the flow chart in FIG. 42. In an ordinary operating situation, when a presenter using the image display unit 3700 touches the point A on the screen 3703 with his fingertip, the situation is regarded as that the presenter points to the point A and the pointer 3704 is moved to the point A. For example, when a display screen of this image display section 3701 measures, for instance, about 100 inches in its width across corners, it will be difficult for the presenter standing at the left edge to the screen to directly point to the point A at the upper right side. Therefore, the CPU 3801 displays an icon for selecting create a point-operating area with the icon such as a press button at some corner of the image display section 3701. When a presenter selects create a point-operating area with this icon and specifies a position where the point-operating area is created (S4201, S4202), the pointer area creating section 3809 reduces the image display section 3701 and the touch input device 3702 shown in FIG. 41 to an instructed size, creates a rectangular point-operating area 4100, and displays on the image display section 3701 (step S4203).

The presenter having confirmed this point-operating area 4100 points to a point B corresponding to the point A within the point-operating area 4100 in place of directly pointing to the point A on the display screen 3703 (step S4204), and then the pointer moving section 3810 moves the pointer 3704 to the point A on the display screen 3703 and points to the point A (step S4205). The point A on the large screen which the presenter does not reach can directly be pointed to as described above.

Figure 43A:
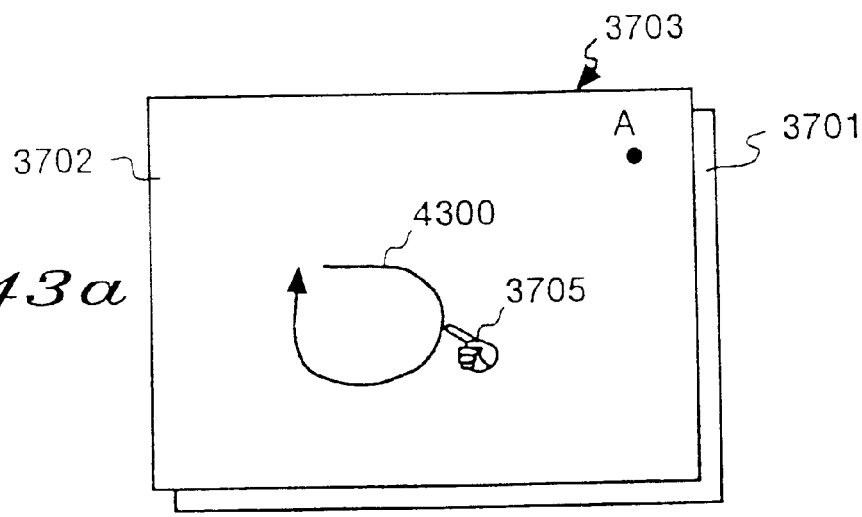
FIG. 43 is a view of processing steps showing display and deletion of a point-operated area in the image display unit according to Embodiment 2 of the present invention.
Figure 43B:
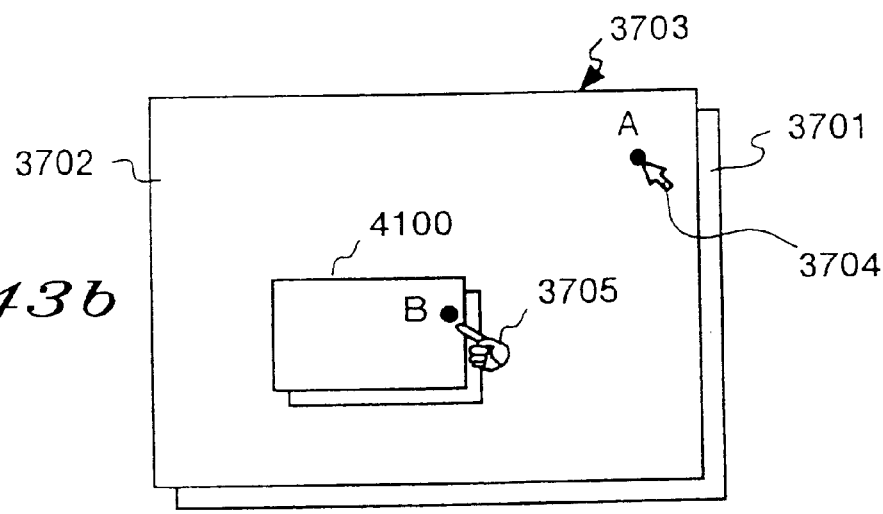
Figure 43C:
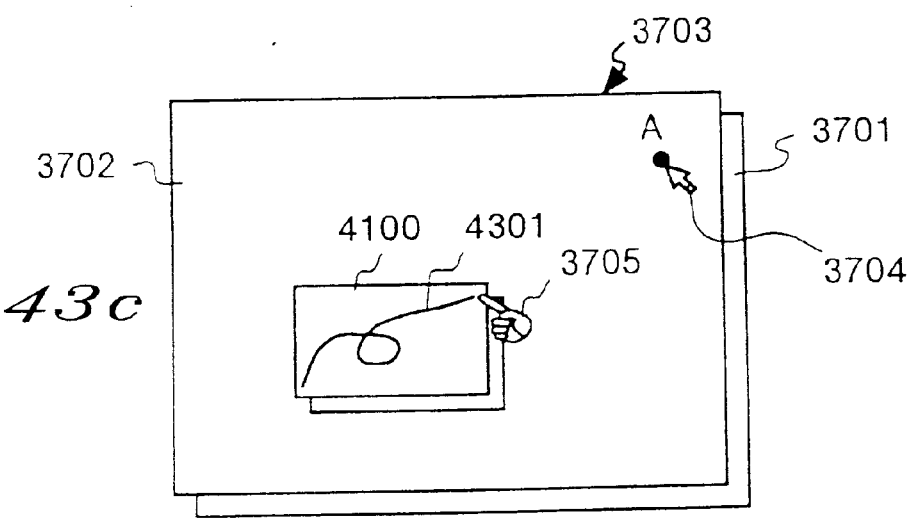
Figure 44:
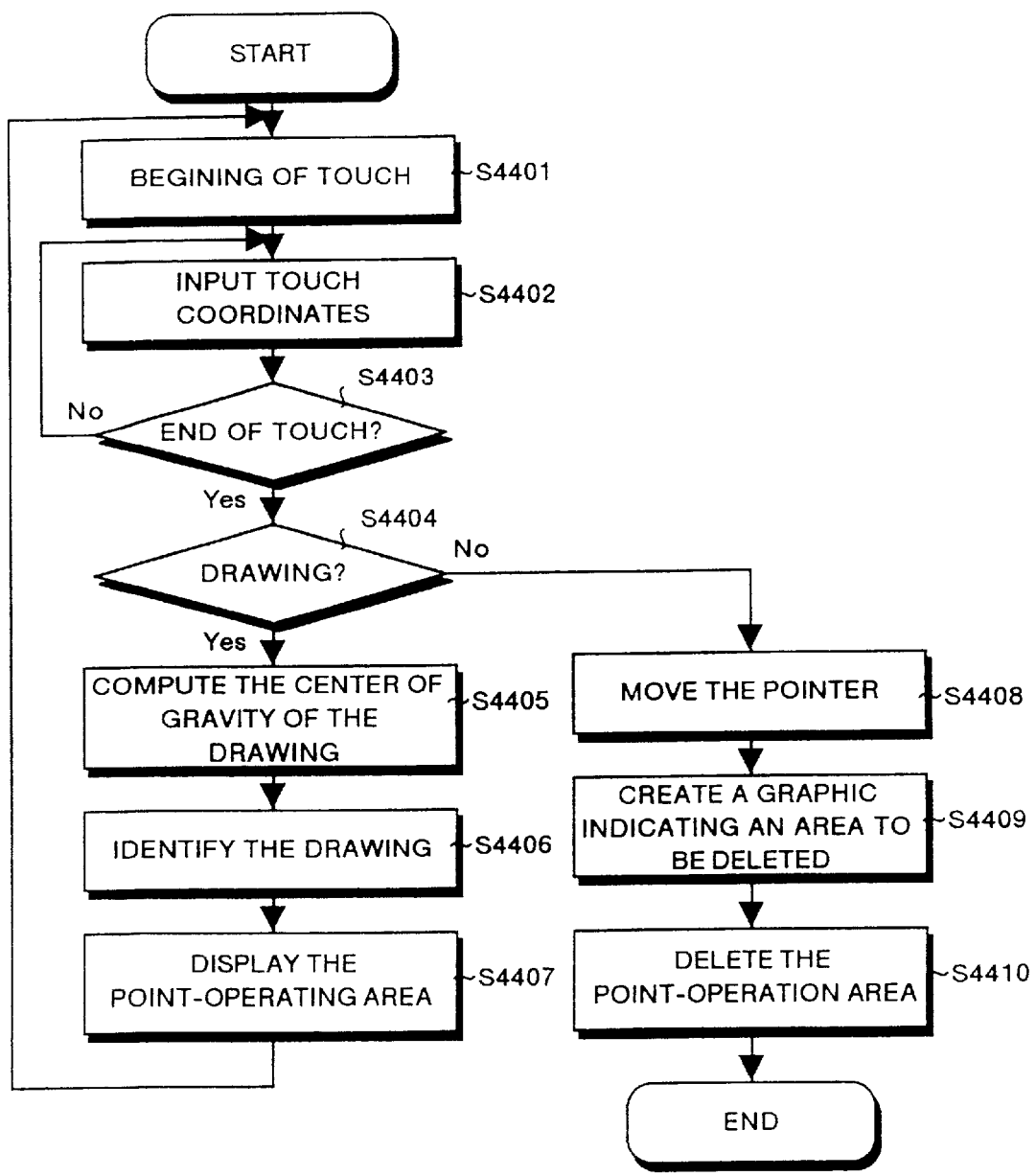
FIG. 44 is a flow chart showing the processing for display and deletion of a point-operated area in the image display unit according to Embodiment 2 of the present invention.

Detailed description is made for an operation when an point-operating area 4100 is displayed on a display screen 3703 of the image display section 3701 in its ordinary operating state shown in FIG. 37 by the pointer area creating section 3809 as shown in FIG. 41 and the displayed point-operating area 4100 is deleted with reference to the views for processing steps in FIG. 43 and the flow chart in FIG. 44. As shown in FIG. 43(*a*), when a presenter creates a loop-shaped trail having a geometrical feature previously defined, for instance, a trail 4300 similar to a rectangle, the CPU 3801 determines that the presenter's fingertip have touched the touch input device 3702, and continuously records touch coordinates and times in the RAM 3803 from the point of time when the finger has touched it until the finger moves off the touch input device 3702 (S4401 to S4403).

The pointer area creating section 3809 determines whether the presenter has created a drawing or has pointed to a point by touching the touch input device 3702 according to the coordinates and times recorded in the RAM 3803 (S4404).

The pointer area creating section 3809 computes, when it is determined that the drawing has been created as shown in FIG. 43(*a*), the center of gravity in a created pattern according to the created drawing 4300 (S4405), identifies a type of pattern (S4406), and creates a point-operating area 4100 as shown in FIG. 43(*b*) at the position of the center of gravity in the created pattern as a reference if it is determined that the identified pattern is, for instance, a rectangle and displays the area on the screen 3703 (S4407).

When the presenter points, in the above state, to the point B corresponding to the point A on the screen 3703 by touching the touch input device 3702, the pointer area creating section 3809 determines that the pointing is instructed (S4401 to S4404). When it is determined that the pointing has been instructed by the pointer area creating section 3809, the pointer moving section 3810 moves the pointer 3704 on the screen 3703 to the point A on the screen 3703 corresponding to the point B to which pointing is instructed and displays the moved pointer (S4408).

In the above state, when a non-loop-shaped trail 4301 is created in the point-operating area 4100 by the presenter as shown in FIG. 43(*c*) and touch coordinate and each time of the trail 4301 are stored in the RAM 3803, the pointer area creating section 3809 determines that the created trail 4301 is a graphic to be deleted and deletes the point-operating area 4100 from the screen 3703 (S4409, S4410). When this point-operating area 4100 is to be deleted, if the center of gravity in the trail 4301 to the center of gravity in the point-operating area 4100 is closer as compared to a preset value, the trail 4301 is determined as a graphic to be deleted, which makes it possible to suppress redundancy of the operation.

Description is made for the processing, when the point B in the point-operating area 4100 is instructed to be pointed to as described above, for a case where the coordinate of the instructed point B are transformed to coordinate of the point A on the screen 3703. When the point-operating area 4100 is displayed by reducing the image display section 3701 and the touch input device 3702 at a specified reduction rate, as shown in FIG. 41, assuming that, for instance, a lower left edge of the screen 3703 is the origin O1, each point of the screen 3703 is expressed with X–Y coordinates, and coordinate of a point C1 diagonal to the origin O1 are (x1e, y1e), and assuming that a lower left edge of the point-operating area, corresponding to the origin O1 is the origin O2 of the point-operating area 4100 and coordinate of a point C2 in the point-operating area 4100 corresponding to the point C1 are (x2e, y2e), coordinate (x2, y2) of each point in the point-operating area 4100 correspond to coordinate (x1, y1) of each point on the screen 3703 one vs. one through a factor K decided based on a relation between the coordinate (x1e, y1e) and the coordinate (x2e, y2e). Therefore, the pointer moving section 3810 can transform coordinate values from the coordinate (x2b, y2b) of the point B pointed in the point-operating area 4100 to coordinate (x1a, y1a) of the point A on the screen 3703, and can accurately move the pointer 3704 to the point A.

Figure 45:
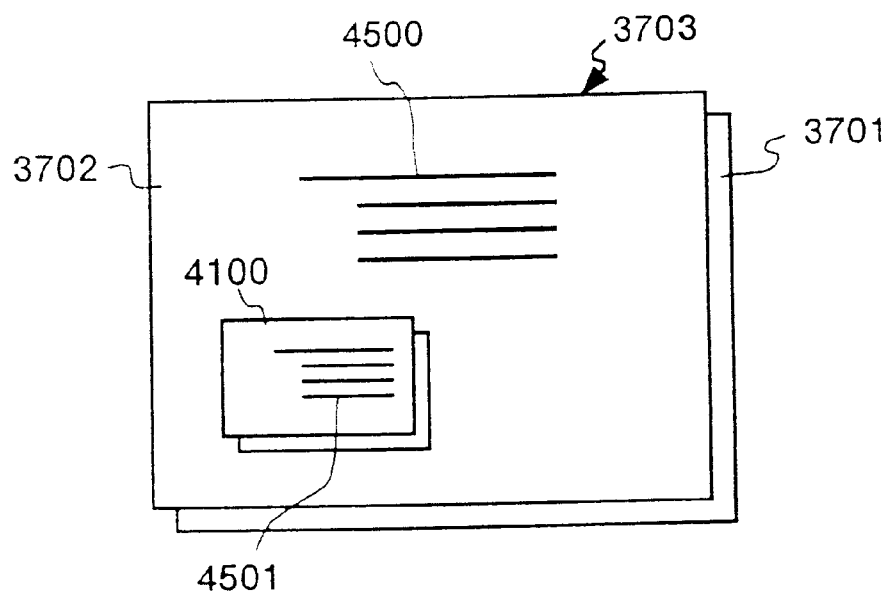
FIG. 45 is an explanatory view showing a display of the display contents on the display screen displayed within the point-operated area in the image display unit according to Embodiment 2 of the present invention.

In this case, as each point in the point-operating area 4100 corresponds to each point on the screen 3703 one vs. one, the point-operating area 4100 is recognized by a user that it is equivalent to a reduced screen of the full screen 3703. Therefore, when the point-operating area 4100 is displayed, as shown in FIG. 45, a similar reduced object 4501 obtained by reducing an object 4500 such as characters and graphics displayed on the full screen 3703 can be displayed on the point-operating area 4100.

Figure 46:
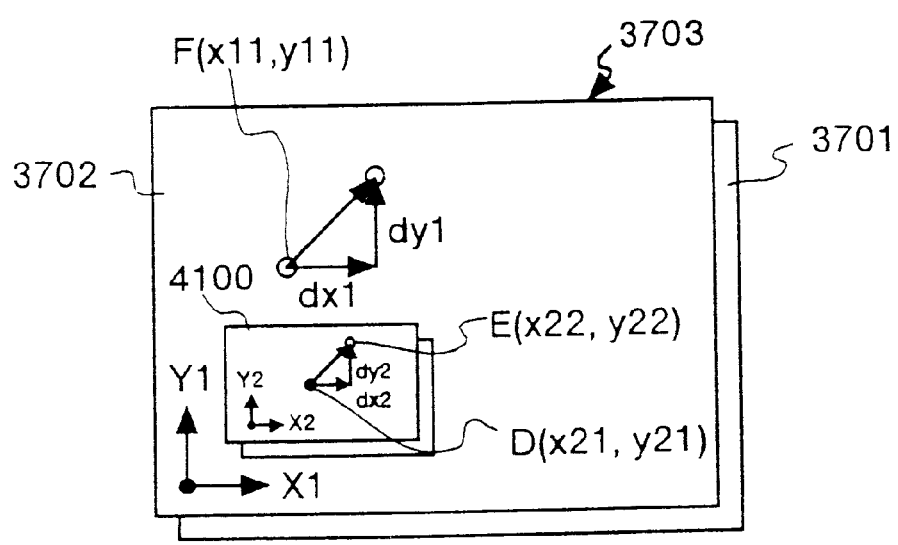
FIG. 46 is an explanatory view showing a moving operation of the points in association with transformation of coordinates in the image display unit according to Embodiment 2 of the present invention.

As the processing of transforming the coordinates of the instructed point B to the coordinates of the point A on the screen 3703, the case of transforming the coordinate (x2b, y2b) of the point B pointed on the point-operating area 4100 to the coordinate (x1a, y1a) of the point A on the screen 3703 has been described, but the pointer 3704 on the screen 3703 can also directly be moved. Description is made for the processing in this case with reference to FIG. 46. Relative values in movement of coordinate in the point-operating area 4100 correspond to relative values in movement of the pointer 3704 on the screen 3703 through the factor K. Therefore, when the presenter instructs to move a display position F (x11, y11) of the pointer 3704 on the screen 3703 by moving an arbitrary point D (x21, y21) on the touch input device 3702 in the point-operating area 4100 to a point E (x22, y22) while keeping on touching it with his fingertip, a coordinate data row instructed in the point-operating area 4100 is inputted with coordinate of X2–Y2. By differentiating or executing differential operation of this inputted coordinate data row, the transform (dx2, dy2) of the inputted coordinate is operated in appropriate time intervals. The transformation of touch coordinate along time within the point-operating area 4100 and the transformation (dx1, dy1)

of the coordinate obtained by multiplying the touch coordinate by the factor K transform coordinate (x11, y11) of the pointer 3704 on the screen 3703 and the moved pointer can be displayed. In this case, the point D within the point-operating area 4100 may not correspond to a display position F of the pointer 3704 on the screen 3703 one vs. one, therefore, the transformation (dx2, dy2) of the coordinate can be correlated to transformation of coordinate of the point F on the screen 3703 through the factor K, and the pointer 3704 on the screen 3703 can be operated in much the same way the mouse is operated.

If this processing of operating the pointer 3704 on the screen 3703 in much the same way the mouse is operated and the processing of using coordinate of a point B pointed on the point-operating area 4100 are switched as required, a user can use properly either the mouse emulation or the pointing operation based on coordinate according to the situation.

The image display unit 3700 is premised on displaying an image generated by a computer. For moving an object in a displayed image or moving an icon or a window in an operating system, an ordinary mouse operation is carried out by moving an pointed over an object, pressing a button (pointing operation) thereon, and moving the object to a desired position in its pressed state. This operation is generally known as an operation called drag. Description is made hereinafter for an operation in a case of a drag operation when a point-operating area 4100 is displayed on a screen 3703 of the image display unit 3700 and a pointer is moved to a position wherever it is on the full screen 3703 by pointing to any coordinate within the area.

The image display unit 3700 has no button mechanism as that in an ordinary mouse because a pointer is moved based on transformation of coordinate due to touching the touch input device 3702. As a method of realizing an operation in place of the ordinary mouse operation, a cursor is moved up to target coordinate within the point-operating area 4100, and an object-displayed surface is tapped with a finger at the target position.

Figure 47:
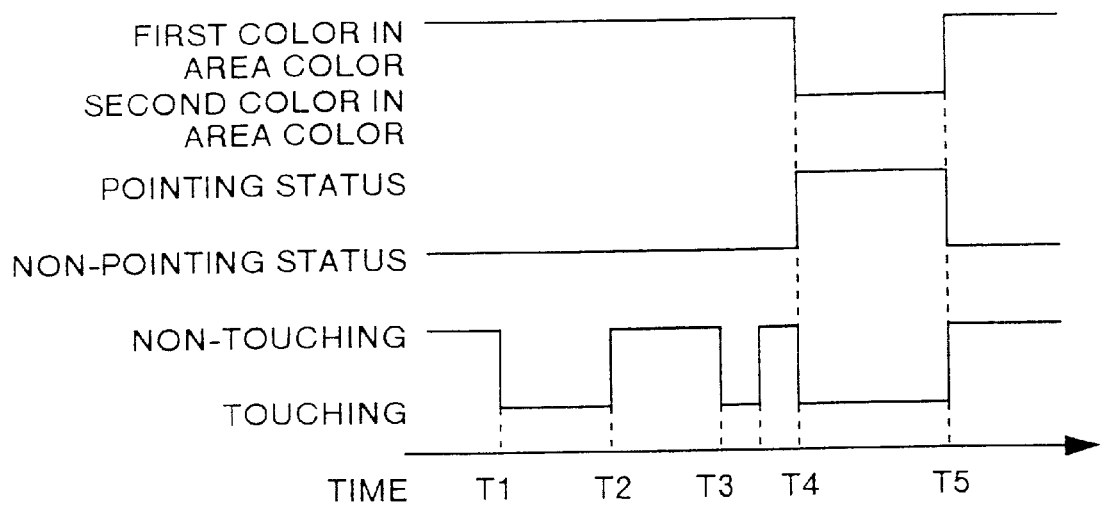
FIG. 47 is a time chart showing drag operations according to operations within a point-operated area.

For instance, FIG. 47 shows changes of a state of touching the touch input device 3702 with the fingertip 3705 on the time axis. During the time T1, the fingertip 3705 is moved keeping on its touching the point-operating area 4100 of the touch input device 3702, and the pointer 3704 is moved to a desired object on the screen 3703. During the time T2, the pointer 3704 is moved up to the desired object, the fingertip 3705 is moved off the touch input device 3702 once, and at the point of time T3, the object at the position is tapped with the fingertip. At the point of time T4 when the operation is ended and thereafter, the pointing section 3811 selects a desired object and shifts to a state in which the mouse button has been pressed down (a pointing state). This determination above can be made, for instance, by switching the state of touching the point-operating area 4100 of the touch input device 3702 to the non-touching state and vice versa within an appropriate time interval. Furthermore, the pointing section 3811 changes the display color of the point-operating area 4100 from a first color at a state of not pointing to the area to a second color. According to this change in display color, a user can accurately recognize that the state has been changed to a pointing state even when there is no mechanical button thereon. In this state, the fingertip 3704 is touched again the point-operating area 4100, the pointed object is moved, and the fingertip is moved off the object at the point of time T5, so that the movement of the object is completed and the state of pointing to the object is released.

Although description has been made for the case where the point-operating area 4100 is tapped once at the point of time T3 when the state is shifted to the pointing state in the above example, one of a certain number of states may be selectively specified depending on a number of times of tapping in a case of a plurality of times of tapping. Furthermore, during a state shifting process for changing states by tapping the point-operating area 4100, a user can recognize that the current state is in the process of shifting to the other state by switching the display color in the point-operating area 4100 to a third color, therefore, malfunction can be reduced.

As described above, with the image display unit in the electronic blackboard system according to Embodiment 2, a point-operating area 4100 used for pointing to a display point on a displayed image appears on a desired position according to an instruction by a user, and the user points to a position corresponding to the display point within the point-operating area 4100 to move the pointer 3704 on the display screen 3703 to the display point and points thereto with the pointer, and for this reason a presenter can easily and accurately point to a display point on a large screen which the presenter can not reach.

Furthermore, a position and a size of the point-operating area 4100 are instructed by touching the touch input device 3702 with the fingertip or the like, so that the point-operating area 4100 can be displayed on an arbitrary position with a simple operation, and pointing to a display point on the display screen 3703 can easily be performed.

In addition, each coordinate within the point-operating area 4100 are displayed in correlation to coordinate within all area on the image display surface one for one, so that a position to be pointed can easily be specified on the point-operating area 4100.

Furthermore, the pointer 3704 is moved by correlating transform of the coordinate to which is pointed with the pointer within the point-operating area 4100 to movement of coordinate of the pointer on an image display surface, so that the pointer 3704 on the screen 3703 can be operated in much the same way the mouse is operated.

In addition, a user selectably uses a pointing operation based on absolute coordinate and a pointing operation based on transform of coordinate as required, so that the user can use properly either the mouse emulation or the pointing operation based on absolute coordinate according to the situation.

Furthermore, layout information of display contents on a full display surface is displayed on the point-operating area 4100, so that a user can check the display contents on the point-operating area 4100, therefore, a pointing operation on a large-sized screen can easily be performed.

Furthermore, by tapping some point within the point-operating area 4100 once or a plurality of times, a plurality of pointing states can be obtained according to a number of times of tapping, so that a pointing operation on a large-sized screen can easily be performed. When this plurality of pointing states can be obtained, malfunction and a miss operation of the system on pointing can be reduced by changing display colors on the point-operating area 4100 according to a pointing state.

If a security function is provided in the electronic blackboard system according to Embodiment 1 and a personal identification number is inputted through a touch input device, a PID number to be inputted may be seen by some other persons. Therefore, in Embodiment 3, description is made for an input device which can prevent a PID number from being seen by other persons when a PID number is inputted in the electronic blackboard system. Specifically, the input device according to Embodiment 3 displays a ten-key on a position over which a person entering the number casts his shadow when viewed from other persons, so that the ten-key used for entering a PID number is hidden by the person entering it, which allows the ten-key not to be seen from other persons.

Figure 48:
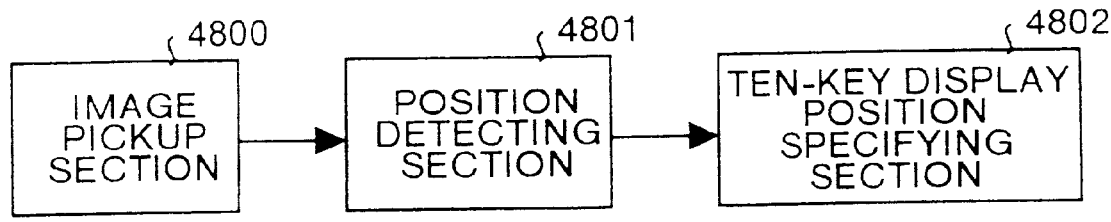
FIG. 48 is a block diagram showing a first example of configuration of an input device according to Embodiment 3 of the present invention.

FIG. 48 is a view showing a first example of configuration of the input device according to Embodiment 3. This input device comprises a coordinate inputting section (corresponding to the touch input device 102 in Embodiment 1) for detecting a position of a substance having touched an input surface on the touch surface, and an image display section (corresponding to the PDP 101 in Embodiment 1) for displaying an image on a screen commonly used as the input surface, and further comprises an image pickup section 4800 for picking up an image of a person who enters a PID number, a position detecting section 4801 for detecting a position of the person who enters a PID number according to the image picked up by the image pickup section 4800, and a ten-key display position specifying section 4802 for displaying the ten-key according to the position obtained by the position detecting section 4801 of the image display section.

Figure 49:
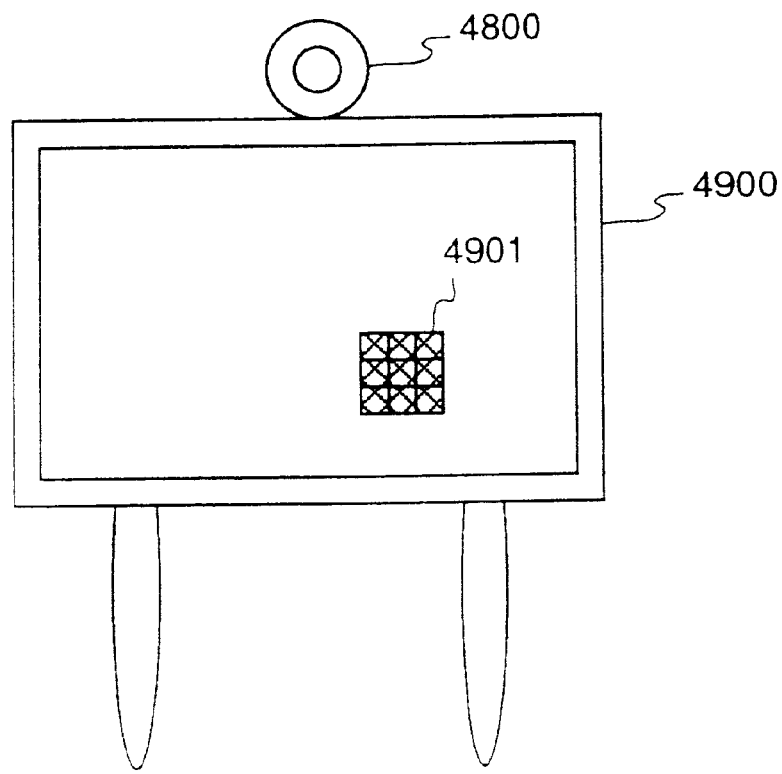
FIG. 49 is an explanatory view showing one example of an electronic blackboard using the input device based on the first example of configuration according to Embodiment 3 of the present invention.
Figure 50:
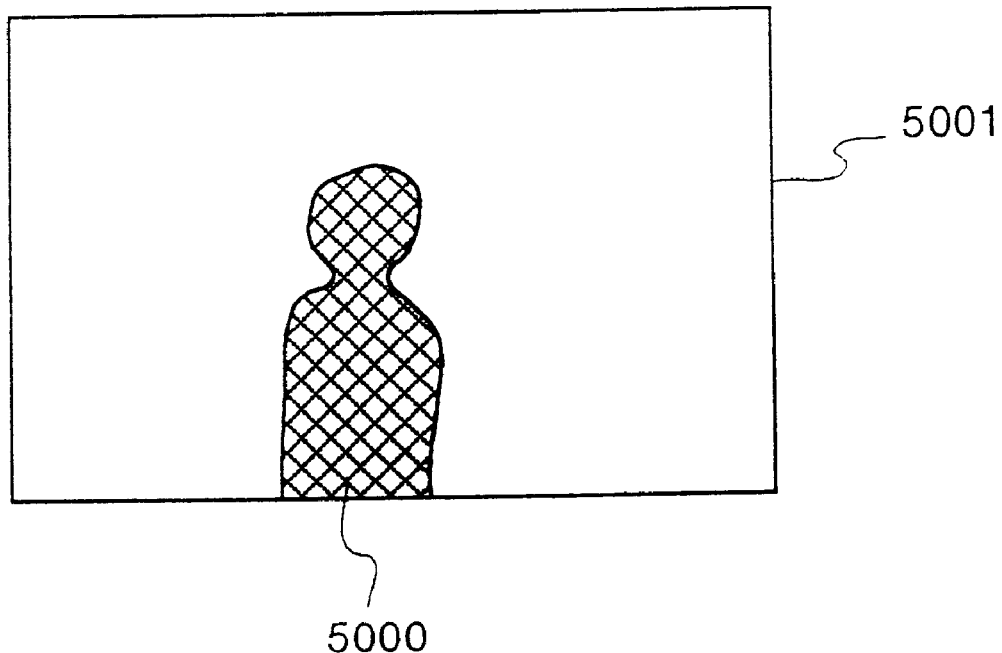
FIG. 50 is an explanatory view showing one example of a method of detecting a position of a person from an image in the input device based on the first example of configuration according to Embodiment 3 of the present invention.

FIG. 49 is a view showing an electronic blackboard with a display as a concrete example of the first configuration of the input device. In the first example of configuration, the image pickup section (camera) 4800 for picking up an image of the person who enters a PID number standing in front of the section is provided in the electronic blackboard with a display 4900. The image picked up by the camera 4800 is sent to the position detecting section 4801 built in the electronic blackboard with a display. The position detecting section 4801 detects a position of the person from the image of the person picked up by the camera 4800.

It should be noted that, as a method of detecting a position of a person from an image thereof, various types of methods can be used. For example, at first a local frequency is computed on an inputted full image. Then, the frequency element obtained as described above are subjected to threshold processing, and the full image is separated into a portion (area 5000) with a high frequency included and a portion (area 5001) with less high frequency included. It should be noted that, this processing is employed based on the fact that the image of a person focused on has comparatively more of high frequency elements but a background which is not focused on has less high frequency elements, therefore, a portion (area 5000) with high frequencies included in the full image is predicted as a portion of a person. Then, the center of gravity (GX, GY) in the area 5000 where a person is supposed to be photographed is obtained. At which position on the image the person is present can be computed through the processing above.

When the position of the person is detected as described above as, for instance, (GX, GY), on which position of the input surface the ten-key should be displayed is computed from this position (GX, GY) in the ten-key display position specifying section 4802. It should be noted that, as a method of deciding a position of the ten-key to be displayed to the position (GX, GY), various types of method can be used. For instance, as it is conceivable that the same position as that where the person is standing is probably the hardest-to-view position from other persons, so that the ten-key 4901 is displayed on that position. Furthermore, positions where not only the person who enters a PID number but also viewers are present are presumed from the images and the ten-key 4901 may be displayed on the position obtained through such consideration.

Figure 60:
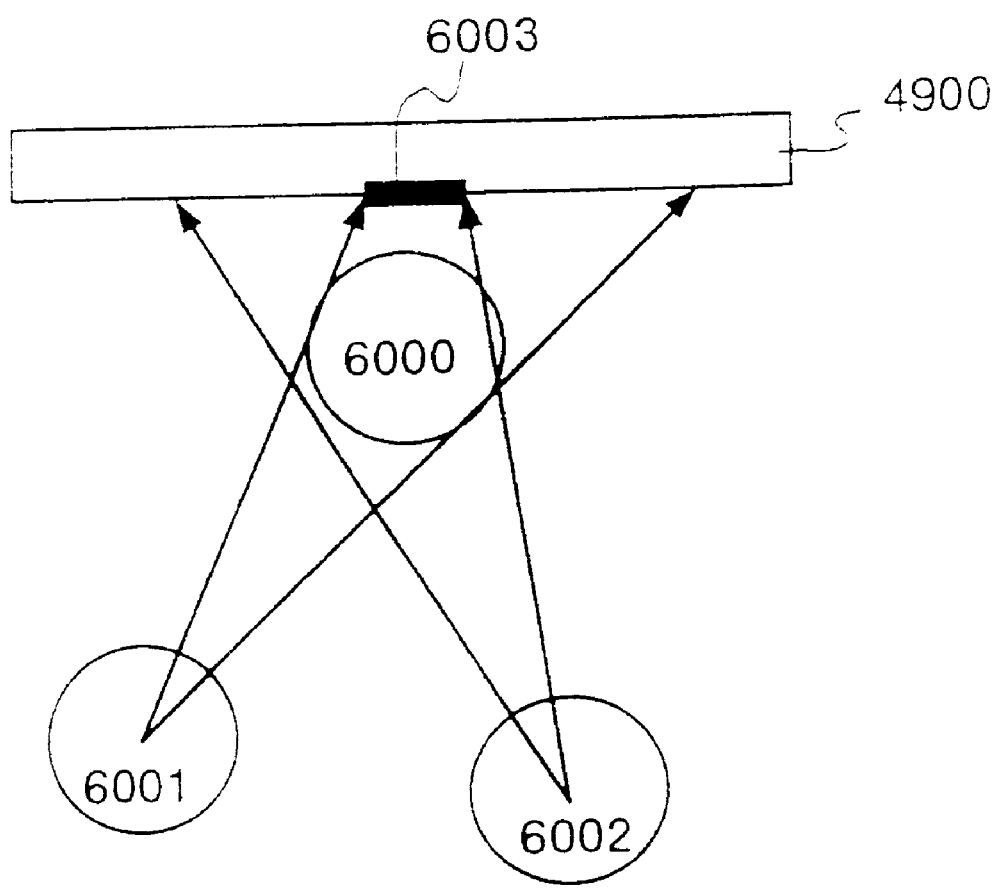
FIG. 60 is an explanatory view for illustrating a method of deciding a position where a ten-key is displayed in the input device according to Embodiment 3 of the present invention.

As one example, description is made for a method of deciding a displayed position with reference to FIG. 60. FIG. 60 is a view showing the electronic blackboard 4900 when viewed from the upper side thereof, and for persons 6001 and 6002 in the side of the electronic blackboard 4900, a position over which a person who enters a PID number 6000 casts his shadow is an area 6003 indicated by a heavy line, therefore, the ten-key 4901 is displayed on a position within this area 6003. Through the processing described above, the ten-key 4901 is displayed on this displayed position as shown in FIG. 49. At this point of time, the ten-key 4901 for entry of a PID number is hidden behind the person who enters a PID number so that nobody can see the ten-key.

Figure 51:
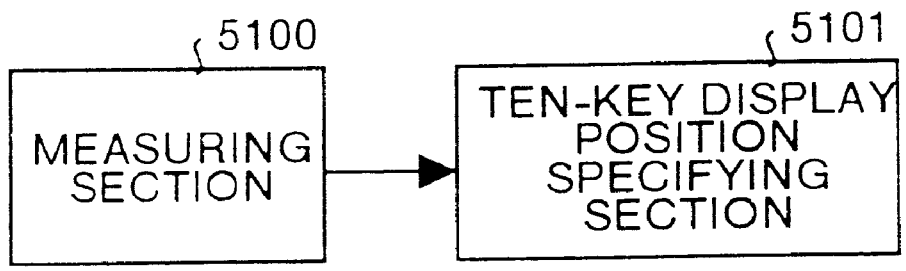
FIG. 51 is a block diagram showing a second example of configuration of the input device according to Embodiment 3 of the present invention.

FIG. 51 is a view showing the second example of configuration of the input device according to Embodiment 3. This input device comprises a coordinate inputting section (corresponding to the touch input device 102 in Embodiment 1) for detecting a position of an object having touched an input surface on the input surface and an image display section (corresponding to the PDP 101 in Embodiment 1) for displaying an image on a surface commonly used as the input surface, and further comprises a measuring section 5100 for measuring a three-dimensional position of a person who enters a PID number, and a ten-key display position specifying section 5101 for displaying a ten-key on a position of a corresponding image display section according to the three-dimensional position obtained by the measuring section 5100.

Figure 52:
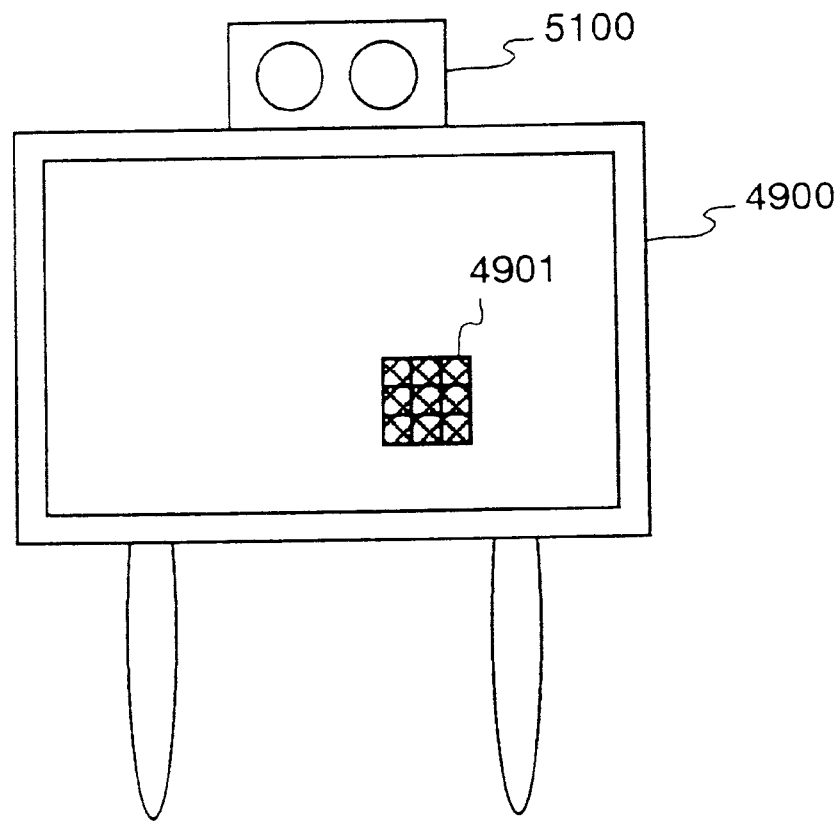
FIG. 52 is an explanatory view showing one example of an electronic blackboard using the input device based on the second example of configuration according to Embodiment 3 of the present invention.

FIG. 52 is a view showing -an electronic blackboard with a display as an concrete example of the second configuration according to Embodiment 3 of the input device. In the example in FIG. 52, the measuring section (three-dimensional position measuring device) 5100 for measuring a three-dimensional position of a person who enters a PID number by standing in front of the electronic blackboard 4900 with a display is provided thereon. It should be noted that, as the three-dimensional position measuring device 5100, various types of device can be used. For example, a device using a principle of stereoscopic vision with a twin-lens camera and a device using an optical cutting method of projecting a reference pattern and reading displacement of the pattern from its image or the like can be used.

In the configuration described above, a three-dimensional position of a person (RX, RE, RZ) is detected with the three-dimensional position measuring device 5100, and on which position of the input surface the ten-key should be displayed is computed by the ten-key display position specifying section 5101. It should be noted that, as a method of deciding a position of a ten-key to be displayed to the position (RX, RY, RZ), various types of methods can be used. For example, the method described in the first example of configuration can be used. When the position of the ten-key to be displayed to the position (RX, RY, RZ) is decided as described above, the ten-key 4901 is displayed on this display position as shown in FIG. 52. At this point of time, the ten-key 4901 for entry of a PID number is hidden behind the person who enters a PID number 6000 so as not to be seen from other persons because of the same principle having been described with reference to FIG. 60.

Figure 53:
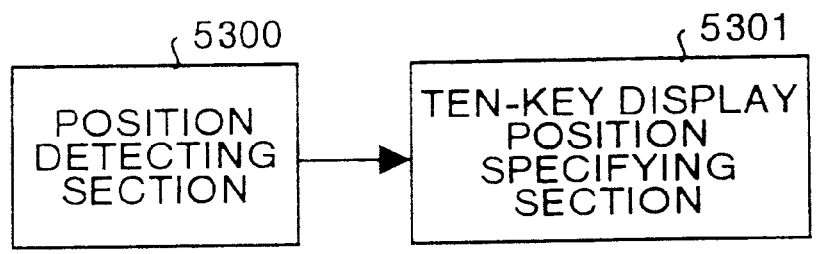
FIG. 53 is a block diagram showing a third example of configuration of the input device according to Embodiment 3 of the present invention.

FIG. 53 is a view showing a third example of configuration of the input device according to Embodiment 3. This input device comprises a coordinate inputting section (corresponding to the touch input device 102 in Embodiment 1) for detecting a position of an object having touched an input surface on the input surface and an image display section (corresponding to the PDP 101 in Embodiment 1) for displaying an image on a surface commonly used as the input surface, and further comprises a position detecting section 5300 for detecting a position of a person who enters a PID number by getting on the section, and a ten-key display position specifying section 5301 for displaying a ten-key on a position of a corresponding image display section according to the position obtained by the position detecting section 5300.

Figure 54:
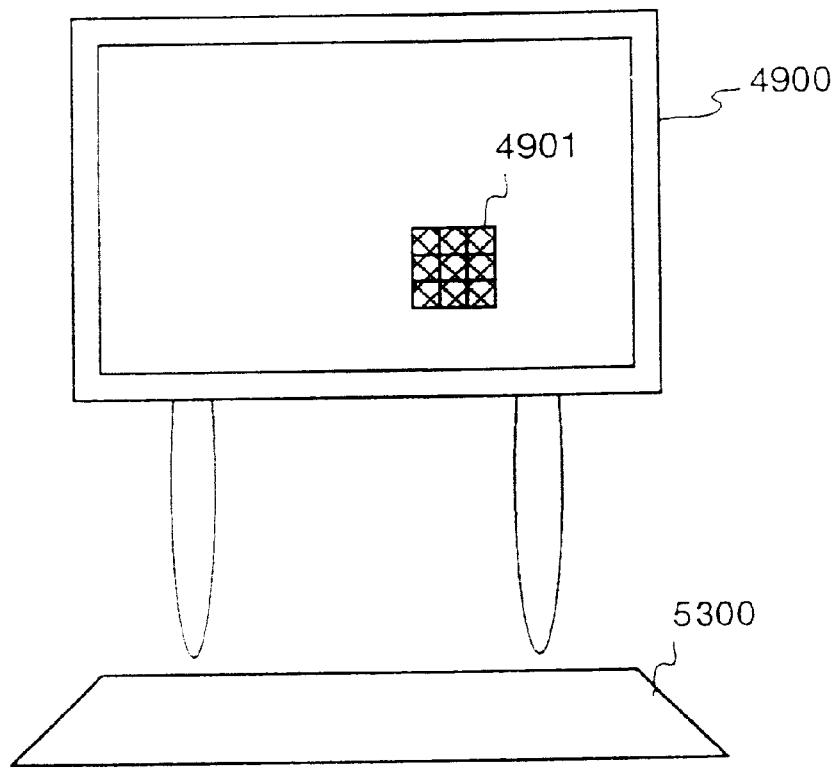
FIG. 54 is an explanatory view showing one example of an electronic blackboard using the input device based on the third example of configuration according to Embodiment 3 of the present invention.

FIG. 54 is a view showing an electronic blackboard with a display as a concrete example of the third configuration of the input device. In the example in FIG. 54, the sheet type of position detecting section (position detecting device) 5300 for detecting a position of a person to enter a PID number standing in front of the electronic blackboard 4900 with a display is provided. As a position detecting method by this position detecting device 5300, various types of methods can be used. For example, a method for detecting a position with a pressure applied on a sheet surface as a pressure-sensitive sheet can be use.

In the configuration described above, a position of a person (SX, SY) is detected with the position detecting section 5300, and on which position of the input surface the ten-key should be displayed is computed by the ten-key display position specifying section 5301. It should be noted that, as a method of deciding a position of a ten-key to be displayed to the position (SX, SY), various types of methods can be used. For example, the method described in the first configuration can be used. When the position of the ten-key to be displayed to the position (SX, SY) is decided as described above, the ten-key 4901 is displayed on this display position as shown in FIG. 54. At this point of time, the ten-key 4901 for entry of a PID number is hidden behind the person who enters a PID number 6000 so as not to be seen from other persons because of the same principle having been described with reference to FIG. 60.

Figure 55:
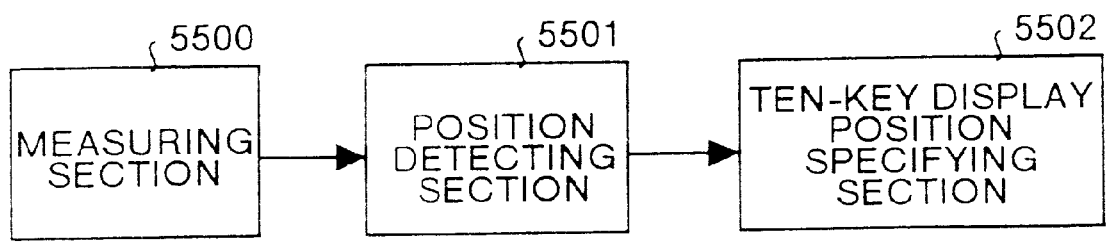
FIG. 55 is a block diagram showing a fourth example of configuration of the input device according to Embodiment 3 of the present invention.

FIG. 55 is a view showing a fourth example of configuration of the input device according to Embodiment 3. This input device comprises a coordinate inputting section (corresponding to the touch input device 102 in Embodiment 1) for detecting a position of a substance having touched an input surface on the input surface and an image display section (corresponding to the PDP 101 in Embodiment 1) for image on a surface commonly used as the input surface, and further comprises a plurality of range finding sections 5500 located in an array, a position detecting section 5501 for detecting a position of a person who enters a PID number according to values by the range finding sections 5500, and a ten-key display position specifying section 5502 for displaying a ten-key on a position of a corresponding image display section according to the position obtained by the position detecting section 5501.

Figure 56:
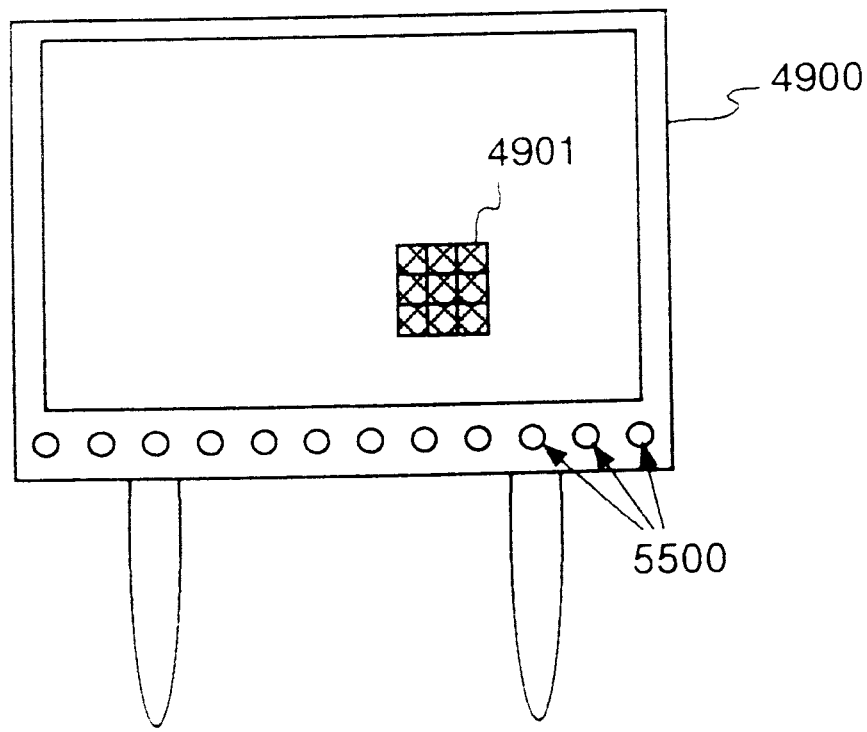
FIG. 56 is an explanatory view showing one example of an electronic blackboard using the input device based on the fourth example of configuration according to Embodiment 3 of the present invention.

FIG. 56 is a view showing an electronic blackboard with a display as an concrete example of the fourth configuration of the input device. In the example in FIG. 56, the range finding sections (an array with a plurality of range finding sensors) 5500 for measuring a range of an object extending in a first-dimensional direction (a vertical direction to the input surface) by using ultrasonic waves are arranged in an array on the electronic blackboard 4900 with a display. With this feature, positional information (range information) of a person standing in front of the electronic blackboard 4900 can be obtained. The range information obtained by the plurality of range finding sensors 5500 as described above is given to the position detecting section 5501, and the position detecting section 5501 identifies a position of a person who enters a PID number according to the range information obtained by the plurality of range finding sensors 5500. As a method of identifying a position of a person from the range information obtained by the plurality of range finding sensors 5500, various types of methods can be used. For example, a position between range finding sensors showing the shortest range can be decided as a position of the person to enter a PID number.

When the position (DX) of the person is obtained as described above, on which position of the input surface from this position (DX) the ten-key should be displayed is computed by the ten-key display position specifying section 5502. As a method of deciding a position of a ten-key to be displayed to the position (DX), various types of methods can be used. For example, the method described in the first configuration can be used. When the position of the ten-key to be displayed to the position (DX) is decided as described above, the ten-key 4901 is displayed on this display position as shown in FIG. 56. At this point of time, the ten-key 4901 for entry of a PID number is hidden behind the person who enters a PID number 6000 so as not to be seen from other persons because of the same principle described with reference to FIG. 60.

Figure 57:
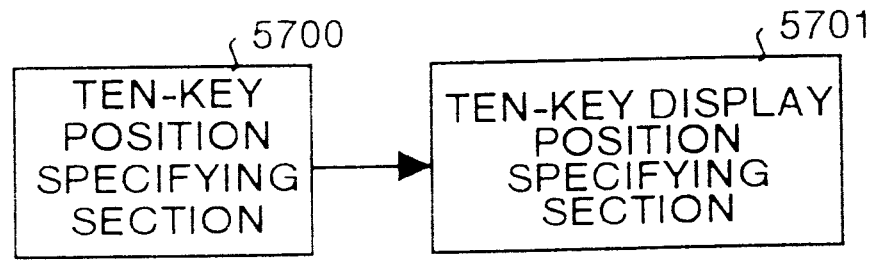
FIG. 57 is a block diagram showing a fifth example of configuration of the input device according to Embodiment 3 of the present invention.

FIG. 57 is a view showing a fifth example of configuration of the input device according to Embodiment 3. This input device comprises a coordinate inputting section (corresponding to the touch input device 102 in Embodiment 1) for detecting a position of an object having touched an input surface on the input surface and an image display section (corresponding to the PDP 101 in Embodiment 1) for displaying an image on a surface commonly used as the input surface, and further comprises a ten-key position specifying section 5700 for specifying a position of a ten-key to be displayed, and a ten-key display position specifying section 5701 for displaying a ten-key on a position specified by the ten-key position specifying section 5700 of the image display section.

Figure 58:
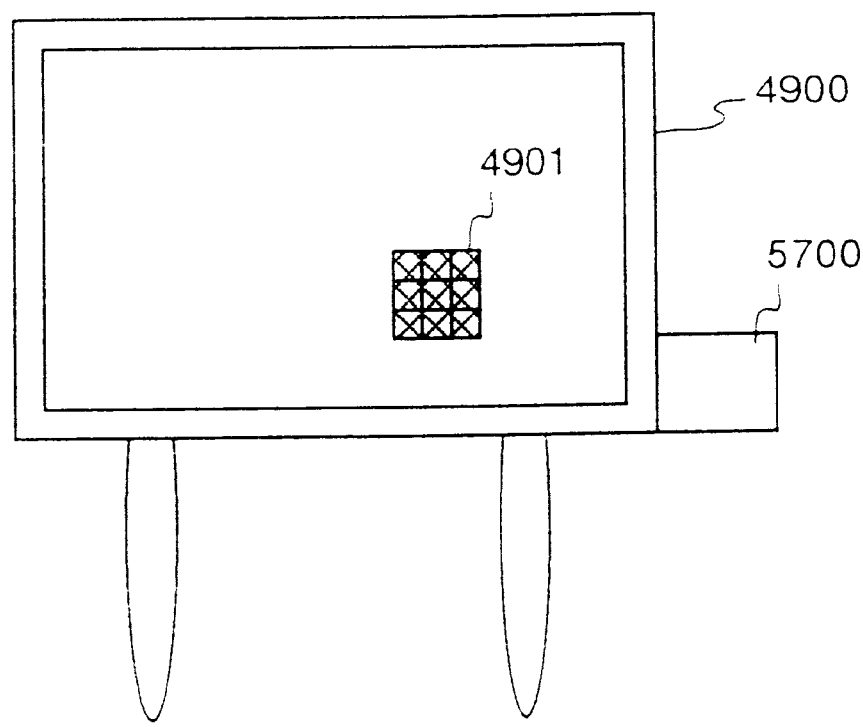
FIG. 58 is an explanatory view showing one example of an electronic blackboard using the input device based on the fifth example of configuration according to Embodiment 3 of the present invention.

FIG. 58 is a view showing an electronic blackboard with a display as a concrete example of the fifth configuration of the input device. In the example in FIG. 58, the ten-key position specifying section 5700 for enabling entry of a position where a ten-key is displayed is provided on the electronic blackboard 4900 with a display. A person who enters a PID number specifies on which part of an input surface the ten-key should be displayed by using this ten-key position specifying section 5700. As a method of specifying a position of a ten-key using the ten-key position specifying section 5700, various types of methods can be used. For example, methods of manually inputting coordinate of a position, or of displaying a thumbnail image to input a desired position by touching it can be employed.

Also in this fifth example of configuration, an input window (a ten-key display specifying window) for specifying a position of a ten-key to be displayed with gesture or the like may be displayed on an input surface without using the ten-key position specifying section 5700.

Figure 59:
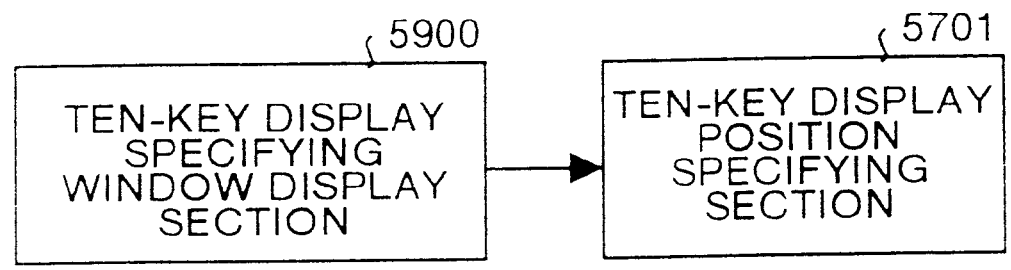
FIG. 59 is a block diagram when an input window (a ten-key display specifying window) for specifying a position where a ten-key is displayed is to be displayed on an entry screen in the input device according to Embodiment 3 of the present invention.

FIG. 59 is a view showing configuration of an input device which can display an input window (a ten-key display specifying window) for specifying a ten-key display position on an input surface, and the input device shown in FIG. 59 comprises a coordinate inputting section (corresponding to the touch input device 102 in Embodiment 1) for detecting a position of an object having touched an input surface on the input surface and an image display section (corresponding to the PDP 101 in Embodiment 1) for displaying an image on a surface commonly used as the input surface, and further comprises a ten-key display specifying window display section 5900 for displaying a ten-key display specifying window for specifying a ten-key display position on the image display section, and a ten-key display position specifying section 5701 for displaying a ten-key on a position having been inputted in the ten-key display specifying window displayed on the image display section by the ten-key display specifying window display section 5900.

Figure 61:
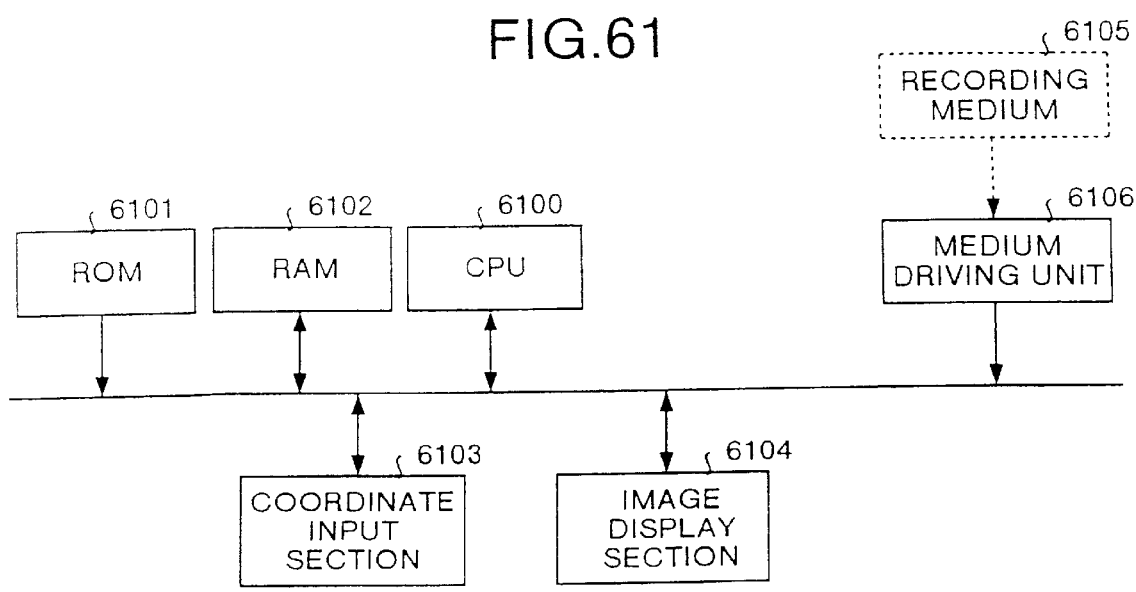
FIG. 61 is a block diagram showing hardware configuration of the input device according to Embodiment 3 of the present invention.

FIG. 61 is a view showing an example of hardware configuration of the input device according to FIG. 48, FIG. 51, FIG. 53, FIG. 55, FIG. 57 and FIG. 59. With reference to FIG. 61, this input device (electronic blackboard) is realized with, for instance, a microcomputer or a DSP (digital signal processor) and software, and comprises at least a CPU 6 100 for controlling the input device as a whole, a ROM 6101 with control programs for the CPU 6100 or the like stored therein, a RAM 6102 used as a work area f or the CPU 6100, a coordinate input section 6103 and an image display section 6104.

Herein the CPU 6100 comprises functions of the position detecting section 4801 and ten-key display position specifying section 4802 in FIG. 48, the measuring section 5100 and ten-key display position specifying section 5101 in FIG. 51, the position detecting section 5300 and ten-key display position specifying section 5301 in FIG. 53, the position detecting section 5501 and ten-key display position specifying section 5502 in FIG. 55, the ten-key position specifying section 5700 and ten-key display position specifying section 5701 in FIG. 57, or the ten-key display specifying window display section 5900 and ten-key display position specifying section 5701 in FIG. 59.

It should be noted that, the functions described above in the CPU 6100 can be provided in a form of, for example, a software package (more specifically, information recording medium such as a CD-ROM), therefore, when an information recording medium 6105 is set, a medium driving unit 6106 for driving the medium is provided in the example of FIG. 61.

In other words, the input device according to Embodiment 3 can operate even in configuration such that the input device makes a processor system incorporated in the electronic blackboard read a program recorded on an information recording medium such as a CD-ROM and makes a microprocessor execute ten-key display processing or the like. In this case, the program (namely, a program used in the hardware system) for executing the processing described in Embodiment 3 can be provided in a state in which the program is recorded in a medium. An information recording medium with a program recorded therein is not limited to a CD-ROM, and any medium such as a ROM, a RAM, a flexible disk, and a memory card may be used. The program recorded in a medium is installed in a storage device incorporated in hardware, for example, in a RAM 6102, with which this program is executed and the processing function described above can be realized.

The program for realizing the processing described in Embodiment 3 may be provided not only in a medium form but also through communications (e.g., with a server).

It should be noted that the description for each configuration above has assumed the case shown in FIG. 60 as a method of deciding a display position, but if only one viewer is present there, a ten-key for inputting a PID number may be displayed on an extension between the viewer and a person to enter a PID number, and if there are a plurality of viewers, various types of deciding method can be used according to each situation taking into consideration positions of the viewer and the person who enters a PID number, such that a ten-key for a PID number is displayed in a blind area from the viewers.

As described above, with the input device according to Embodiment 3, a person who enters a PID number is photographed, a position of the person is detected according to the photographed image, and a ten-key is displayed according to the detected position, so that the ten-key can be displayed at the position hidden by the person, therefore, a possibility that a PID number being inputted is seen by other persons can be reduced.

Also a three-dimensional position of the person who enters a PID number is measured, and a ten-key is displayed according to the measured three-dimensional position, so that a display position of the ten-key can more accurately be decided.

When the person gets on a sheet type of position detecting device, the position of the person is detected, and a ten-key is displayed according to the detected position, so that, for example, a position where the person stands on the floor in front of an input surface can be detected, therefore, a display position of the ten-key can more accurately be decided.

Furthermore, distance up to the object is measured, a position of the person is detected according to the measured value, and a ten-key is displayed according to the detected position, so that a display position of the ten-key can more accurately be decided.

Furthermore, a display position of a ten-key is specified, and the ten-key is displayed on the specified position, so that, for example, a display position of the ten-key can manually be inputted, therefore, a display position of the ten-key can be decided according to situation.

Furthermore, a ten-key display specifying window for specifying a display position of a ten-key is displayed, and the ten-key is displayed on a position inputted in the ten-key display specifying window, so that a manual input device or specifying a display position of the ten-key can be displayed as software, therefore, a low-cost input device can be provided.

In Embodiment 4, description is made for a coordinate input device (touch input device) based on a ultrasonic elastic wave system applicable to the electronic blackboard system according to Embodiment 1. The coordinate input device according to Embodiment 4 has been invented for solving a point that if an area of a surface to be written in (touch surface) is made larger, a cycle when a surface elastic wave is propagated is longer, so that the cycle can not follow an operation of write-in with a fingertip or a touch pen, and a point that a write-in surface can not be made larger than a certain area because the surface elastic waves are attenuated due to increase of a number of its separated times by reflection arrays proportionally to the distance.

Figure 62:
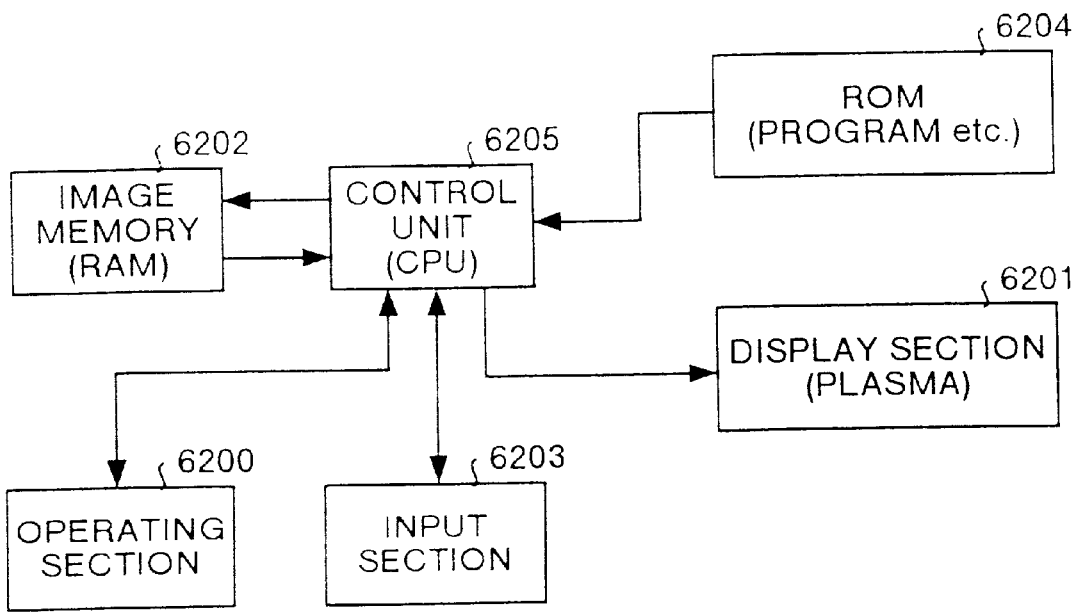
FIG. 62 is a block diagram showing an electronic blackboard system in which a coordinate input device according to Embodiment 4 of the present invention is applied.
Figure 63:
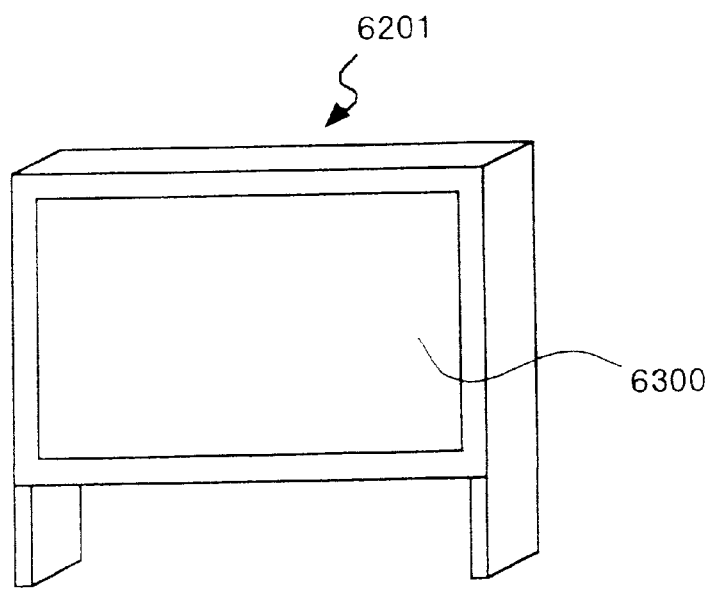
FIG. 63 is a perspective view of the electronic blackboard system shown in FIG. 62.
Figure 64:
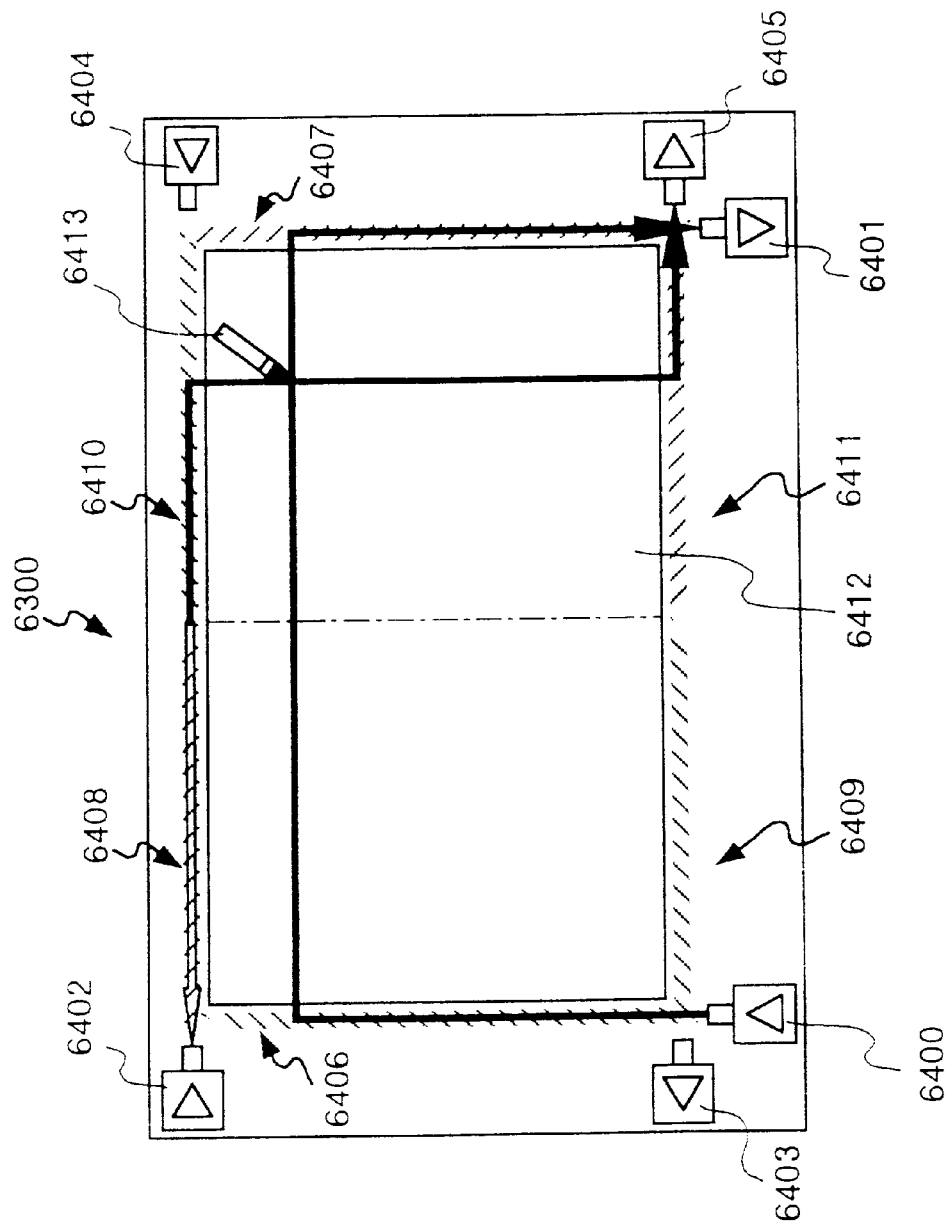
FIG. 64 is a plan view showing a first example of configuration of the coordinate input device according to Embodiment 4 of the present invention.

FIG. 62 to FIG. 64 are views each showing a first example of configuration of the coordinate input device according to Embodiment 4. FIG. 62 and FIG. 63 show one example of an electronic blackboard system with the coordinate input device according to Embodiment 4 applied therein, and the electronic blackboard system is constructed in a style with the coordinate input device mounted on an image display unit, and comprises an operating section 6200 used for inputting various types of format to be set by a user, a display section 6201 for displaying an image thereon, an image memory (RAM) 6202 for storing thereon image data to be displayed on the display section 6201, an input section 6203 for drawing an image (written-in drawing) to be displayed on the display section 6201 by a user, a ROM 6204 with a basic program required for an operation as an electronic blackboard system as well as with a control program for the coordinate input device according to Embodiment 4 stored therein, and a control unit (CPU) 6205 for providing centralized controls over the sections according to the programs in the ROM 6204.

The operating section 6200 has a keyboard and a mouse not shown in the figure operated by a user and an image reading section capable of reading image data by mounting a magnetic disk or the like thereon, and can specify and process an image to be displayed on the display section 6201 through the keyboard or the like. It should be noted that, image data may be read out from a document as an image to be displayed on the display section 6201 by connecting a scanner to the operating section.

The display section 6201 has a large screen PDP for displaying image data in the image memory 6202 sent from the control unit 6205, and also has an input section 6203 mounted thereon for detecting coordinates of a drawing (a written-in point) written on a transparent glass board (a write-in member) 6300 having substantially the same form as a display screen on the PDP and transmitting the coordinates to the control section 6205.

The image memory 6202 is programmed to temporarily store image data to be displayed on the display section 6201 read from a magnetic disk or the like by operating the operating section 6200, and also temporarily store image data for a drawing written by the input section 6203 as a different image from the original image as well as image data obtained by synthesizing the image to the original image.

The input section 6203 is superimposed on the PDP screen of the display section 6201 as shown in FIG. 64, transmitting and receiving transducers 6400 to 6405 are mounted on the transparent glass board 6300 for passing an image to be displayed therethrough, and reflection arrays 6406 to 6411 for reflecting the surface elastic waves propagating on the surface of the transparent glass board 6300 are formed on four edges thereof.

As for the transducers 6400, 6401 and reflection arrays 6406, 6407 of this input section 6203, the transducers 6400 and 6401 are mounted on both sides of the lower edge of the transparent glass board 6300, while the reflection arrays 6406 and 6407 are formed in the two edges of both sides as the Y-axial direction of the transparent glass board 6300. The reflection arrays 6406 and 6407 are arranged in parallel to each other each at an angle of 45 degrees so that the reflection sections each for reflecting surface elastic waves portion by portion through transmission surface (a write-in surface) 6412 for passing the waves through the PDP screen face toward each other in the direction to the transducers 6400 and 6401. Therefore, in the input section 6203, the reflection array 6406 reflects the surface elastic waves transmitted by the transmitting transducer 6400 and propagating on the surface of the transparent glass board 6300, portion by portion at the right angle toward the transmission surface 6412 on each of the reflecting sections of the array, and the reflection array 6407 also reflects the surface elastic waves having propagated on the transmission surface 6412 at the right angle again, which allows the receiving transducer 6401 to receive the surface elastic waves transmitted by the transmitting transducer 6400.

At this point of time, the surface elastic waves transmitted from the transmitting transducer 6400 are successively reflected in the X-axial direction by each reflecting section of the reflection array 6406 arranged in parallel to the Y-axial direction, and propagate on the transmission surface 6412 of the transparent glass board 6300, and are reflected again by the reflection array 6407 opposite to the array 6406, so that the surface elastic waves propagating in the X-axial direction within the transmission surface 6412 of the transparent glass board 6300 are swept to the Y-axial direction, which allows the receiving transducer 6401 to receive the surface elastic waves. Accordingly, the input section 6203 can sweep the waves within the transmission surface 6412 of the transparent glass board 6300 to the Y-axial direction by regarding a period when surface elastic waves transmitted from the transmitting transducer 6400 are received by the receiving transducer 6401 as one cycle and repeating transmission and reception of surface elastic waves.

On the other hand, as configuration for sweeping in the X-axial direction in this input section 6203, the transmitting transducers 6402, 6404 and receiving transducers 6403, 6405 are mounted on the upper side and the lower side of each edge in both sides of the transparent glass board 6300 so that each of the pairs is provided opposite to each other, and the reflection arrays 6408 to 6411 are provided on two edges of the upper side and the lower side as the X-axial direction of the transparent glass board 6300 so that each of the pairs is symmetric with respect to a center line in the vertical direction of the transmission surface. The reflection arrays 6408, 6409 and reflection arrays 6410, 6411 are arranged in parallel to each other each at an angle of 45 degrees so that the reflection sections of the reflection arrays face toward each other in the direction to the transducers 6402 to 6405 through the transmission surface 6412 of the transparent glass board 6300 similarly to the reflection arrays 6406 and 6407.

Therefore, as for sweeping in the X-axial direction in this input section 6203 with a center line in the vertical direction (a dashed line in FIG. 64) dividing the transmission surface 6412 of the transparent glass board 6300 into two sections in both sides as a border, surface elastic waves propagating in the Y-axial direction within the transmission surface 6412 of the transparent glass board 6300 can be swept toward the center of the surface from both sides in the X-axial direction by successively reflecting surface elastic waves transmitted from the transmitting transducers 6402 and 6404 to the Y-axial direction with the reflecting sections of the reflection arrays 6408 and 6410 arranged in parallel to the X-axial direction, propagating the waves within the transmission surface 6412 of the transparent glass board 6300, reflecting again the surface elastic waves with the reflection arrays 6409 and 6411, and receiving the reflected waves with the receiving transducers 6403 and 6405. Accordingly, as for sweeping the waves in the X-axial direction within the transmission surface 6412 of the transparent glass board 6300, the input section 6203 can sweep the waves in the X-axial direction within the transmission surface 6412 of the transparent glass board 6300 by regarding a period when surface elastic waves transmitted from the transmitting transducers 6402 and 6404 are received by the receiving transducers 6403 and 6405 as one cycle and repeating transmission and reception of surface elastic waves.

In the input section 6203, when some spot within the transmission surface 6412 of the transparent glass board 6300 is pressed with a tip such as a rubber of an input pen 6413, propagation of a portion of the surface elastic waves repeatedly transmitted from the transmitting transducers 6400, 6402 and 6404 and sweeping within the transmission surface 6412 is shut down or attenuated, and received signals by the receiving transducers 6401, 6403 and 6405 each having received the surface elastic waves can be correlated to each other on the time axis, so that the control section 6205 having received the received signals from the receiving transducers 6401, 6403 and 6405 can detect the position at the time of starting sweeping (a reference point) when the level of received signals gets lower than that of other signals as a position pressed with the input pen 6413, and can identify the coordinate of a written-in point with the input pen 6413 according to the detected position in the X-axis and Y-axis.

It should be noted that the reflection arrays 6406 to 6411 have reflecting sections larger than their actual size shown in the figure so that the sections can visually be recognized, but in an actual case, one of the sections is one pixel for detecting a written-in point, therefore, the reflecting sections can be formed so as to correlate to pixel density of a written-in drawing detectable by the input section 6203.

As described above, in the first example of configuration of the coordinate input device, as configuration for sweeping in the X-axial direction within the transmission surface 6412 by the input section 6203, the transmitting transducers 6402, 6404 and receiving transducers 6403, 6405 are provided opposite to each other respectively to be mounted on the edges of the transparent glass board 6300, and the reflection arrays 6408, 6409 and reflection arrays 6410, 6411 reflect the surface elastic waves transmitted from the transmitting transducers 6402, 6404 so as to propagate within the transmission surface 6412 to make the receiving transducers 6403 and 6405 receive the waves. Accordingly, sweeping in the X-axial direction within the transmission surface 6412 can be executed by dividing the transmission surface 6412 into two sections to propagate surface elastic waves along a short path, therefore, surface elastic waves can be detected at a received level higher than that in the configuration in which the transmission surface 6412 is swept with a pair of transducers to detect a written-in point. As a result, even if the transmission surface 6412 of the transparent glass board 6300 is made such that it has a large area, coordinate of a written-in point can be identified with high precision.

Also the receiving transducers 6403 and 6405 do not directly receive surface elastic waves transmitted from the transmitting transducers 6402 and 6404 provided opposite to each other and propagated, so that a S/N ratio is never reduced.

Figure 65:
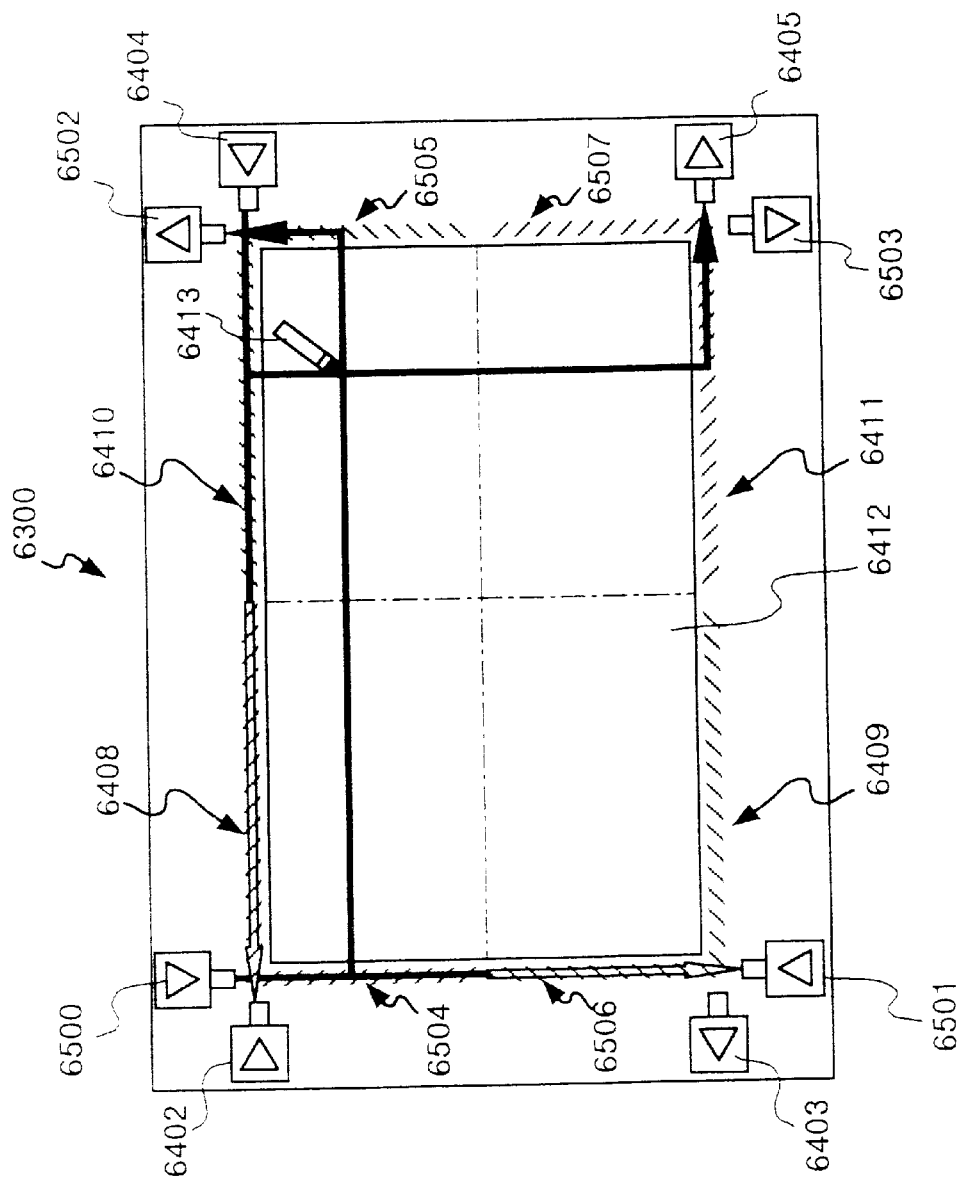
FIG. 65 is a plan view showing a second example of configuration of the coordinate input device according to Embodiment 4 of the present invention.

FIG. 65 is a view showing the second example of configuration of the coordinate input device according to Embodiment 4. It should be noted that the second example of configuration thereof has an input section 6203 in the electronic blackboard system mounted on the display section 6201 similarly to the first example of the configuration, so that the same reference numerals are assigned to the sections corresponding to those in FIG. 62 and FIG. 63, and simple description is made herein.

The input section 6203 shown in FIG. 62 and FIG. 63 is superimposed on the PDP screen of the display section 6201 as shown in FIG. 65, transmitting and receiving transducers 6402 to 6405 and 6500 to 6503 are mounted on the transparent glass board 6300 for passing an image to be displayed therethrough, and reflection arrays 6408 to 6411 and 6504 to 6507 for reflecting the surface elastic waves propagating on the surface of the transparent glass board 6300 are formed on four edges thereof.

As configuration for sweeping in the Y-axial direction in this input section 6203, transmitting transducers 6500, 6501 and receiving transducers 6502, 6503 in place of the transducers 6400, 6401 and reflection arrays 6406, 6407 in the first configuration are mounted on the upper side and the lower side of each edge in both sides of the transparent glass board 6300 so that each of the pairs is provided opposite to each other, and reflection arrays 6504 to 6507 are provided on two edges of both sides as the Y-axial direction of the transparent glass board 6300 so that each of the pairs is symmetric with respect to a center line in the horizontal direction of the transmission surface, and the reflection arrays 6504, 6505 and reflection arrays 6506, 6507 are arranged in parallel to each other each at an angle of 45 degrees so that the reflection sections of the reflection arrays face toward each other in the direction to the transducers 6500 to 6503 through the transmission surface 6412 of the transparent glass board 6300 similarly to the reflection arrays 6408 to 6411.

Therefore, for sweeping in the Y-axial direction similarly to the sweeping in the Y-axial direction, with a horizontal center line (a dashed line in FIG. 65) dividing the transmission surface 6412 of the transparent glass board 6300 into two sections in the upper and lower sides as a border, this input section 6203 can sweep surface elastic waves propagating in the X-axial direction within the transmission surface 6412 of the transparent glass board 6300 toward the center of the surface from the upper side and lower side in the Y-axial direction by successively reflecting surface elastic waves transmitted from the transmitting transducers 6500 and 6501 to the X-axial direction with the reflecting sections of the reflection arrays 6504 and 6506 arranged in parallel to the Y-axial direction, propagating the waves within the transmission surface 6412 of the transparent glass board 6300, reflecting again the surface elastic waves with the reflection arrays 6505 and 6507, and receiving the reflected waves with the receiving transducers 6502 and 6503.

Accordingly, the input section 6203 can sweep the waves in the X-axial direction as well as in the Y-axial direction within the transmission surface 6412 of the transparent glass board 6300, together with the sweeping in the X-axial direction as well as Y-axial direction within the transmission surface 6412 of the transparent glass board 6300, by regarding a period when surface elastic waves transmitted from the transmitting transducers 6402, 6404, 6500 and 6501 are received by the receiving transducers 6403, 6405, 6502 and 6503 as one cycle of each sweeping in the X-axial direction and Y-axial direction respectively, and repeating transmission and reception of surface elastic waves.

As described above, in the second configuration according to Embodiment 4, in addition to the effects in the first configuration, the sweeping in the Y-axial direction within the transmission surface 6412 by the input section 6203 can also be executed based on propagation of surface elastic waves along a short path by dividing the transmission surface 6412 into two sections also in the upper and lower sides. Accordingly, sweeping in the X-axial direction and Y-axial direction can be executed by dividing the transmission surface 6412 into four sections vertically and horizontally as a whole. As a result, even if the transmission surface 6412 of the transparent glass board 6300 is made such that it has a larger area than that in the first configuration, coordinate of a written-in point can be identified with high precision.

Figure 66:
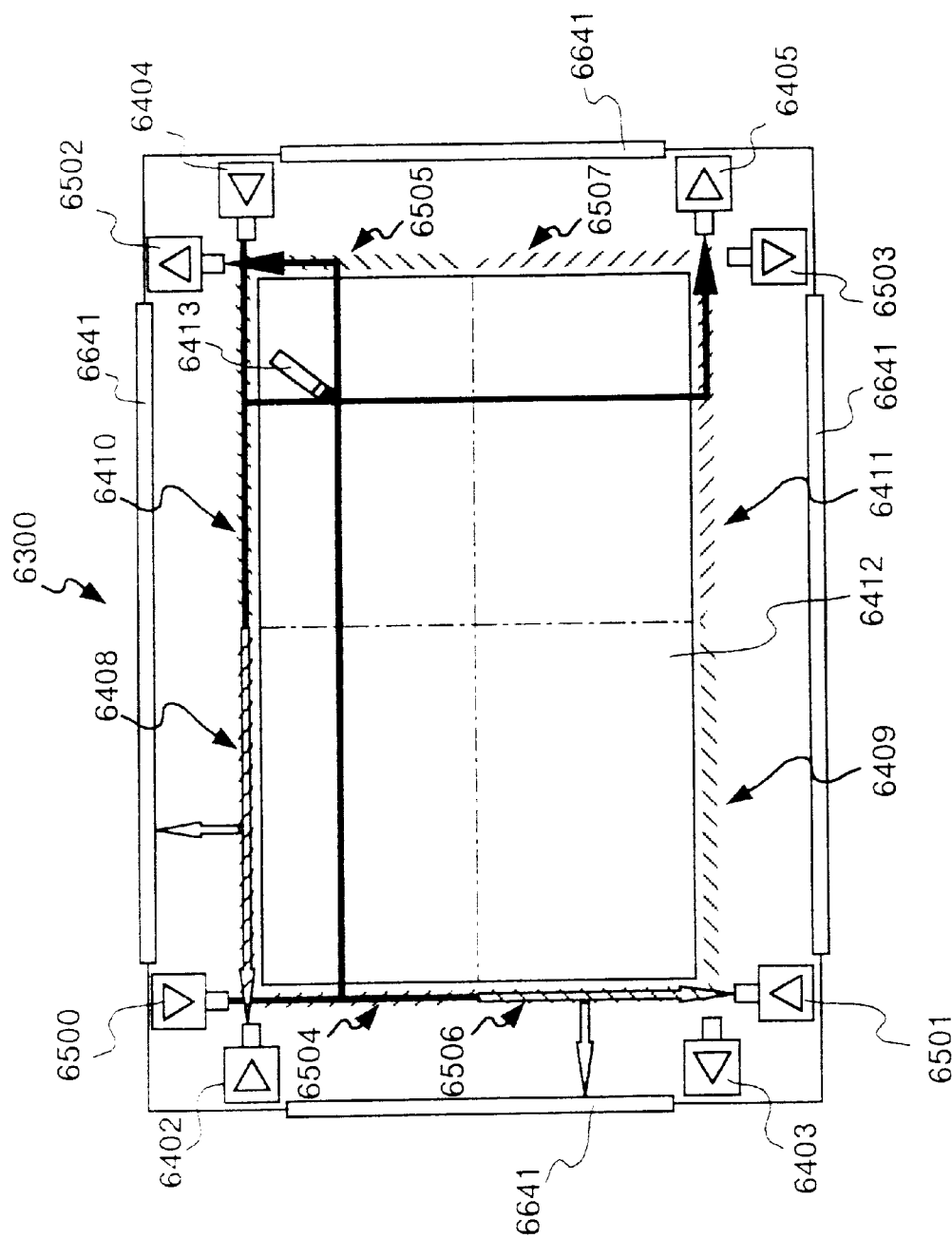
FIG. 66 is a plan view showing a third example of configuration of the coordinate input device according to Embodiment 4 of the present invention.

FIG. 66 is a view showing the third example of configuration of the coordinate input device according to Embodiment 4. It should be noted that the third example of configuration thereof has an input section 6203 in the electronic blackboard system mounted on the display section 6201 similarly to the second example of the configuration, so that the same reference numerals are assigned to the sections corresponding to those in FIG. 62 and FIG. 63, and simple description is made herein.

The input section 6203 shown in FIG. 62 and FIG. 63 is superimposed on the PDP screen of the display section 6201 as shown in FIG. 66, the transmitting and receiving transducers 6402 to 6405 and 6500 to 6503 are mounted on the transparent glass board 6300 for passing an image to be displayed therethrough, and the reflection arrays 6408 to 6411 and 6504 to 6507 for reflecting surface elastic waves propagating on the surface of the transparent glass board 6300 are formed on four edges thereof.

Mounted on the transparent glass board 6300 of this input section 6203 are locking members for locking propagation of surface elastic waves, for example, rubber plates 6641 having the same material as that of the tip of the input pen 6413 so as to extend in parallel to each of outer edge sides than the reflection arrays 6408 to 6411 and 6504 to 6507, so that surface elastic waves transmitted from the transmitting transducers 6402, 6404, 6500 and 6501 are prevented from being reflected to the direction of each edge of the transparent glass board 6300 with each reflecting section of the reflection arrays 6410, 6408, 6506 and 6504 provided apart from each other, reflected again with each of the edge surfaces thereof, propagating within the transmission surface 6412 to be reflected with each of reflecting sections of the reflection arrays 6411, 6409, 6507 and 6505, and being received by the receiving transducers 6403, 6405, 6502 and 6503.

In the third configuration described above, in addition to the effects in the configuration, by forming the reflecting sections of the reflection arrays 6410, 6408, 6506 and 6504 symmetrically with respect to vertical and horizontal center lines respectively, surface elastic waves reflected to each direction of edge side of the transparent glass board 6300 each during its propagation as indicated by the thick hollow arrow in FIG. 66 are restricted from its propagation more than that by the rubber plates 6641. Accordingly, it is possible to prevent that the receiving transducers 6405, 6403, 6508 and 6502 receive the surface elastic waves transmitted from the transmitting transducers 6402, 6404, 6500 and 6501, therefore, a S/N ratio can be enhanced.

Figure 67:
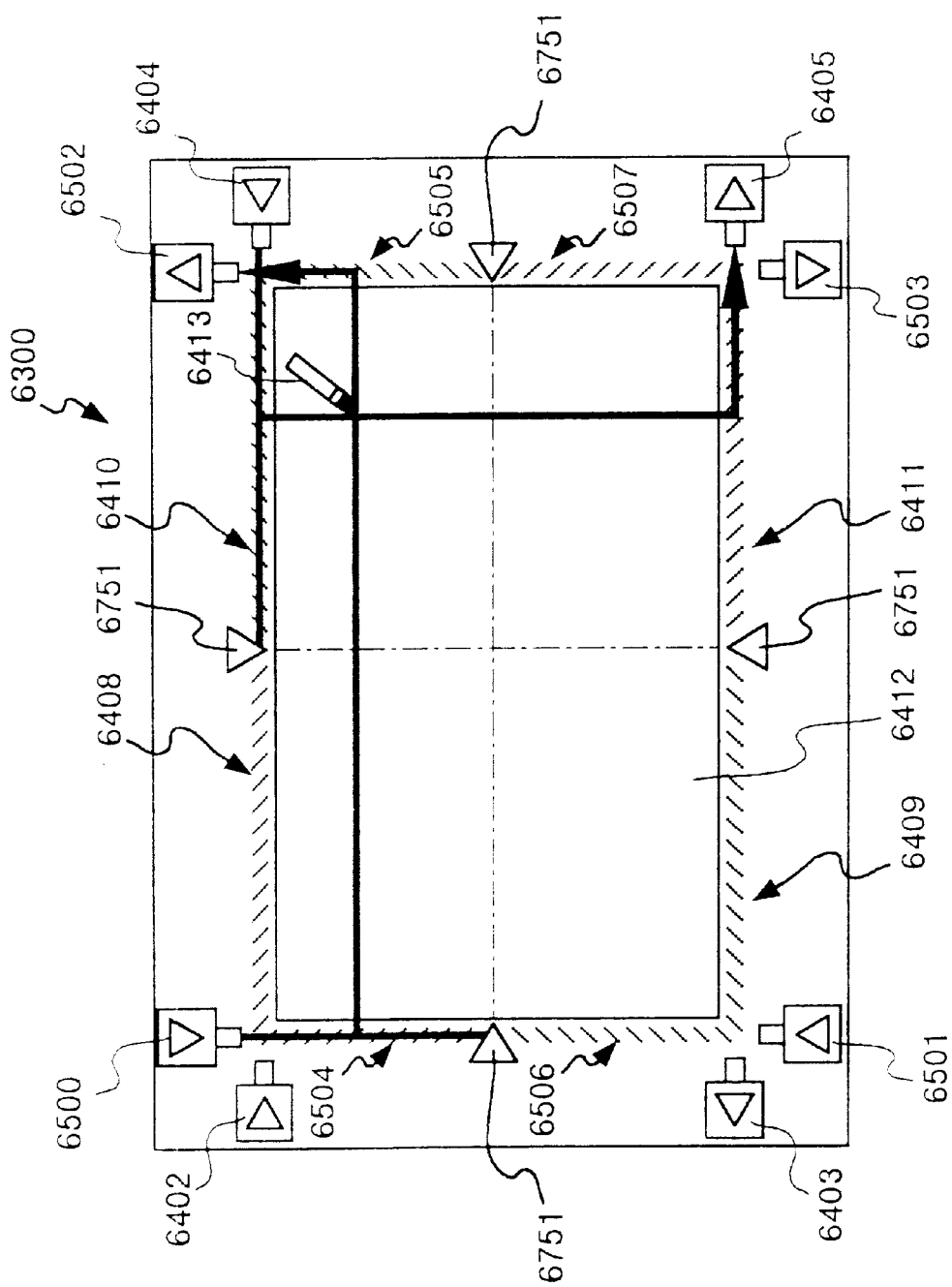
FIG. 67 is a plan view showing a fourth example of configuration of the coordinate input device according to Embodiment 4 of the present invention.

FIG. 67 is a view showing the fourth example of configuration of the coordinate input device according to Embodiment 4. It should be noted that the fourth example of configuration thereof has an input section 6203 in the electronic blackboard system mounted on the display section 6201 similarly to the second example of the configuration, so that the same reference numerals are assigned to the sections corresponding to those in FIG. 62 and FIG. 63, and simple description is made herein.

The input section 6203 shown in FIG. 62 and FIG. 63 is superimposed on the PDP screen of the display section 6201 as shown in FIG. 67, the transmitting and receiving transducers 6402 to 6405 and 6500 to 6503 are mounted on the transparent glass board 6300 for passing an image to be displayed therethrough, and the reflection arrays 6408 to 6411 and 6504 to 6507 for reflecting the surface elastic waves propagating on the surface of the transparent glass board 6300 are formed on four edges thereof.

Mounted on the transparent glass board 6300 of this input section 6203 are locking members for locking propagation of the surface elastic waves, for example, rubber pieces 6751 having the same material as that of the tip of the input pen 6413 between at least the reflection arrays 6408 and 6410, and between the reflection arrays 6504 and 6506, so that the surface elastic waves transmitted from the transmitting transducers 6402, 6404, 6500 and 6501 are prevented from being reflected to the direction of each edge side of the transparent glass board 6300 with each reflecting section of the reflection arrays 6410, 6408, 6506 and 6504 provided apart from each other.

In the fourth configuration according to Embodiment 4 as described above, the same effects as that in the third configuration can be obtained with the rubber piece 6751 smaller than the rubber plate 6641.

As described above, with the coordinate input device according to Embodiment 4, surface elastic waves are propagated within a write-in surface of a write-in member symmetrically from both sides in the X-axial direction and/or in the Y-axial direction thereof, so that the write-in surface can be divided into two or four sections and the surface elastic waves are swept, therefore, a path for propagation of the surface elastic waves can be made shorter. Accordingly, a written-in point on the write-in surface having been made larger is detected with one cycle for propagating surface elastic waves kept to be the same or shorter and with a reception level of the surface elastic waves kept to be the same or higher, so that the coordinate of the point can be identified with high precision, and in addition, the coordinate input device using surface elastic waves can be mounted on a large screen display or the like.

In addition, the transmitting transducers and receiving transducers are located so as not to be opposite to each other on the same axis with the write-in member therebetween, or propagation of the surface elastic waves in an unnecessary location is restricted, so that direct reception of surface elastic waves propagated from a different side can be eliminated, and an S/N ratio is never lowered.

It should be noted that the shielding tape having been described with reference to FIG. 3 is preferably provided in portions of receiving transducers even of the coordinate input device according to Embodiment 4.

In Embodiment 5, description is made for a coordinate input device (touch input device) based on a ultrasonic elastic wave system applicable to the electronic blackboard system according to Embodiment 1. The coordinate input device according to Embodiment 5 has been invented for solving the inconvenience that a position different from an actual written-in position may be identified if a plurality of users write data in the coordinate input device.

Figure 68:
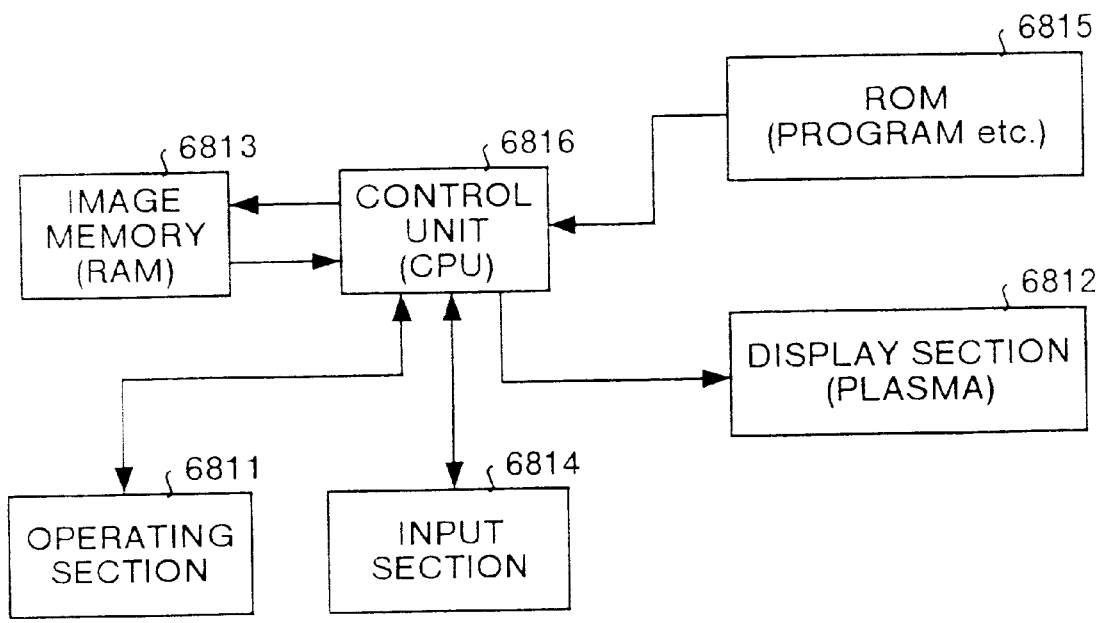
FIG. 68 is a block diagram showing an electronic blackboard system in which a coordinate input device according to Embodiment 5 of the present invention is applied.
Figure 69:
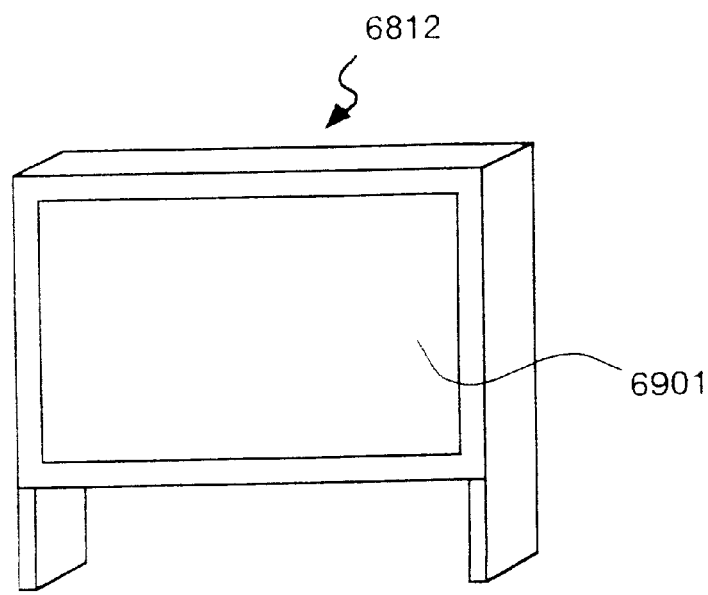
FIG. 69 is a perspective view of the electronic blackboard system shown in FIG. 68.

FIG. 68 to FIG. 73 are views each showing a first example of configuration of the coordinate input device according to Embodiment 5. FIG. 68 and FIG. 69 show one example of an electronic blackboard system with the coordinate input device according to Embodiment 5 applied therein, and the electronic blackboard system is constructed in a style with the coordinate input device mounted on an image display unit, and comprises an operating section 6811 used for inputting various types of conditions to be set by a user, a display section 6812 for displaying an image thereon, an image memory (RAM) 6813 for storing thereon image data to be displayed on the display section 6812, an input section 6814 for drawing an image (written-in drawing) to be displayed on the display section 6812 by a user, a ROM 6815 with a basic program required for an operation as an electronic blackboard system as well as with a control program required for Embodiment 5 stored therein, and a control unit (CPU) 6816 for providing centralized controls over the sections according to the programs in the ROM 6815.

The operating section 6811 has a keyboard and a mouse not shown in the figure operated by a user and an image reading section capable of reading image data by mounting a magnetic disk or the like thereon, and can specify and process an image to be displayed on the display section 6812 through the keyboard or the like. It should be noted that, image data may be read out from a document as an image to be displayed on the display section 6812 by connecting a scanner to the operating section.

The display section 6812 has a large screen PDP for displaying the image data in the image memory 6813 sent from the control unit 6816, and also has an input device 6814 mounted thereon for detecting coordinate of a drawing (a written-in point) written on a transparent glass board (a write-in member) 6901 having substantially the same form as a display screen on the PDP and transmitting the coordinates to the control section 6816.

The image memory 6813 is programmed to temporarily store image data to be displayed on the display section 6812 read from a magnetic disk or the like by operating the operating section 6811, and also temporarily store image data for a drawing written by the input section 6814 as a different image from the original image as well as image data obtained by synthesizing the image to the original image.

Figure 70:
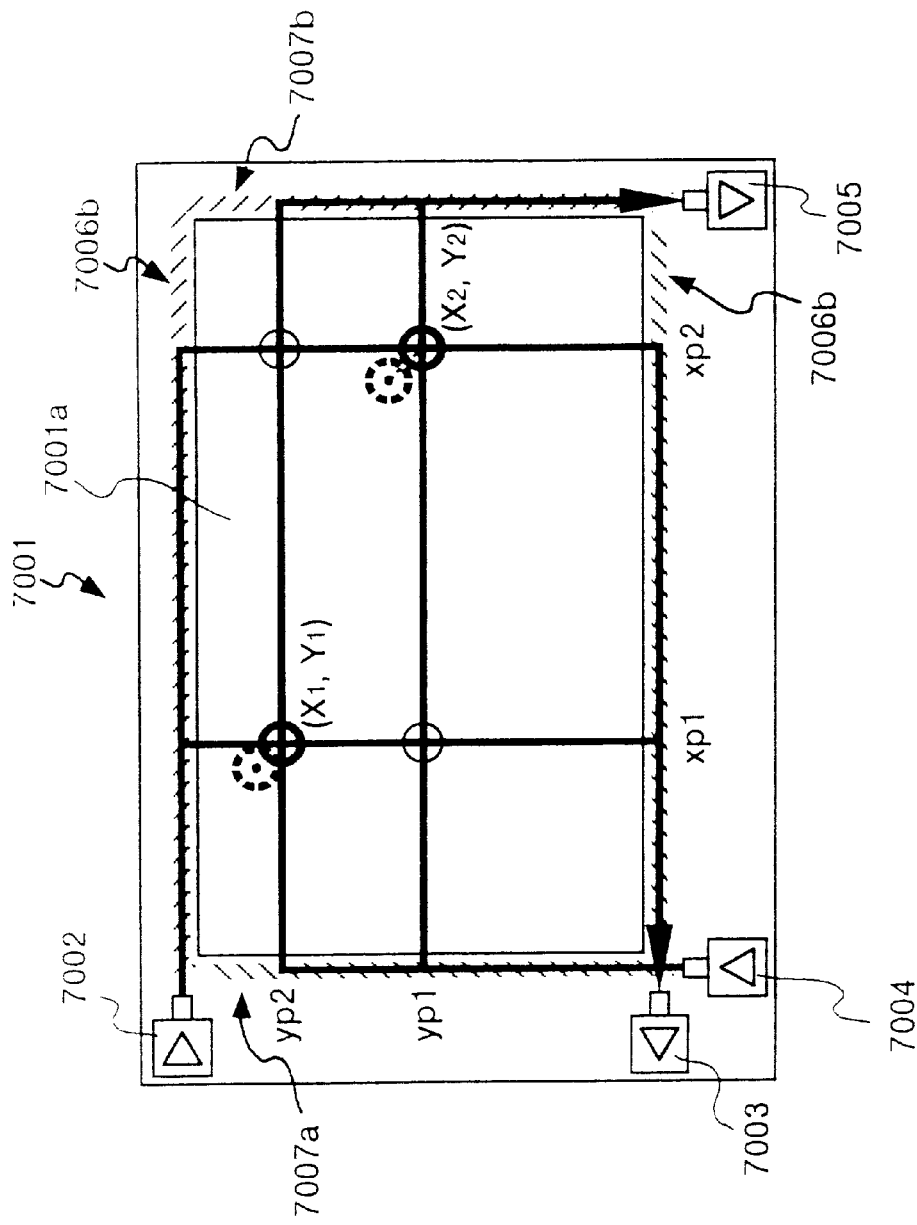
FIG. 70 is a plan view showing a first example of configuration of the coordinate input device according to Embodiment 5 of the present invention.

The input section 6814 is superimposed on the PDP screen of the display section 6812 as shown in FIG. 70, transmitting and receiving transducers 7002 to 7005 are mounted on the transparent glass board 6901 for passing an image to be displayed therethrough, and reflection arrays 7006a, 7006b, 7007a, and 7007b for reflecting surface elastic waves propagating on the surface of the transparent glass board 7001 are formed on four edges thereof, and the reflection arrays 7006a, 7006b, 7007a, and 7007b are provided at an angle of 45 degrees so as to be opposite to each other through the transmission surface (write-in surface) 7001a for transmitting the PDP screen and reflecting sections for reflecting the surface elastic waves portion by portion are provided in parallel to the transmitting and receiving directions of the transducers 7002 to 7005.

With this configuration, in the input section 6814, the reflection arrays 7006a and 7007a reflect the surface elastic waves transmitted from the transmitting transducers 7002, 7004 and propagating on the surface of the transparent glass board 7001 at a right angle to the transmission surface 7001a with each of the reflecting sections a portion by portion, and the reflection arrays 7006b and 7007b also reflect the surface elastic waves propagating on the transmission surface 7001a again at a right angle, which allows the receiving transducers 7003 and 7005 to receive the surface elastic waves transmitted by the transmitting transducers 7002 and 7004.

At this point of time, the surface elastic waves transmitted from the transmitting transducer 7002 are successively reflected by each reflecting section of the reflection array 7006a arranged in parallel to the X-axial direction, and propagate on the transmission surface 7001a of the transparent glass board 7001 respectively, and are reflected again by the reflection array 7006b opposite to the array 7006a, so that the surface elastic waves within the transmission surface 7001a of the transparent glass board 7001 are successively swept, and are received by the receiving transducer 7003. Furthermore, the surface elastic waves transmitted from the transmitting transducer 7004 are also successively reflected by each reflecting section of the reflection arrays 7007a and 7007b arranged in parallel to the Y-axial direction, swept within the transmission surface 7001a of the transparent glass board 7001, and are received by the receiving transducer 7005. Accordingly, the input section 6814 can repeatedly sweep the surface elastic waves within the transmission surface 7001a of the transparent glass board 7001 by regarding a period when the surface elastic waves transmitted from the transmitting transducers 7002 and 7004 are received by the receiving transducers 7003 and 7005 as one cycle and repeating transmission and reception of the surface elastic waves.

Therefore, in the input section 6814, when some spot within the transmission surface 7001a of the transparent glass board 7001 is pressed with a tip such as a rubber of an input pen, propagation of a portion of the surface elastic waves repeatedly transmitted from the transmitting transducers 7002 and 7004 and sweeping within the transmission surface 7001a is shut down or attenuated, and received signals by the receiving transducers 7003 and 7005 each having received the surface elastic waves can be correlated to each other on the time axis, so that the control unit 6816 having received the received signals from the receiving transducers 7003 and 7005 can detect the position at the time of starting sweeping (a reference point) when the level of received signals gets lower than that of other signals as a position pressed with the input pen, and can identifie the coordinate of a written-in point with the input pen according to the detected position in the X-axis and Y-axis.

It should be noted that, the reflection arrays 7006a, 7006b, 7007a and 7007b have reflecting sections larger than their actual size shown in the figure so that the sections can visually be recognized, but in an actual case, one of the sections is one pixel for detecting a written-in point, therefore, the reflecting sections can be formed so as to correlate to pixel density of a written-in drawing detectable by the input section 6814.

Then the control unit 6816 regards positions indicated by a thin solid line in FIG. 70 also as candidates of a written-in point as shown in FIG. 70 when having received signals indicating that the processing of write-in is executed by a user from the receiving transducers 7003 and 7005 at two spots (written-in points (X1, Y1), (X2, Y2)) indicated by the heavy solid line within the transmission surface 7001a of the transparent glass board 7001. Therefore, the control unit 6816 provides controls as shown in FIG. 71(a) so that a transmitting cycle (detecting cycle) T of the surface elastic waves by the Y-axial transmitting transducer 7004 is transmitted in synchronism to a transmitting cycle T of surface elastic waves by the X-axial transmitting transducer 7002, combines detected positions in which timings of detecting a written-in point by the receiving transducers 7003 and 7005 are closest to each other using a detecting cycle Tn as a reference, and identifies the written-in point.

For example, for identifying the written-in points (X1, Y1) and (X2, Y2), when the X-axial receiving transducer 7003 detects the positions x1, x2 as shown in FIG. 71(b) and the Y-axial receiving transducer 7005 detects the positions y1, y2, the written-in points (X1, Y1) and (X2, Y2) do not select the identical detected positions in the X-axis and Y-axis, so that any combination in which a value obtained by adding a detected time difference $\Delta t$ of a detected position (xi, yi) obtained in any combination of detected positions (x1, y1), (x2, y2) and. detected positions (x1, y2), (x2, y1) to the detected position (xi, yi) is the smallest is selected, and the written-in points (X1, Y1) and (X2, Y2) are identified by combining the closest detected positions (x1, y1) with (x2, y2). Accordingly, even when the position x1 to xn is detected in the X-axis and the position y1 to yn is detected in the Y-axis, written-in points (X1, Y1) and (X2, Y2) can be identified with the various combination, and as it is quite rare for a plurality of users, for example, to start writing in at the same time, a written-in point when each user starts writing in can be identified with high-precision.

It should be noted that the positions (x2, y2) in FIG. 71(b) are detected discretely in the adjacent cycles T4 and T5, but the figure shows a case where a sweeping time in the Y-axis is shorter than that in the X-axis so that a written-in point detected at the time of sweeping close to the end in the X-axis is detected at the beginning of the next cycle in the Y-axis.

Furthermore, the control unit 6816 detects, when users write in a continuous line segment, for example, when written-in points (X1, Y1) and (X2, Y2) indicated by the heavy solid line in FIG. 70 are concurrently written in, the positions x1, x2 in the X-axis as well as the position y1, y2 in the Y-axis within the same detecting cycles as shown in each upper stage in FIG. 72, therefore, the written-in points can not be identified by combining detected positions in the X-axis and Y-axis at the detecting timings. Therefore, the control unit 6816 is programmed to identify a written-in point by combining detected positions closest to the detected positions of the written-in point identified in the immediately proceeding detecting cycle Tn−1, and similarly to the previous processing, selects a combination in which an absolute value obtained by subtracting detected positions (xj, yj) of the previous written-in point indicated by the heavy broken line in FIG. 70 from the detected positions (xi, yi) obtained by combining the detected positions (x1, y1), (x2, y2) and the detected positions (x1, y2), (x2, y1) is the smallest, identifies the written-in point (X1, Y1) by combining the position xp1 detected in the X-axis and the position yp2 detected in the Y-axis, and also identifies the written-in point (X2, Y2) by combining the position xp2 detected in the X-axis with the position yp1 detected in the Y-axis as well.

Accordingly, the continuous written-in points (X1, Y1) and (X2, Y2) adjacent to the immediately proceeding written-in points indicated by the heavy broken line in FIG. 70 can be identified, and even when a plurality of positions in the X-axis and Y-axis are detected within the same detecting cycle Tn, the detected positions in the X-axis and Y-axis are combined so as to become continuos written-in points, therefore, each line written in by each user can be reproduced with high precision.

Figure 73:
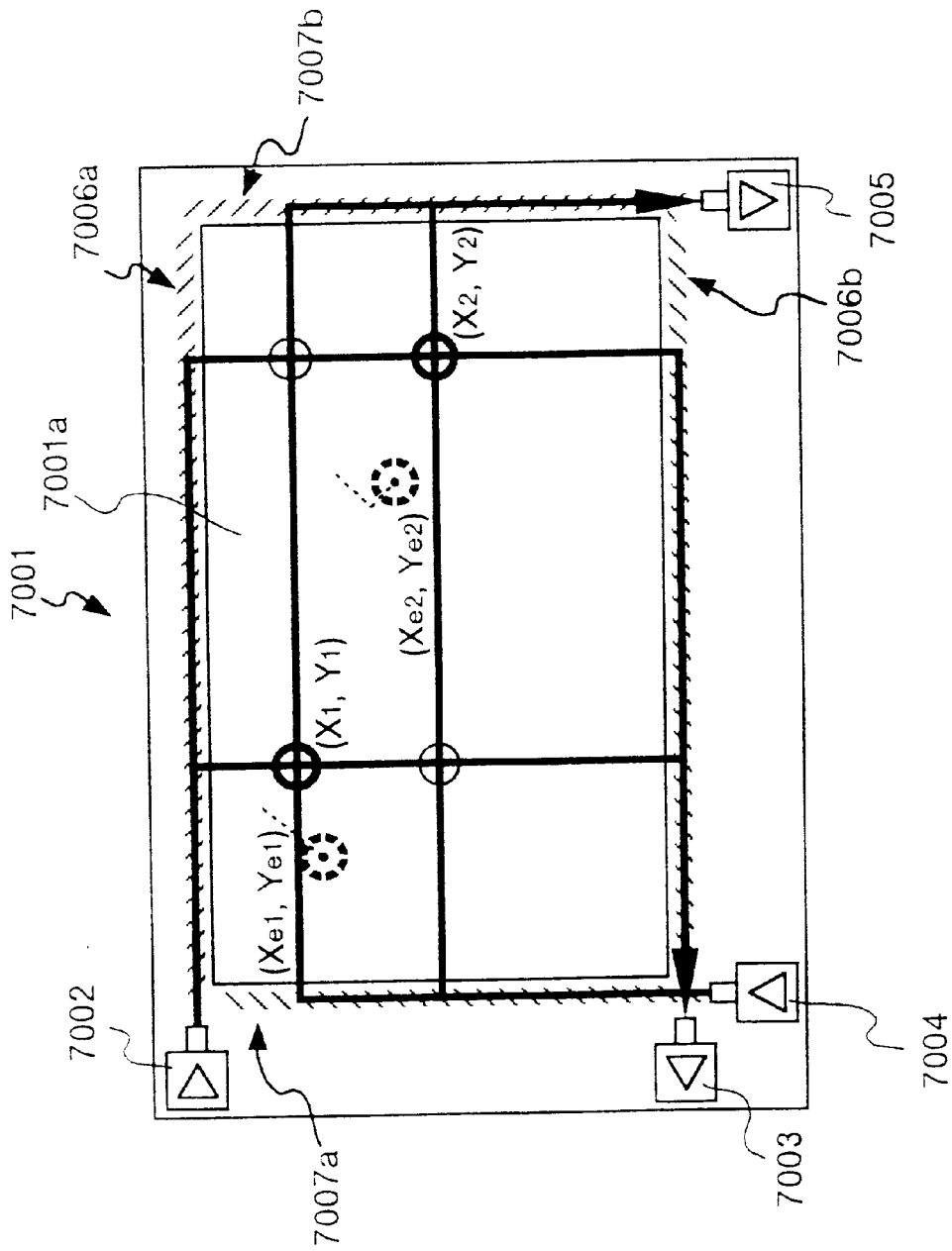
FIG. 73 is a view for explaining identification of written-in points different from those in FIG. 71 and FIG. 72, and is a plan view showing the written-in points.

Furthermore, as for the control unit 6816, there are many cases where at most two users perform write-in because of the size of the PDP screen of the display section 6812, the users may not write in at the same time, and even when characters or the like are to be written in, non-continuous line segments and dots are written in by each user, so that there are not always present any written-in points corresponding to those immediately proceeding written-in points (X1, Y1) and (X2, Y2) other than the case where the continuous line segment or the like are written in at the same time, therefore, similarly to the previous processing, the control unit 6816 selects a combination in which an absolute value obtained by subtracting detected positions (xj, yj) of the previous written-in point indicated by the heavy broken line in FIG. 73 from the detected positions (xi, yi) obtained by means of the detected positions (x1, y1), (x2, y2), (x1, y2) and (x2, y1) is the smallest, identifies the written-in point (X1, Y1) when, for example, one written-in point (Xe1, Ye1) is finally identified as shown in FIG. 73 by combining the positions closest to the point, and then identifies the written-in point (X2, Y2) following the last written-in point (Xe2, Ye2) with other user by combining the detected positions diagonal to the point (X1, Y1). Accordingly, two users write in discretely, and even if timings of detecting written-in points when the two users restart writing in happen to be substantially the same as each other, each of the written-in points can be identified at a position corresponding to the line or the like previously written in can be identified for each user.

In the first configuration according to Embodiment 5 as described above, even when a plurality of positions in the X-axis and Y-axis are detected, a written-in point is identified by combining detected positions of which detecting timings are closest, so that each of written-in point can be identified for each user even when a plurality of users start writing in, therefore, it is impossible to specify a different drawing as a written-in drawing due to identification of a written-in point which has not actually been written in.

In addition, even when a plurality of positions in the X-axis and Y-axis are detected within the same detecting cycle, a written-in point is identified by combining detected positions closest to each of the written-in points identified within the immediately proceeding cycle, so that, even if a plurality of users concurrently write in lines, each of the written-in points can be identified, therefore, it is impossible to specify a drawing other than the line as a written-in drawing as due to identification of a written-in point which has not actually been written in.

Furthermore, even if there is one last written-in point when two positions in the X-axis and Y-axis are detected within the same detecting cycle, one written-in point is identified by combining detected positions the closest to the one written-in point, and the other written-in point is identified by combining detected positions diagonal to the identified written-in point, so that even if two users discretely write in characters or the like with non-continuous line segments and dots, each of the written-in points can be identified, therefore, it is impossible to specify a drawing which is not intended to be written in other than characters as a written-in drawing due to identification of a written-in point which has not actually been written in.

Accordingly, write-in by a plurality of users is allowable, which makes it possible to enhance usability.

Figure 74:
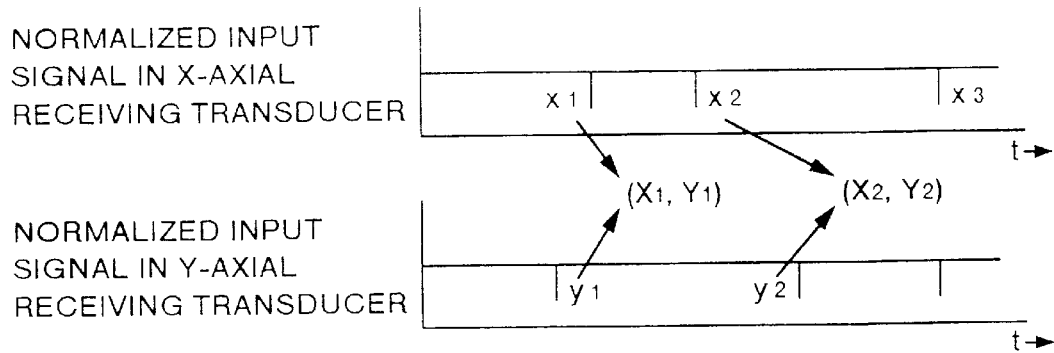
FIG. 74 is a graph showing identification of written-in points in a coordinate input device based on a second example of configuration according to Embodiment 5 of the present invention.

FIG. 74 is a view showing how to identify a written-in point by using a second example of configuration of the coordinate input device according to Embodiment 5. It should be noted that, the second example of configuration thereof has the same configuration as that of the first configuration, so that the same reference numerals are assigned to the sections corresponding to those in FIG. 68 and FIG. 69, and description is made for only a characteristic section thereof.

In FIG. 68 and FIG. 69, the control unit 6816 provides controls as shown in FIG. 74 so that a transmitting cycle (detecting cycle) T of the surface elastic waves by the X-axial and Y-axial transmitting transducers 7002 and 7004 is not shared but each of the transducers transmits surface elastic waves in each cycle required for sweeping the waves in the X-axis and Y-axis respectively, and a delay time of a received signal by the X-axial receiving transducer 7003 to a received signal by the Y-axial receiving transducer 7005 at the time of detecting a written-in point (Xi, Yi) is computed and corrected, and the written-in point is identified by combining detected positions in which timings of detecting the written-in points by the receiving transducers 7003 and 7005 are closest to each other.

In the second configuration, the Y-axial transmitting transducer 7004 also continuously propagates the surface elastic waves on the transparent glass board 7001 like the X-axial transmitting transducer 7002, and a blank time when written-in points can not be detected within the detecting cycle T as shown in FIG. 71 can be eliminated, so that write-in by a user can more accurately be detected and coordinate of the written-in point can be identified. It should be noted that, if a rectangular board having the same dimensions in the X-axis and Y-axis is used, the same thing happens in the above described first configuration.

It should be noted that, in Embodiment 5, description has been made for the transparent glass board as an example, but any material may be used on condition that it is a material that enables propagation of the surface elastic waves.

As described above, with the coordinate input device according to Embodiment 5, when a plurality of positions as objects for combinations in the X-axis and Y-axis are detected, a detected point obtained by combining detected positions in which detecting timings in the X-axis and Y-axis are closest to each other is identified as a written-in point, so that each written-in point of which writing-in is started by each of the plurality users can be identified, therefore, it is impossible to specify a different drawing as a written-in drawing due to identification of a written-in point which has not actually been written in. Accordingly, write-in by a plurality of users is allowable, which makes it possible to enhance the usability.

Furthermore, when a plurality of positions as objects for combinations in the X-axis and Y-axis are detected, a detected point obtained by combining detected positions which are closest to each of the immediately proceeding written-in points is identified as a written-in point, so that a written-in point for each user can be identified even when lines are written in by the plurality of users, therefore, it is impossible to specify a drawing other than lines as a written-in drawing due to identification of a written-in point which has not actually been written in. Accordingly, write-in by a plurality of users is allowable, which makes it possible to enhance the usability.

Furthermore, even if there is one last written-in point when two positions as objects for combinations in the X-axis and Y-axis are detected, a detected point obtained by combining detected positions the closest to the one written-in point is identified as one of the written-in points, and a detected point by combining detected positions diagonal to the identified detected point is identified as the other written-in point, so that even if two users write lines of which written-in points are not continuous such as characters, a written-in point for each user can be identified, therefore, it is impossible to specify a drawing other than characters as a written-in drawing due to identification of a written-in point which has not actually been written in. Accordingly, write-in by a plurality of users is allowable, which makes it possible to enhance the usability.

It should be noted that, the shielding tape having been described with reference to FIG. 3 is preferably provided in portions of receiving transducers even of the coordinate input device according to Embodiment 5.

An input device according to Embodiment 6 is used for easily generating a software keyboard and enabling insurance of security with an simple operation in the electronic blackboard system according to Embodiment 1.

The input device according to Embodiment 6 has a tablet (corresponding to the touch input device 102 in Embodiment 1) contacting and provided on the surface of an image display unit (corresponding to the PDP 101 in Embodiment 1) and a signal control section. The signal control section has a touched area computing section, a touched position detecting section, a touched area determining section, a software keyboard generating section, and a drawing section. When the tablet is touched with a fingertip or the like, signals corresponding to the touched area and a touched position are outputted from the tablet to the touched area computing section as well as to the touched position detecting section. The touched position detecting section detects coordinate of the position touched with the fingertip or the like from the signals received from the tablet. At the same time, the touched area computing section computes an area touched with the fingertip or the like according to the signals received from the tablet. The touched area determining section compares the touched area computed by the touched area computing section to a preset threshold value, and determines that a drawing or the like is created on the tablet when the computed touched area is smaller than the threshold value, and the drawing section creates a drawing according to the touched area computed in the touched area computing section as well as to the coordinates detected in the touched position detecting section to display the drawing on the image display unit, and also inputs the drawing to a computer. Also as a result of determination in the touched area determining section, it is determined that the tablet has been touched with, for instance, a palm when the computed touched area exceeds the threshold value, and the software keyboard generating section generates a software keyboard and displays it on the touched position of the image display unit in a size previously set. By touching the tablet with, for instance, a palm as described above, a software keyboard can easily be displayed on the image display unit. By operating this displayed software keyboard in the same manner as that when a keyboard is operated, various types of operation can easily be executed. For example, a PID number or some other data is inputted through the software keyboard to get permission to access.

Figure 75:
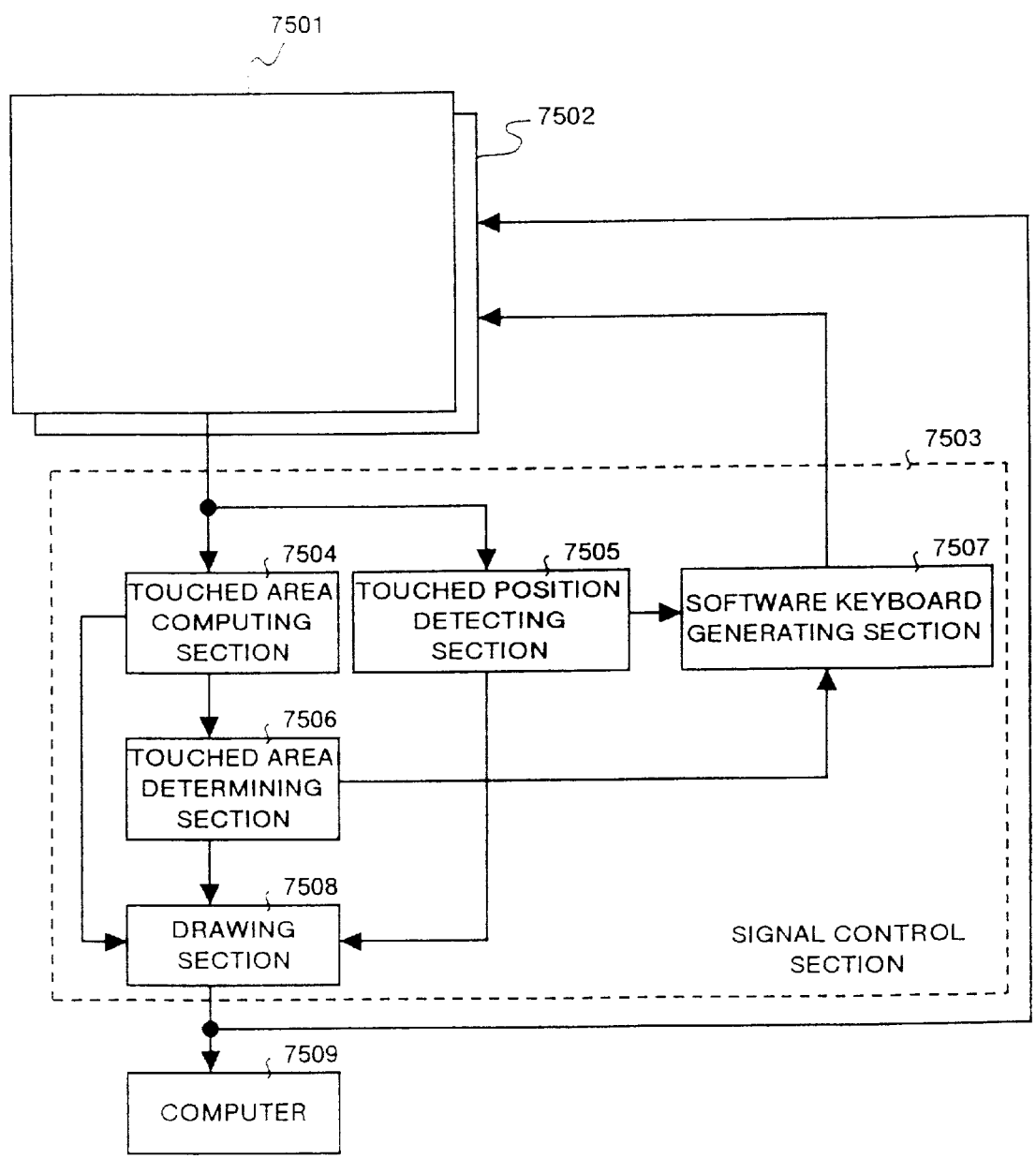
FIG. 75 is a block diagram showing a first example of configuration of an input device according to Embodiment 6 of the present invention.

FIG. 75 is a block diagram showing a first example of configuration of an input device according to Embodiment 6. As shown in FIG. 75, the input device has a tablet 7501 using surface elastic waves, an image display unit 7502 having a screen such as a PDP, and a signal control section 7503. The signal control section 7503 has a touched area computing section 7504, a touched position detecting section 7505, a touched area determining section 7506, a software keyboard generating section 7507 and a drawing section 7508.

Figure 76:
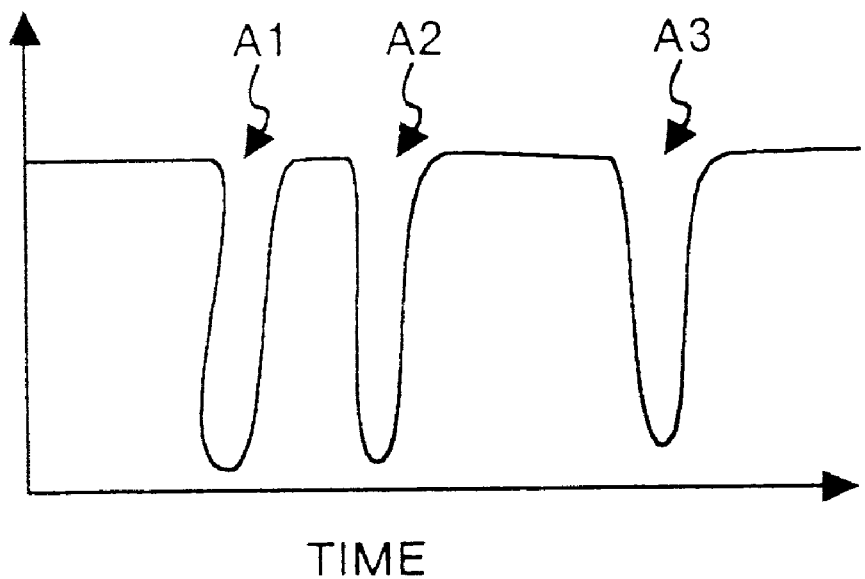
FIG. 76 is a waveform diagram showing an output waveform from a tablet in the first example of configuration of the input device according to Embodiment 6 of the present invention.

When the tablet 7501 is touched with a fingertip or a pen, a signal outputted from the tablet 7501 according to the touched area and touched position on the tablet 7501 is changed in its signal value as shown in FIG. 76 by an amount of absorption of the surface elastic waves due to the fingertip or the like. In a screenful time-series signal, by integrating each time when the change is generated, an area where the tablet is touched with the fingertip can be computed. Then the touched area computing section 7504 computes each area of portions A1, A2, and A3 where the surface elastic waves are absorbed due to touching the tablet with the fingertip from the screenful time-series signal outputted from the tablet 7501. Then the touched position detecting section 7505 computes coordinates of portions A1, A2 and A3 where the surface elastic waves are absorbed from the screenful time-series signal outputted from the tablet 7501. The touched area determining section 7506 compares the touched area computed by the touched area computing section 7504 to the preset threshold value. The software keyboard generating section 7507 generates, when it is determined in the touched area determining section 7506 that the tablet has been touched with, for instance, a palm when the touched area exceeds the threshold value, a software keyboard and displays it on the touched position of the image display unit. The drawing section 7508 creates, when it is determined in the touched area determining section 7506 that the touched area is smaller than the threshold value, a drawing according to the touched area and touched position on the tablet 7501 and displays the drawing on the image display unit 7502, and also inputs it in the computer 7509.

Figure 77:
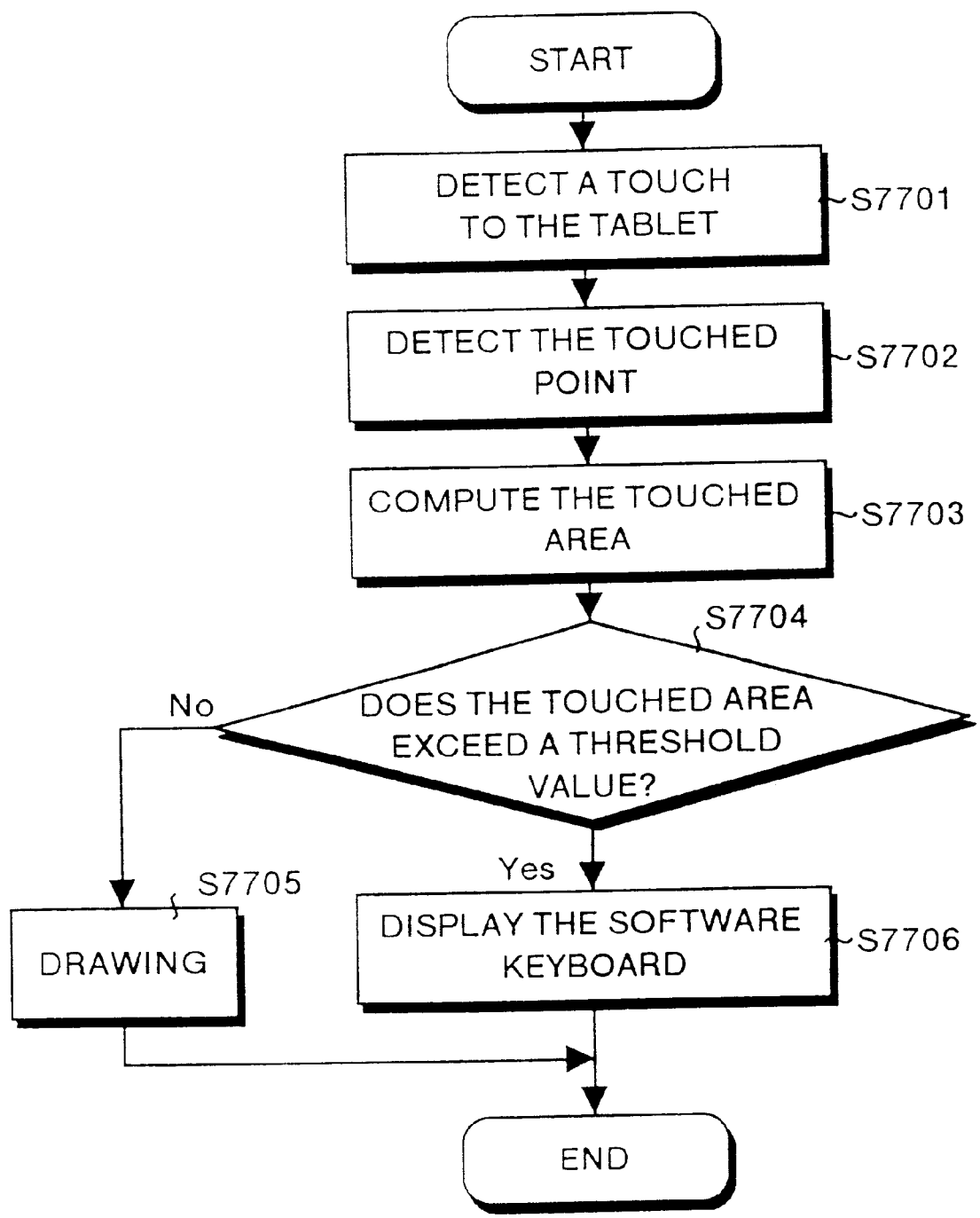
FIG. 77 is a flow chart showing an operation of the first example of configuration of the input device according to Embodiment 6 of the present invention.

Description is made for an operation when the tablet 7501 of the input device configured as described above is touched with the fingertip or the like with reference to the flow chart in FIG. 77. When the tablet 7501 is touched with the fingertip or the like, the tablet 7501 outputs signals corresponding to the touched area and touched position to the touched area computing section 7504 as well as to the touched position detecting section 7505 (S7701).

The touched position detecting section 7505 detects coordinate of a position on the tablet touched with the fingertip or the like from a signal received from the tablet 7501 (S7702). At the same time, the touched area computing section 7504 computes an area on the tablet touched with the fingertip according to the signal received from the tablet 7501 (S7703).

The touched area determining section 7506 compares the touched area computed by the touched area computing section 7504 to the preset threshold value (S7704), and determines that a graphic or the like is created on the tablet 7501 when the computed touched area is smaller than the threshold value, and the drawing section 7508 creates a drawing according to the touched area computed in the touched area computing section 7504 as well as according to the coordinate detected in the touched position detecting section 7505 to display the drawing on the image display unit 7502, and also inputs the drawing to the computer 7509 (S7705).

As a result of determination in the touched area determining section 7506, it is determined that the tablet has been touched with, for instance, a palm when the computed touched area exceeds the threshold value, and the software keyboard generating section 7507 generates a software keyboard and displays it on the touched position of the image display unit 7502 in a size previously set (S7706).

By touching the tablet 7501 with, for instance, a palm as described above, the software keyboard can easily be displayed on the image display unit 7502. By operating this displayed software keyboard in the same manner as that when a keyboard is operated, various types of operation can easily be executed.

In the first configuration, although description has been made for the case where a software keyboard in a certain size is generated in the software keyboard generating section 7507 and displayed on the image display unit 7502, the software keyboard generating section 7507 may display the software keyboard to be displayed on the image display unit 7502 in a size specified by an operator. For example, when the tablet 7501 is touched with the palm, the software keyboard having a size corresponding to the touched area is generated by the soft 7507 and displayed on the image display unit 7502. By displaying the palm-sized software keyboard as described above, the most easy-to-use-sized software keyboard can be displayed.

Next description is made for an example of realizing a security function by using the software keyboard displayed on the image display unit 7502 as described above.

Figure 78:
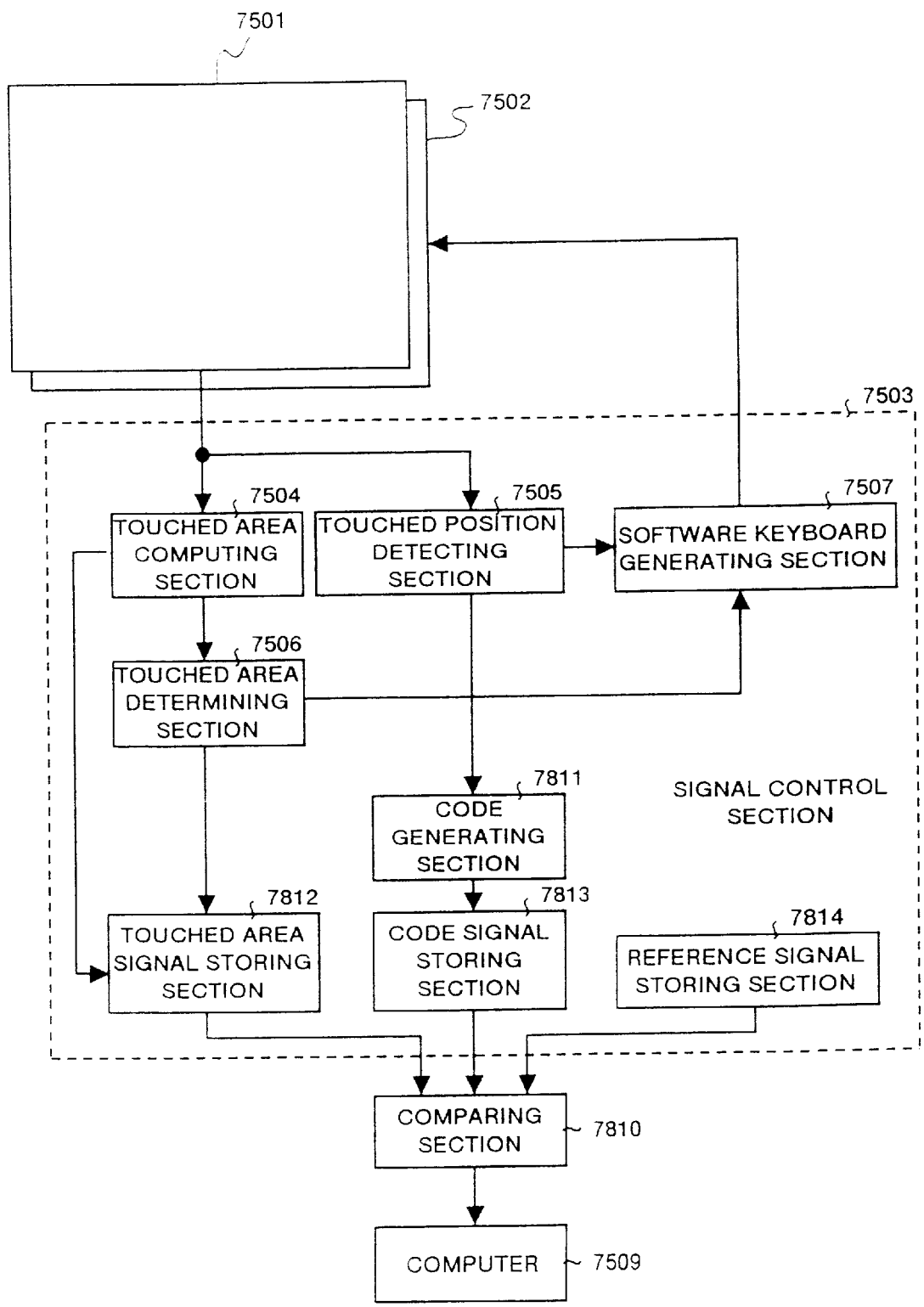
FIG. 78 is a block diagram showing a second example of configuration of the input device according to Embodiment 6 of the present invention.

FIG. 78 is a block diagram showing a second example of configuration of an input device for realizing the security function. As shown in FIG. 78, the input device has a tablet 7501, an image display unit 7502, a signal control section 7503, and a comparing section 7810. The signal control section 7503 has a touched area computing section 7504, a touched position detecting section 7505, a touched area determining section 7506, a software keyboard generating section 7507, and in addition, a code generating section 7811, a touched area signal storing section 7812, a code signal storing section 7813 and a reference signal storing section 7814.

The code generating section 7811 converts a coordinate signal of a touched position on the tablet 7501 detected in the touched position detecting section 7505 to a code signal according to a preset table. The touched area signal storing section 7812 successively stores, when a touched area computed in the touched area computing section 7504 is smaller than the threshold value, the computed touched areas therein. The code signal storing section 7813 successively stores code signals converted in the code generating section 7811. Stored in the reference signal storing section 7814 are a code signal series of users previously authorized to access the computer system and a touched area series each as reference signals. The comparing section 7810 compares input signals in the touched area signal series stored in the touched area signal storing section 7812 as well as in the code signal series stored in the code signal storing section 7813 to reference signals stored in the reference signal storing section 7814, and verifies the signals according to the result of comparison.

Figure 79:
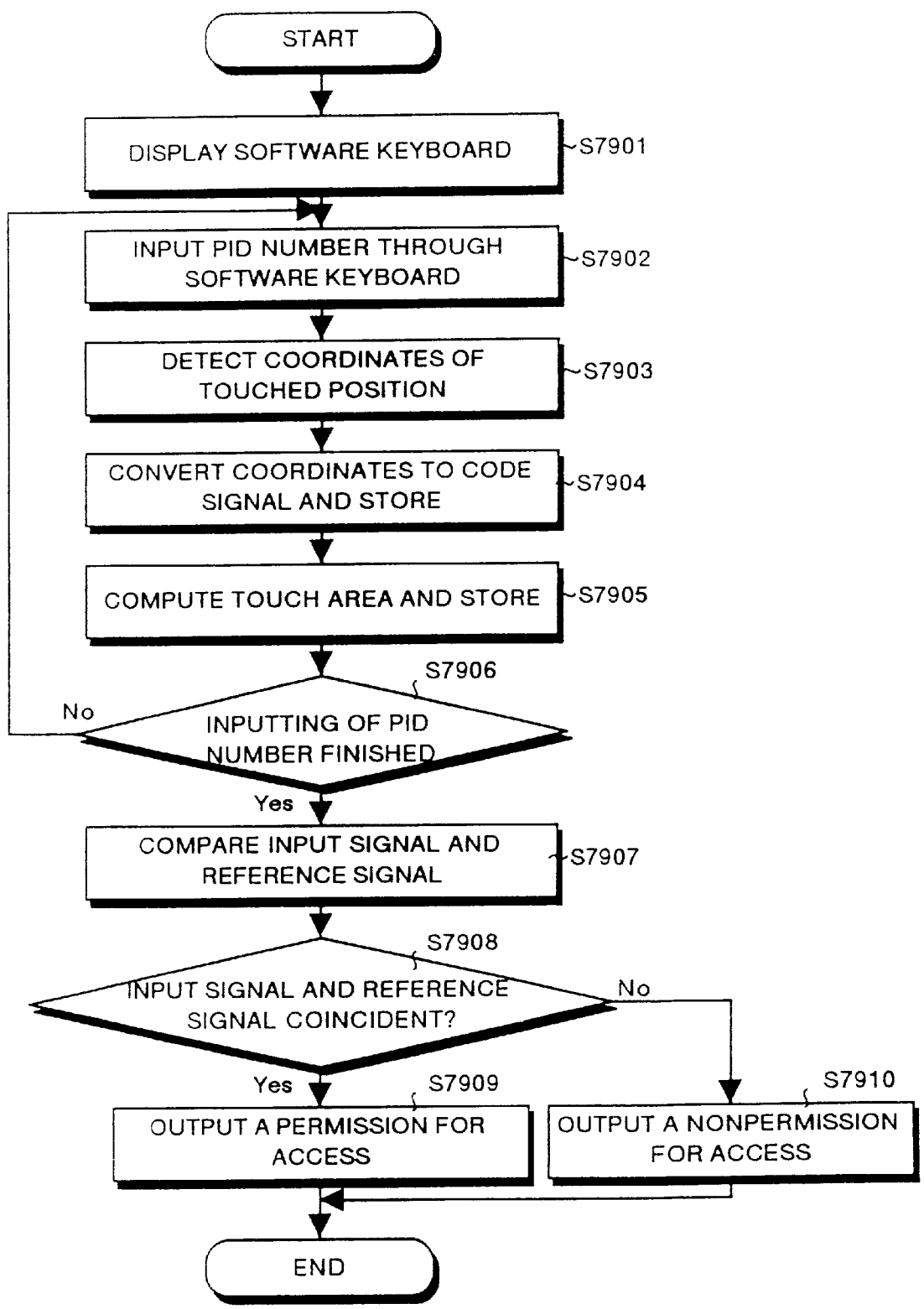
FIG. 79 is a flow chart showing an operation of the second example of configuration of the input device according to Embodiment 6 of the present invention.

Description is made for an operation of the input device configured as described above with reference to the flow chart in FIG. 79. As shown in the first configuration, the software keyboard is displayed on the image display unit 7502 (S7901), the tablet 7501 on the displayed software keyboard is touched with the fingertip or the like to enter a PID number or a password (S7902). Herein when a ten-key is displayed as the software keyboard, a PID number is inputted, while a password is inputted when a full key is displayed.

The touched position detecting section 7505 detects coordinate of each touched position on the tablet and sends the coordinates to the code generating section 7811 (S7903). The code generating section 7811 converts the coordinate to code signals and successively stores the code signals in the code signal storing section 7813 (S7904).

On the other hand, the touched area computing section 7504 computes a touched area when the PID number or the like is inputted by touching the tablet 7501 with the fingertip, and stores the touched area in the touched area signal storing section 7812 (S7905).

When this operation of inputting a PID number or a password is ended, the comparing section 7810 reads out the code signal series stored in the code signal storing section 7813 and the touched area signal series stored in the touched area signal storing section 7812, and compares the read-out signals in the code signal series and the touched area signal series to the reference signals consisting of the code signal series of the users authorized to access the computer system and the touched area signal series each previously registered in the reference signal storing section 7814 (S7906, S7907). As this comparing method, a simple template matching is used for comparison of code signals, and Viterbi decoding based on DP matching and HMM and a neural network technology are used for comparison of signals in touched area series because the signals in the touched area series are signals changing by time.

As a result of this comparison, when the reference signal coincident with the input signal is registered in the reference signal storing section 7814, it is determined that the user has been registered, and permission to the user to access the system is sent to the computer 7509 (S7908, S7909). When the reference signal coincident with the input signal is not registered in the reference signal storing section 7814, inhibition to access the system is sent to the computer 7509 (S7908, S7910). The computer 7509 displays the sent result on the image display unit 7502.

As described above, determination is made as to whether the user is authorized person or not according to the code signal series as well as to the touched area signal series indicating a touched position when the PID number and password are inputted from the software keyboard, therefore, high-reliability authorization for accessing the system can be verified without user's any particular operation required for authorization.

In the second configuration, description has been made for the case where access to the system is permitted or not depending on the PID number and password inputted from the software keyboard, but whether permission to access the system is given or not may be decided according to user's handwriting.

Figure 80:
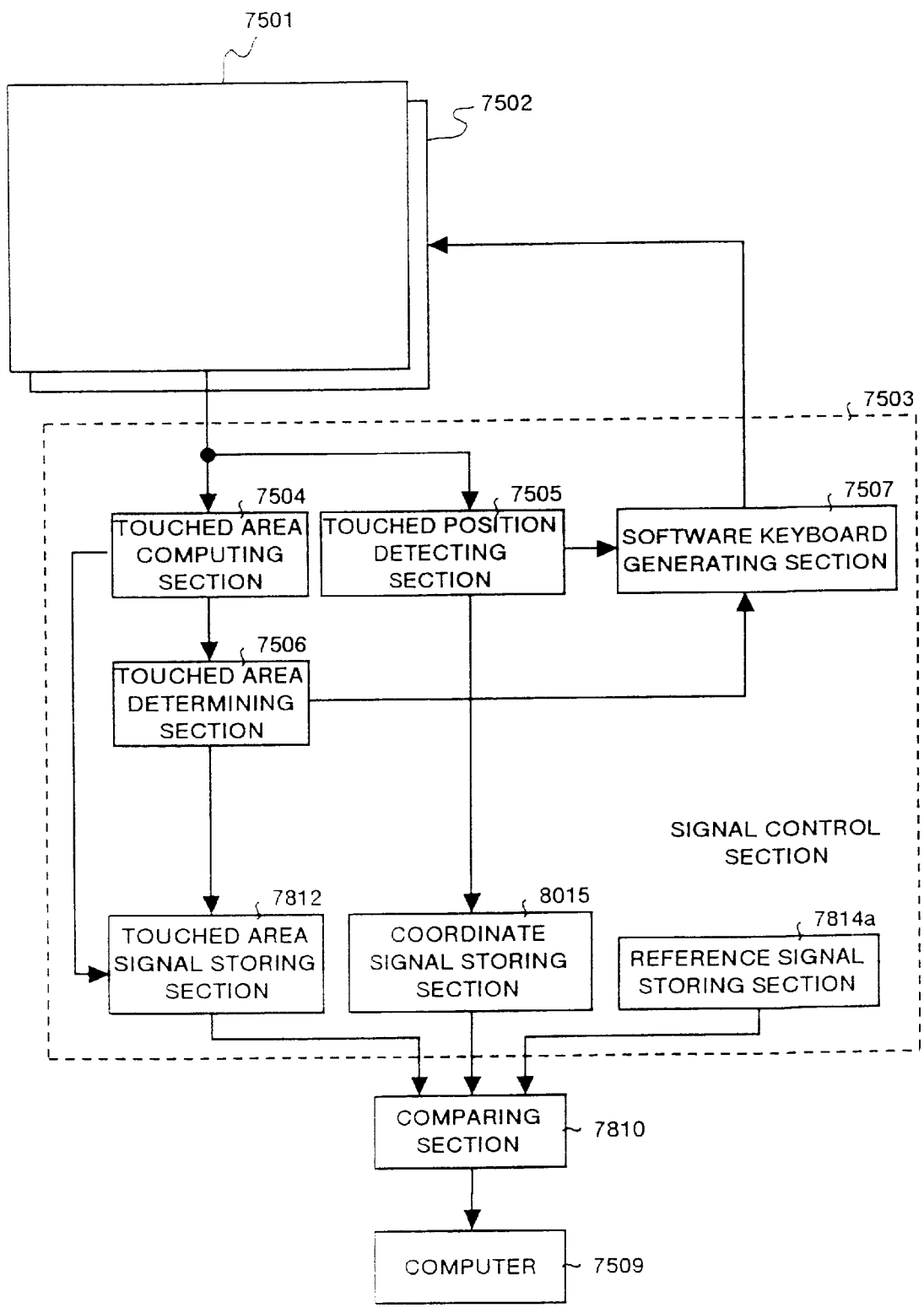
FIG. 80 is a block diagram showing a third example of configuration of the input device according to Embodiment 6 of the present invention.

FIG. 80 is a block diagram showing a third example of configuration of the input device for verifying the permission or non-permission according to user's handwriting. The signal control section 7503 of the input device as shown in FIG. 80 has a touched area computing section 7504, a touched position detecting section 7505, a touched area determining section 7506, a software keyboard generating section 7507, a touched area signal storing section 7812, a coordinate signal storing section 8015, and a reference signal storing section 7814a.

The coordinate signal storing section 8015 stores therein coordinate of a touched position on the tablet 7501 detected by the touched position detecting section 7505. The reference signal storing section 7814a registers therein a coordinate signal series obtained by previously measuring handwritings of users permitted to access the system and a touched area series as reference signals.

Figure 81:
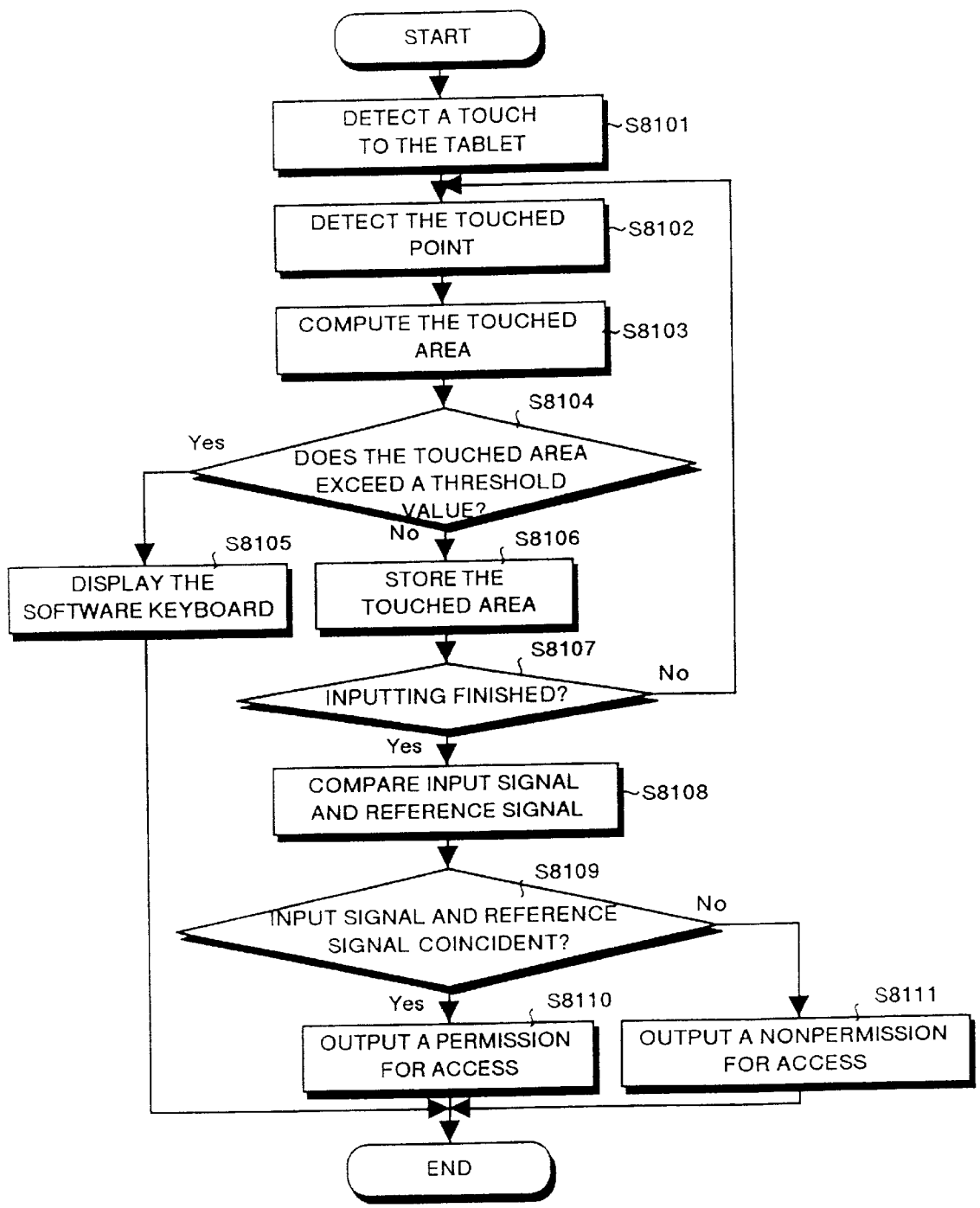
FIG. 81 is a flow chart showing an operation of the third example of configuration of the input device according to Embodiment 6 of the present invention.

Description is made for an operation of the input device configured as described above with reference to the flow chart in FIG. 81. When the tablet is touched with the fingertip or the like, the tablet 7501 outputs signals corresponding to the touched area and touched position to the touched area computing section 7504 as well as to the touched position detecting section 7505 (S8101).

The touched position detecting section 7505 detects coordinate of a position on the tablet touched with the fingertip or the like from a signal received from the tablet 7501 and stores the values in the coordinate signal storing section 8015 (S8102). At the same time, the touched area computing section 7504 computes an area on the tablet touched with the fingertip according to the signal received from the tablet 7501 (S8103).

The touched area determining section 7506 compares the touched area computed by the touched area computing section 7504 to the preset threshold value (S8104), and determines that the tablet 7501 has been touched with, for instance, a palm when the computed touched area is larger than the threshold value, and the software keyboard generating section 7507 generates a software keyboard and displays the board on the touched position of the image display unit 7502 (S8104, S8105).

Also it is determined that a graphic is created on the tablet 7501 when the computed touched area is smaller than the threshold value, and the computed touched areas are successively stored in the touched area signal storing section 7812 (S8104, S8106).

When inputting to the tablet 7501 is ended, the comparing section 7810 reads out the coordinate signal series stored in the coordinate signal storing section 8015 and the touched area signal series stored in the touched area signal storing section 7812, and compares the read-out signals in the coordinate signal series and the touched area signal series to the reference signals consisting of the coordinate signal series indicating handwriting of user's signatures authorized to access the computer system and the touched area signal series each previously registered in the reference signal storing section 7814a (S8107, S8108).

As a result of this comparison, when the reference signal coincident with the input signal is registered in the reference signal storing section 7814a, it is determined that the user has been registered, and permission to the user to access the system is sent to the computer 7509 (S8109, S8110). Also when the reference signal coincident with the input signal is not registered in the reference signal storing section 7814a, inhibition to access the system is sent to the computer 7509 (S8109, S8111). The computer 7509 displays the sent result on the image display unit 7502.

As described above, determination is made as to whether the user is an authorized person or not according to the user's signature, therefore, high-reliability authorization for accessing the system can be verified with a simple operation.

Figure 82:
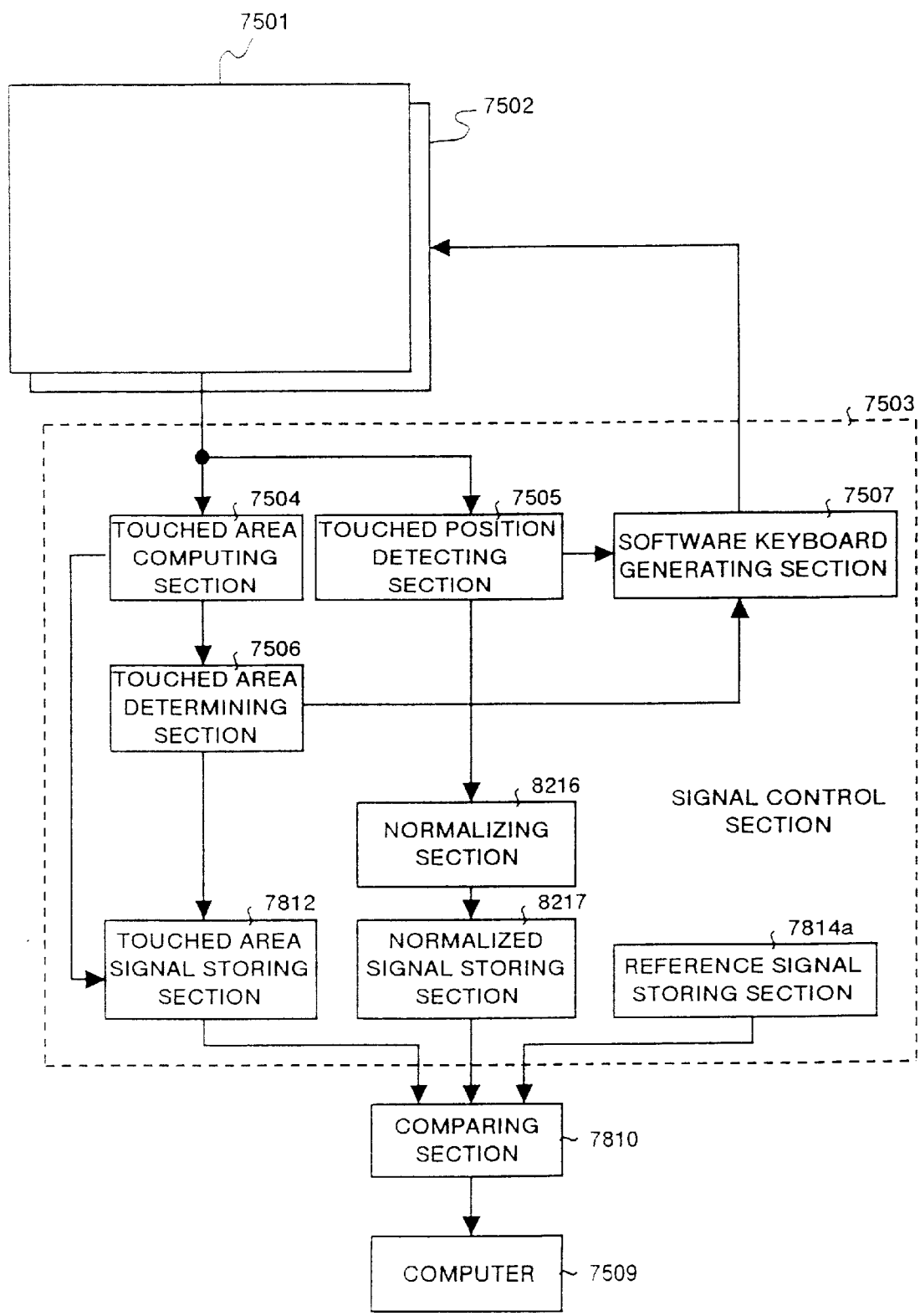
FIG. 82 is a block diagram showing a fourth example of configuration of the input device according to Embodiment 6 of the present invention.

In the third configuration, the coordinate signal series for handwriting of user's signature detected in the touched position detecting section 7505 is stored in the coordinate signal storing section 8015, the input signal consisting of the coordinate signal series stored in the coordinate signal storing section 8015 and the touched area signal series stored in the touched area signal storing section 7812 are compared to the reference signal registered in the reference signal storing section 7814a, but as shown in the block diagram (a fourth example of configuration) in FIG. 82, a normalizing section 8216 and a normalized signal storing section 8217 are provided in place of the coordinate signal storing section 8015, and a coordinate signal series of handwriting of user's signature detected in the touched position detecting section 7505 may be normalized and stored in the normalized signal storing section 8217.

In this case, the input signal consisting of the normalized signal series of the coordinate signal stored in the normalized signal storing section 8217 and the touched area signal series stored in the touched area signal storing section 7812 are compared to the reference signal consisting of a normalized series of coordinate signals showing handwritings of signatures of the users authorized to access the computer system and the touched area series each previously stored in the reference signal storing section 7814a. As described above, by normalizing a coordinate signal of a handwriting of a user's signature detected in the touched position detecting section 7505, the user can make a signature of an arbitrary size, which allows convenience to be enhanced.

Figure 83:
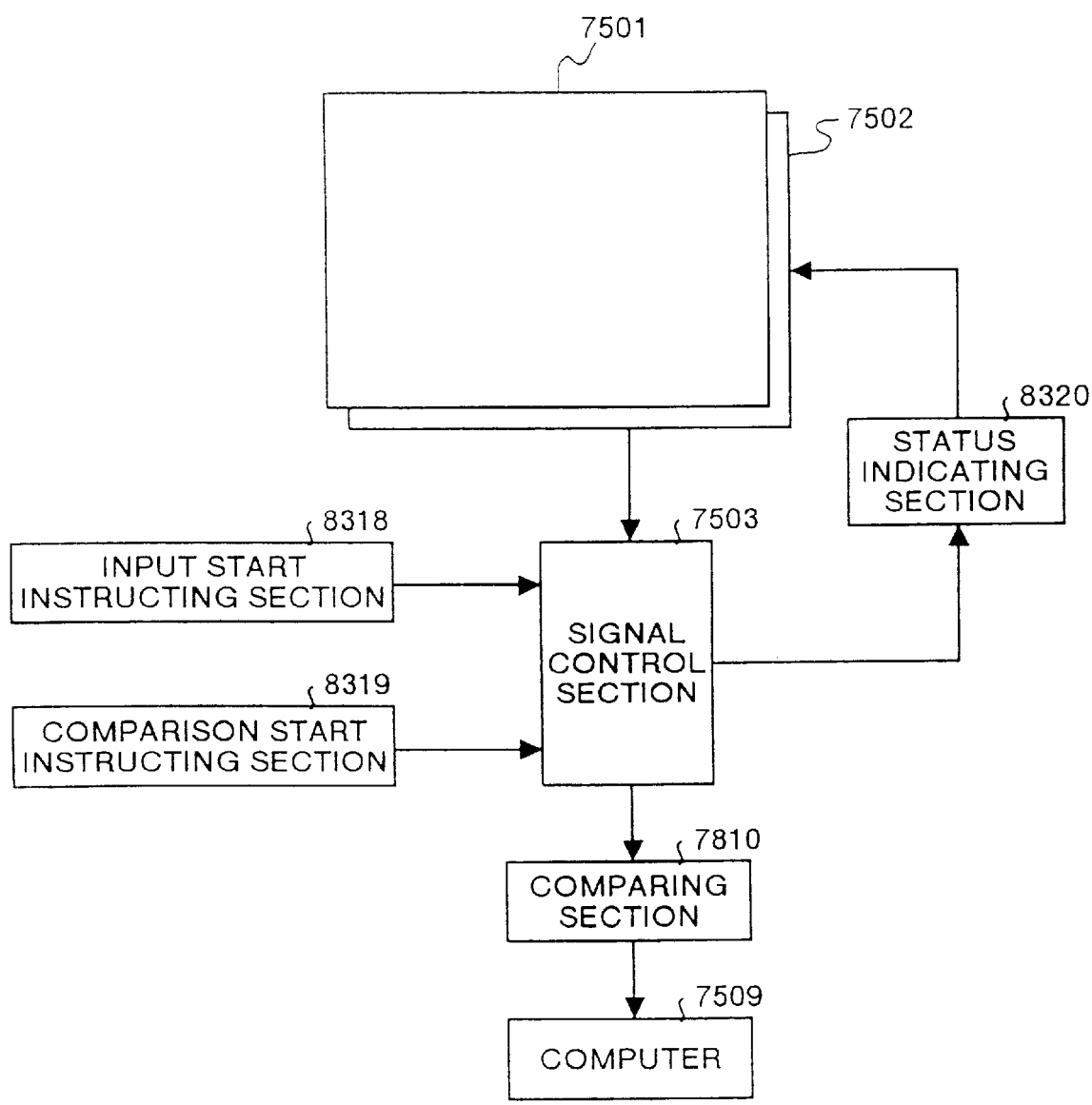
FIG. 83 is a block diagram showing a fifth example of configuration of the input device according to Embodiment 6 of the present invention.

As for each configuration for realizing the security function, as shown in the block diagram (a fifth example of configuration) in FIG. 83, an input start instructing section 8318 for inputting an input start instruction and a comparison start instructing section 8319 for inputting a comparison start instruction, and when a PID number or a sign is to be inputted, a PID number or the like is inputted according to an input start instruction from the input start instructing section 8318, and when the PID number or the like is to be verified, an operation of comparison is started according to the comparison start instruction inputted from the comparison start instructing section 8319, so that a PID number or the like can be more accurately verified. Herein, a switch or a switch reproduced on a software keyboard displayed on the image display unit 7502 may be used for operations in the input start instructing section 8318 as well as in the comparison start instructing section 8319.

When a PID number and a password are to be inputted, a touch number counter may be used as the input start instructing section 8318 and the comparison start instructing section 8319. As described above, when the touch number counter is used, the touched number counter is reset to "0" when the software keyboard on the tablet 7501 is first touched, an input start instruction is sent to the signal control section 7503, a number of times is counted with the touched number counter each time when the software keyboard is touched, and when a counted value by the touched number counter reaches a certain number of times prespecified according to a PID number and a password, a comparison start instruction is sent to the signal control section 7503. As described above, a number of input times of a PID number and a password can also be confirmed.

Also when handwriting of a user's signature is to be inputted, a timer for measuring an input time may be used as the input start instructing section 8318 and the comparison start instructing section 8319. In this case, when a user touches the tablet 7501 to start signing, a measuring time by the timer is reset to "0" and the measurement is started, and an input start instruction is sent to the signal control section 7503, and when a prespecified period of time is over, a comparison start instruction is sent to the signal control section 7503. As described above, even if a number of characters are not certain like in the case of verification of a signature, an input operation of a signature and a comparing operation can be performed with stability.

Confirmed in a status indicating section 8320 are an input processing standby status before an input start instruction is sent from this input start instructing section 8318 to the signal control section 7503, an input processing start status after the input start instruction is sent to the signal control section 7503, a comparison processing status during comparison operation after a comparison start instruction is sent from the comparison start instructing section 8319, and a comparison operation end status, and when each of the statuses is displayed on the image display unit 7502, a user can accurately recognize each of the processing statuses, which allows convenience to be enhanced.

As described above, with the input device according to Embodiment 6, a software keyboard is generated according to a touched area obtained by touching an input surface provided integrally with an image display unit, and the software keyboard is displayed on the touched position of the image display unit, so that the software keyboard can easily be displayed.

Furthermore, by displaying a software keyboard in a size according to a size of an area touching the input surface, an arbitrary-sized software keyboard can be displayed, which allows convenience to be enhanced.

In addition, by comparing a code signal series as well as a touched area signal series of coordinate of a touched position when an input surface integrally provided with an image display unit is touched to a reference signal, determination can be made as to whether a user is an authorized person or not according to the PID number and password inputted through the software keyboard, therefore, a high-reliability authorization for accessing the system can be verified without any particular operation by the user required for authorization.

Furthermore, by comparing a coordinate signal series as well as a touched area series when an input surface integrally provided with an image display unit is touched to a reference signal, authorization for accessing the system can be verified according to handwriting of a user's signature, and high-reliability authorization can be performed.

In addition, by normalizing a coordinate signal series when an input surface integrally provided with an image display unit is touched, an arbitrary-sized signature can be used, which allows convenience to be enhanced.

Furthermore, by instructing to start inputting data to an input surface or instructing to start comparison processing, a PID number or the like can more accurately be recognized. This input start instruction and comparison start instruction are executed with a touch number counting unit for counting a number of times the input surface is touched or an input time measuring unit for measuring an input time, so that instructions can simply and accurately be performed.

Furthermore, by displaying a status of inputting data into the input surface or a status of comparison processing on an image display unit, a user can accurately recognize processing statuses, which allows convenience to be enhanced.

Each processing in Embodiments 1 to 6 described above can be realized by executing a previously prepared program by a computer. This program is recorded in a computer-readable recording medium such as a hard disk, a floppy disk, a CD-ROM, an MO, and a DVD, and is executed by reading out from the recording medium by the computer. Furthermore, this program can be distributed through the recording medium or a network.

As described above, the electronic blackboard system according to the present invention comprises a display surface and a write-in surface of the electronic blackboard with a display unit and a touch input device, and accommodates the display unit, touch input device, a printer, and a control unit in a frame unit in which a control unit accommodating section, a printer accommodating section, and holding section are arranged in the vertical direction in this order from the bottom, so that movement and installation of the system can easily be performed only by moving the frame unit. Furthermore, the devices are arranged in the order of the heaviest to a lighter one from the bottom in the direction of gravity (the vertical direction) of the unit, so that stability of the frame unit at the time of movement and installation thereof can be insured. Furthermore, a shielding member for shutting down electromagnetic waves is provided on the surface of the display unit side in the touch input device based on a ultrasonic surface elastic wave system, so that a plasma display can be used as a display unit, and the display unit can be made thinner (minimized) and brightness on the display screen can be improved. Namely, with the electronic blackboard system according to the present invention, the system as a whole can be downsized and integrated, and also operability, adaptability for handling, and convenience can be improved.

Furthermore, as the electronic blackboard system has an angle adjusting unit for adjusting an angle of the display surface as well as of the write-in surface of the electronic blackboard, incoming interference light into the display unit (display surface), especially, light from lighting equipment such as a fluorescent tube provided on the ceiling can be avoided, an image on the screen can easily be seen, and convenience can be improved.

Also a display unit can be used as a large-sized screen monitor by using a plurality of connecting terminals for connecting various types of information equipment and AV equipment such as a digital camera, a DVD player, and a video equipment to the system, therefore, it is possible to provide an electronic blackboard system for enabling connection and operation of the various types of information equipment and AV equipment without a personal computer connected thereto.

As described above, the electronic blackboard system according to the present invention is suited to use, for example, as a blackboard system for conference and as a blackboard system as educational equipment because display video moving pictures audio/photographs can be displayed on a display unit thereof, overwrite is possible with a fingertip or a pen on the display section for filling in additional information, and connection of various types of information equipment and AV equipment as multimedia equipment to the system is possible.

What is claimed is:

1. An electronic blackboard system, comprising:
    a plasma display configured to display characters and images on a display surface thereof;

a touch input device with a touch panel surface provided on the display surface to form an electronic blackboard;

a printer configured to print image data onto a recording paper;

a personal computer configured to control displays provided by the plasma display as well as printing operations of the printer according to input from the touch input device;

a frame unit including,
an upper section configured to hold the display surface and the touch panel surface forming the electronic blackboard at a specified height,
a printer section positioned below the upper section and configured to accommodate the printer, and
a personal computer section positioned below the printer section and configured to accommodate the personal computer, wherein said touch input device includes,
a transmitting unit configured to transmit surface elastic waves onto the touch panel surface,
a reflecting unit configured to reflect the surface elastic waves propagating on the touch panel surface from the transmitting unit, and
a receiving unit connected to the personal computer via a signal line and configured to receive the surface elastic waves reflected by said reflecting unit and to input a signal to the personal computer via the signal line, said signal being representative of a coordinate of a touch position on the touch panel surface according to an attenuation rate of the surface elastic waves; and an L-shaped substantially flat shielding member configured to block off electromagnetic waves generated by the plasma display from interfering with the signal input to the personal computer, and provided between the plasma display and the touch input device at a position where the signal line is connected to the receiving unit and so as to not contact the reflecting unit of the touch input device.

2. An electronic blackboard system, comprising:

a display unit configured to display characters and images on a display surface thereof;

a touch input device with a touch panel surface provided on the display surface to form an electronic blackboard;

a control unit configured to control displays by said display unit according to input from the touch input device, said touch input device including,
a transmitting unit configured to transmit surface elastic waves onto the touch panel surface,
a reflecting unit configured to reflect the surface elastic waves propagating on the touch panel surface from the transmitting unit, and
a receiving unit connected to the control unit via a signal line and configured to receive the surface elastic waves reflected by the reflecting unit and to input a signal to the control unit via the signal line, said signal being representative of a coordinate of a touch position on the touch panel surface according to an attenuation rate of the surface elastic waves to said signal line; and an L-shaped substantially flat shielding member configured to block off electromagnetic waves generated by the plasma display from interfering with the signal input to the control unit, and provided between the plasma display and the touch input device at a position where the signal line is connected to the receiving unit and so as to not contact the reflecting unit of the touch input device.

3. An electronic blackboard system according to claim 2; wherein said display unit comprises a plasma display.

4. An electronic blackboard system according to claim 1; wherein said shielding member is a copper foil tape.

5. An electronic blackboard system, comprising:

a display unit configured to display characters and images on a display surface thereof;

a touch input device with a touch panel surface provided on the display surface to form an electronic blackboard;

a printer configured to output image data onto a recording paper;

a personal computer connected to the touch input device via a signal line and configured to control displays provided by the display unit as well as printing operations by the printer according to input from the touch input device;

a frame unit including,
an upper section configured to hold the display surface and the touch panel surface forming the electronic blackboard at a specified height,
a printer section below the upper section configured to accommodate the printer therein, and a personal computer section positioned below said printer section and configured to accommodate the personal computer therein; and an L-shaped substantially flat shielding member configured to block off electromagnetic waves generated by the display unit from interfering with a signal input from the touch input device, and provided between the display unit and the touch input device at a position where the signal line is connected to a receiving unit of the touch input device and so as to not contact a reflecting unit of the touch input device.

6. An electronic blackboard system according to claim 1, wherein said frame unit has a keyboard placement section provided at a position at an upper side of the printer section and at a lower side of the upper section and configured to hold a keyboard connected to the personal computer.

7. An electronic blackboard system according to claim 1, wherein said upper section comprises an angle adjusting unit for adjusting an angle of the display surface and the touch panel surface of the electronic blackboard to a horizontal plane on which the frame unit is placed.

8. An electronic blackboard system according to claim 1, wherein said display unit further has a plurality of connecting terminals for connecting various types of information equipment, audio visual equipment, and video equipment, and is usable as a large-sized screen monitor by using the connecting terminals.

9. An electronic blackboard system, comprising:

display means for displaying characters and images on a display surface thereof;

touch input means with a touch panel surface provided on the display surface for forming an electronic blackboard;

control means for controlling displays provided by the display means according to input from the touch input means, wherein said touch input means includes,
transmitting means for transmitting surface elastic waves onto the touch panel surface,
reflecting means for reflecting the surface elastic waves propagating on the touch panel surface from the transmitting means, and
receiving means connected to the control means via a signal line and for receiving a receiving unit configured to receive the surface elastic waves reflected by said reflecting means and for inputting a signal to the control means via the signal line, said signal being representative of a coordinate of a touch position on the touch panel surface according to an attenuation rate of the surface elastic waves; and a substantially flat L-shaped shielding means for blocking off electromagnetic waves generated by the display means from interfering with the signal input to the control means, and provided between the display means and the touch input means at a position where the signal line is connected to the receiving means and so as to not contact the reflecting means of the touch input means.

10. An electronic blackboard system, comprising:

a display unit configured to display characters and images on a display surface thereof;

a touch input device with a touch panel surface provided on the display surface to form an electronic blackboard;

a printer configured to output image data onto a recording paper;

a control unit configured to control displays provided by the display unit as well as printing operations of the printer according to input from the touch input device;

a frame unit including,
- an upper section configured to hold the display surface and the touch panel surface forming the electronic blackboard at a specified height,
- a printer section positioned below the upper section and configured to accommodate the printer therein, and
- a control unit section positioned below said printer section and configured to accommodate the control unit therein, wherein said touch input device includes,
- a transmitting unit configured to transmit surface elastic waves on the touch panel surface,
- a reflecting unit configured to reflect the surface elastic waves propagating on the touch panel surface from the transmitting unit, and
- a receiving unit connected to the control unit via a signal line and configured to receive the surface elastic waves reflected by the reflecting unit and to input a signal to the control unit via the signal line, said signal being representative of a coordinate of a touch position on the touch panel surface according to an attenuation rate of the surface elastic waves; and an L-shaped substantially flat shielding member configured to block off electromagnetic waves generated by the display unit from interfering with the signal input to the control unit, and provided between the display unit and the touch input device at a position where the signal line is connected to the receiving unit and so as to not contact the reflecting unit of the touch input device.

11. An electronic blackboard system, comprising:

a display unit configured to display characters and images on a display surface thereof;

a touch input device with a touch panel surface provided on the display surface to form an electronic blackboard;

a printer configured to output image data onto a recording paper;

a control unit connected to the touch input device via a signal line and configured to control displays provided by the display unit as well as printing operations by the printer according to input from the touch input device;

a frame unit including,
- an upper section configured to hold the display surface and the touch panel surface forming the electronic blackboard at a specified height,
- a printer section below the holding section and configured to accommodate the printer therein; and
- a control unit section positioned below said printer section and configured to accommodate the control unit therein; and an L-shaped substantially flat shielding member configured to block off electromagnetic waves generated by the display unit from interfering with a signal input from the touch input device, and provided between the display unit and the touch input device at a position where a signal line is connected to a receiving unit of the touch input device and so as to not contact a reflecting unit of the touch input device.

12. An electronic blackboard system according to claim 2, wherein said shielding member is a copper foil tape.

13. An electronic blackboard system according to claim 3, wherein said shielding member is a copper foil tape.

14. An electronic blackboard system according to claim 5, wherein said upper section comprises an angle adjusting unit for adjusting an angle of the display surface and the touch panel surface of the electronic blackboard to a horizontal plane on which the frame unit is placed.

15. An electronic blackboard system according to claim 6, wherein said upper section comprises an angle adjusting unit for adjusting an angle of the display surface and the touch panel surface of the electronic blackboard to a horizontal plane on which the frame unit is placed.

16. An electronic blackboard system according to claim 2, wherein said display unit further has a plurality of connecting terminals for connecting various types of information equipment, audio visual equipment, and video equipment, and is usable as a large-sized screen monitor by using the connecting terminals.

17. An electronic blackboard system according to claim 3, wherein said display unit further has a plurality of connecting terminals for connecting various types of information equipment, audio visual equipment, and video equipment, and is usable as a large-sized screen monitor by using the connecting terminals.

18. An electronic blackboard system according to claim 4, wherein said display unit further has a plurality of connecting terminals for connecting various types of information equipment, audio visual equipment, and video equipment, and is usable as a large-sized screen monitor by suing the connecting terminals.

19. An electronic blackboard system according to claim 5, wherein said display unit further has a plurality of connecting terminals for connecting various types of information equipment, audio visual equipment, and video equipment, and is usable as a large-sized screen monitor by using the connecting terminals.

20. An electronic blackboard according to claim 1, wherein the L-shaped shielding member comprises a width within the inclusive range of 32 mm and 38 mm, a length in longitudinal direction of the touch input device within the inclusive range of 50 mm and 90 mm, and a length in a lateral direction of the touch input device within the inclusive range of 110 mm and 150 mm.

21. An electronic blackboard according to claim 2, wherein the L-shaped shielding member comprises a width within the inclusive range of 32 mm and 38 mm, a length in a longitudinal direction of the touch input device within the inclusive range of 50 mm and 90 mm, and a length in a lateral direction of the touch input device within the inclusive range of 110 mm and 150 mm.

22. An electronic blackboard according to claim 5, wherein the L-shaped shielding member comprises a width within the inclusive range of 32 mm and 38 mm, a length in a longitudinal direction of the touch input device within the inclusive range of 50 mm and 90 mm, and a length in a lateral direction of the touch input device within the inclusive range of 110 mm and 150 mm.

23. An electronic blackboard according to claim 10, wherein the L-shaped shielding member comprises a width within the inclusive range of 32 mm and 38 mm, a length in a longitudinal direction of the touch input device within the inclusive range of 50 mm and 90 mm, and a length in a lateral direction of the touch input device within the inclusive range of 110 mm and 150 mm.

24. An electronic blackboard according to claim 12, wherein the L-shaped shielding member comprises a width within the inclusive range of 32 mm and 38 mm, a length in a longitudinal direction of the touch input device within the inclusive range of 50 mm and 90 mm, and a length in a lateral direction of the touch input device within the inclusive range of 110 mm and 150 mm.

* * * * *